US012124308B2

(12) United States Patent
Faulkner et al.

(10) Patent No.: US 12,124,308 B2
(45) Date of Patent: Oct. 22, 2024

(54) TECHNIQUES TO MODIFY PROCESSOR PERFORMANCE

(71) Applicant: NVIDIA Corporation, Santa Clara, CA (US)

(72) Inventors: Benjamin D. Faulkner, Los Altos Hills, CA (US); Padmanabhan Kannan, Santa Clara, CA (US); Srinivasan Raghuraman, San Jose, CA (US); Peng Cheng Shen, Sunnyvale, CA (US); Divya Ramakrishnan, San Jose, CA (US); Swanand Santosh Bindoo, San Jose, CA (US); Sreedhar Narayanaswamy, Sunnyvale, CA (US); Amey Y. Marathe, Union City, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/848,274

(22) Filed: Jun. 23, 2022

(65) Prior Publication Data

US 2024/0094793 A1    Mar. 21, 2024

(51) Int. Cl.
| G06F 11/00 | (2006.01) |
| G06F 1/20 | (2006.01) |
| G06F 1/30 | (2006.01) |
| G06F 11/07 | (2006.01) |

(52) U.S. Cl.
CPC ............... *G06F 1/30* (2013.01); *G06F 1/206* (2013.01); *G06F 11/0721* (2013.01); *G06F 11/076* (2013.01); *G06F 11/0793* (2013.01)

(58) Field of Classification Search
CPC ............... G06F 11/076; G06F 11/0793; G06F 11/0751; G06F 1/30; G06F 1/206; G06F 1/3203; G06F 1/3206; G06F 1/3296
See application file for complete search history.

(56) References Cited

U.S. PATENT DOCUMENTS

| 5,974,556 | A | 10/1999 | Jackson et al. |
| 6,947,047 | B1 | 9/2005 | Moy et al. |
| 7,036,030 | B1 | 4/2006 | Altmejd |
| 7,519,843 | B1 | 4/2009 | Buterbaugh et al. |
| 7,650,518 | B2 | 1/2010 | Allarey et al. |
| 7,721,119 | B2 * | 5/2010 | Capps, Jr. ................ G06F 1/26 |
| | | | 363/21.01 |
| 7,721,125 | B2 | 5/2010 | Fung |
| 8,151,094 | B2 * | 4/2012 | Vera ...................... G06F 11/008 |
| | | | 712/220 |

(Continued)

FOREIGN PATENT DOCUMENTS

WO    2011/011673 A1    1/2011

OTHER PUBLICATIONS

U.S. Appl. No. 17/728,911 filed on Apr. 25, 2022.

(Continued)

*Primary Examiner* — Marc Duncan
(74) *Attorney, Agent, or Firm* — Davis Wright Tremaine LLP

(57) ABSTRACT

Apparatuses, systems, and techniques to optimize processor performance. In at least one embodiment, a method increases an operation voltage of one or more processors, based at least in part, on one or more error rates of the one or more processors.

30 Claims, 51 Drawing Sheets

(56) References Cited

U.S. PATENT DOCUMENTS

| | | | | |
|---|---|---|---|---|
| 8,232,819 | B2* | 7/2012 | Turner | G11C 29/52 |
| | | | | 326/14 |
| 8,667,448 | B1* | 3/2014 | Chou | G06F 30/367 |
| | | | | 716/108 |
| 9,069,609 | B2 | 6/2015 | Abdalla et al. | |
| 9,354,689 | B2 | 5/2016 | Bhandaru et al. | |
| 9,429,966 | B2* | 8/2016 | Priel | G05F 1/462 |
| 9,557,795 | B1 | 1/2017 | Sabih et al. | |
| 2005/0132238 | A1* | 6/2005 | Nanja | G06F 1/3203 |
| | | | | 713/300 |
| 2005/0223251 | A1* | 10/2005 | Liepe | H03K 19/0008 |
| | | | | 713/322 |
| 2007/0033425 | A1 | 2/2007 | Clark | |
| 2008/0172565 | A1 | 7/2008 | Chu et al. | |
| 2008/0183502 | A1 | 7/2008 | Dicks et al. | |
| 2009/0144568 | A1 | 6/2009 | Fung | |
| 2009/0327656 | A1 | 12/2009 | Baum et al. | |
| 2010/0262578 | A1 | 10/2010 | Arimilli et al. | |
| 2011/0126056 | A1* | 5/2011 | Kelleher | G06F 1/3203 |
| | | | | 714/E11.2 |
| 2011/0191602 | A1* | 8/2011 | Bearden | G06F 1/3296 |
| | | | | 713/300 |
| 2012/0023382 | A1* | 1/2012 | Sandhu | G06F 1/324 |
| | | | | 714/E11.159 |
| 2012/0297036 | A1* | 11/2012 | Frank | H04L 12/12 |
| | | | | 709/221 |
| 2012/0324248 | A1 | 12/2012 | Schluessler et al. | |
| 2013/0080809 | A1 | 3/2013 | Lu | |
| 2013/0160016 | A1 | 6/2013 | Gummaraju et al. | |
| 2014/0040643 | A1 | 2/2014 | Rotem et al. | |
| 2014/0089699 | A1 | 3/2014 | O'Connor et al. | |
| 2014/0189696 | A1* | 7/2014 | Abellanas | G06F 11/0703 |
| | | | | 718/102 |
| 2014/0281696 | A1* | 9/2014 | Bacha | G06F 11/076 |
| | | | | 714/10 |
| 2015/0169365 | A1 | 6/2015 | Gendler et al. | |
| 2015/0355692 | A1 | 12/2015 | Paul et al. | |
| 2016/0077571 | A1 | 3/2016 | Sagar et al. | |
| 2016/0203006 | A1 | 7/2016 | Peng et al. | |
| 2016/0274636 | A1 | 9/2016 | Kim | |
| 2016/0313785 | A1 | 10/2016 | Kumar et al. | |
| 2017/0068297 | A1 | 3/2017 | Huang et al. | |
| 2017/0220384 | A1* | 8/2017 | Anderson | G06F 9/4893 |
| 2018/0052506 | A1 | 2/2018 | Kuo et al. | |
| 2018/0113502 | A1* | 4/2018 | Raja | G06F 15/7807 |
| 2018/0123604 | A1* | 5/2018 | Raja | H03L 5/00 |
| 2018/0293776 | A1 | 10/2018 | Ray et al. | |
| 2018/0364795 | A1 | 12/2018 | Li et al. | |
| 2019/0004585 | A1 | 1/2019 | Halverson et al. | |
| 2019/0065086 | A1 | 2/2019 | Margetts et al. | |
| 2019/0179383 | A1 | 6/2019 | Leva et al. | |
| 2019/0188053 | A1 | 6/2019 | Benke et al. | |
| 2019/0204894 | A1 | 7/2019 | Jahagirdar et al. | |
| 2019/0377395 | A1 | 12/2019 | Kaburlasos et al. | |
| 2020/0186751 | A1 | 6/2020 | Tran | |
| 2020/0218604 | A1* | 7/2020 | Lee | G01R 31/3183 |
| 2021/0018971 | A1 | 1/2021 | Rotem et al. | |
| 2021/0191753 | A1 | 6/2021 | Pan et al. | |
| 2022/0326759 | A1* | 10/2022 | Wang | G06F 1/28 |
| 2023/0205680 | A1 | 6/2023 | George et al. | |

OTHER PUBLICATIONS

U.S. Appl. No. 17/837,354 filed on Jun. 10, 2022.
U.S. Appl. No. 17/727,498 filed on Apr. 22, 2022.
IEEE, "IEEE Standard 754-2008 (Revision of IEEE Standard 754-1985): IEEE Standard for Floating-Point Arithmetic," Aug. 29, 2008, 70 pages.
IEEE, "IEEE Standard for 802.3," IEEE Standard for Ethernetn, IEEE Computer Society, Dec. 28, 2012, 634 pages.
Intel, "8th and 9th Generation Intel Core Processor Families and Intel Xeon E Processor Families," Jul. 2020, 135 pages.
Lefurgy et al., "Active Management of Timing Guardband to Save Energy in Power7*," Dec. 3, 2011, 11 pages.
Li et al., "Improving The Realiability Of Microprocessors Under BTI and TDDB Degradations," Jun. 16, 2014, 124 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
Wikipedia, "IEEE 802.5," Wikipedia The Free Encyclopedia, https://en.wikipedia.org/wiki/Token_Ring, Jan. 14, 2020, 12 pages.
International Preliminary Report on Patentability received for PCT Patent Application No. PCT/US2021/054568, mailed on Apr. 27, 2023, 10 pages (10 pages Original Document).
International Search Report and Written Opinion received for PCT Patent Application No. PCT/US2021/054568, mailed on Jan. 26, 2022, 11 pages (11 pages Original Document).

* cited by examiner

| | CPU Usage (%) | CPU Vmax (V) | CPU Tjmax (°C) | CPU Fmax (MHz) | CPU ER | GPU Usage (%) | GPU Vmax (V) | GPU Tjmax (°C) | GPU ER | Total ER |
|---|---|---|---|---|---|---|---|---|---|---|
| Default | 100% | 1.050 | 105 | 3136 | 1.00 | 100 | 1.050 | 105 | 1 | 2 |
| With modification | 100% | 1.058 | 105 | 3152 | 1.98 | 100 | 0.900 | 83 | 0.02 | 2 |

FIG. 4

| GPU voltage | GPU temp | CPU voltage | CPU temp | GPU Vmax boost | CPU Vmax boost | GPU Vmax | CPU Vmax |
|---|---|---|---|---|---|---|---|
| 1.05V | 105 | 1.05V | 105 | +0 | +0 | 1.05V | 1.05V |
| 0.9V | 83 | 1.05V | 105 | -150 mV | +10 mV | 0.9V | 1.06V |
| 0.9V | 105 | 1.05V | 105 | -150 mV | +5 mV | 0.9V | 1.055V |
| 0.8V | 65 | 1.05V | 105 | -250 mV | +25 mV | 0.8V | 1.075V |
| 0.8V | 65 | 0.9V | 90 | +0 | +0 | 1.05V | 1.05V |

FIG. 5

| | CPU Usage | CPU Tjmax | CPU Vmax | GPU Usage | GPU Tjmax | GPU Vmax | CPU Margin Firmware (MHz) | GPU Margin Firmware (MHz) | CPU margin needed (MHz) | GPU margin needed (MHz) | CPU BTI margin needed After Balancing/Credits (MHz) | CPU BTI DPPM | GPU BTI DPPM | Overall BTI DPPM | CPU Freq improvement (MHz) | CPU Freq | % Freq upside |
|---|---|---|---|---|---|---|---|---|---|---|---|---|---|---|---|---|---|
| Baseline | 100% | 105 | 1.050 | 100% | 105 | 1.05 | 40 | 40 | 40 | 40 | 0 | 1 | 1 | 2 | Baseline | 3136 | |
| Static Vmax balancing | 100% | 105 | 1.058 | 100% | 83 | 0.9 | 40 | 40 | 46 | 15 | 40 | 1.98 | 0.02 | 2 | 16 | 3152 | 0.5% |

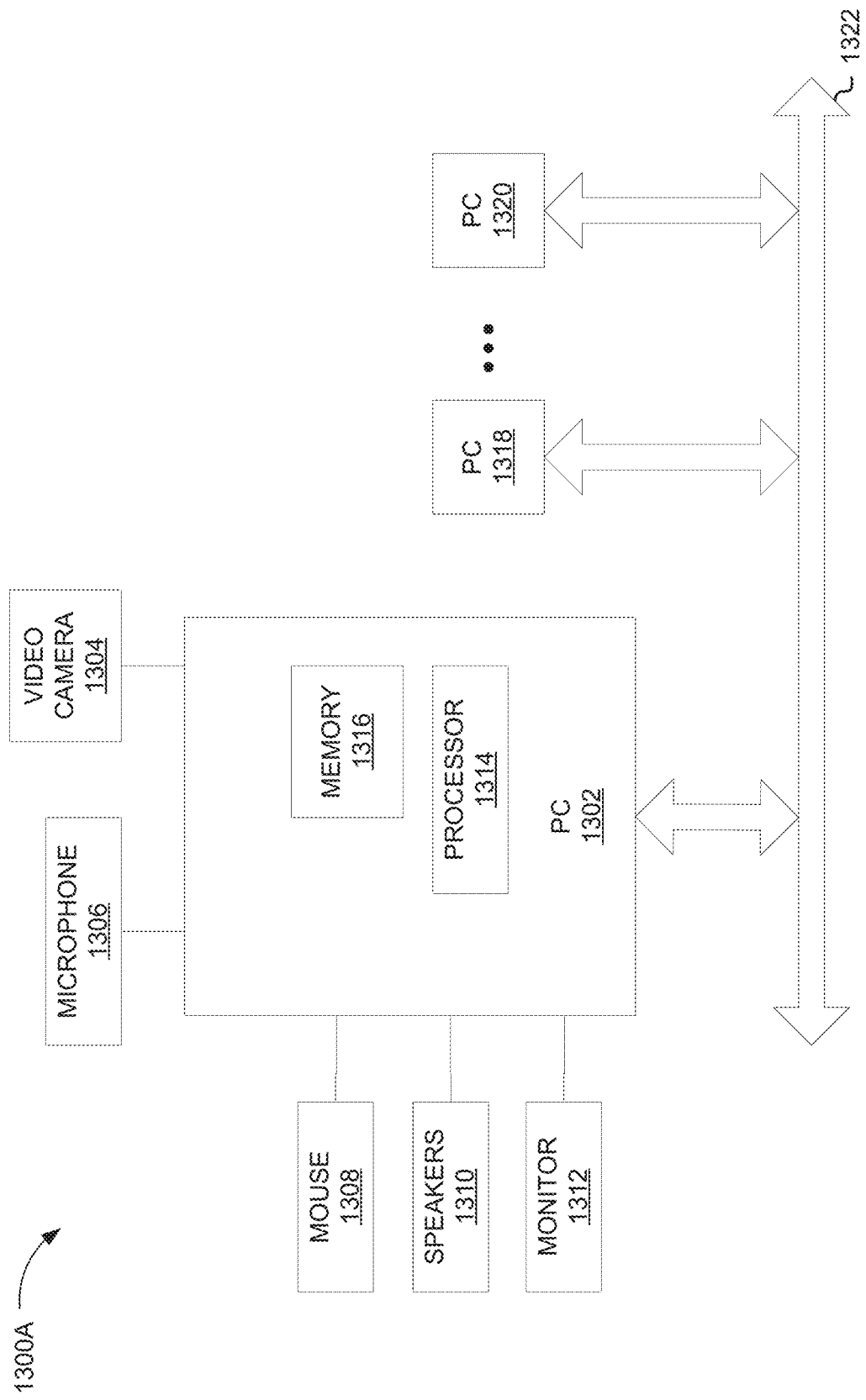

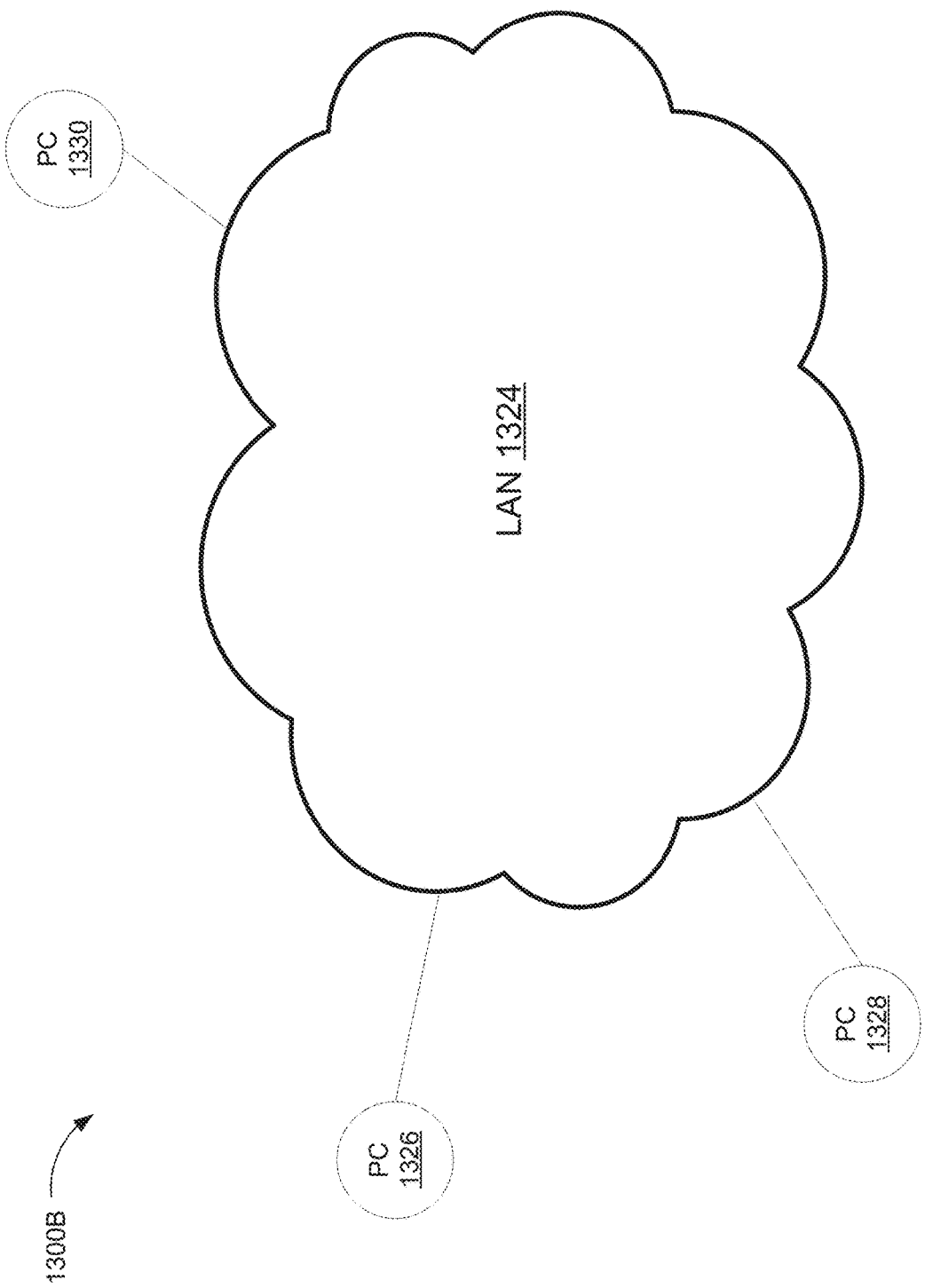

TECHNIQUES TO MODIFY PROCESSOR PERFORMANCE

FIELD

At least one embodiment pertains to processing resources used to execute one or more programs. For example, at least one embodiment pertains to adjusting an operating voltage of a processor based, at least in part, on an error rate of that processor.

BACKGROUND

Processors are generally configured to operate up to a set operating voltage (Vmax) so they can reliably operate for a number of years with a tolerable number of errors. Increasing operating voltage can increase a processor's speed but can also increase that processor's error rate. Improvements can be made to managing operating voltage of processors without decreasing reliability.

BRIEF DESCRIPTION OF THE DRAWINGS

FIG. 4 illustrates a table representing how processor operating factors are modified based on an error rate, according to at least one embodiment;

FIG. 5 illustrates a table representing how processor operating factors are modified based on an error rate, according to at least one embodiment;

FIG. 13A illustrates a networked computer system, in accordance with at least one embodiment;

FIG. 13B illustrates a networked computer system, in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details, and that any two or more embodiments described herein may be combined.

Figure 1:
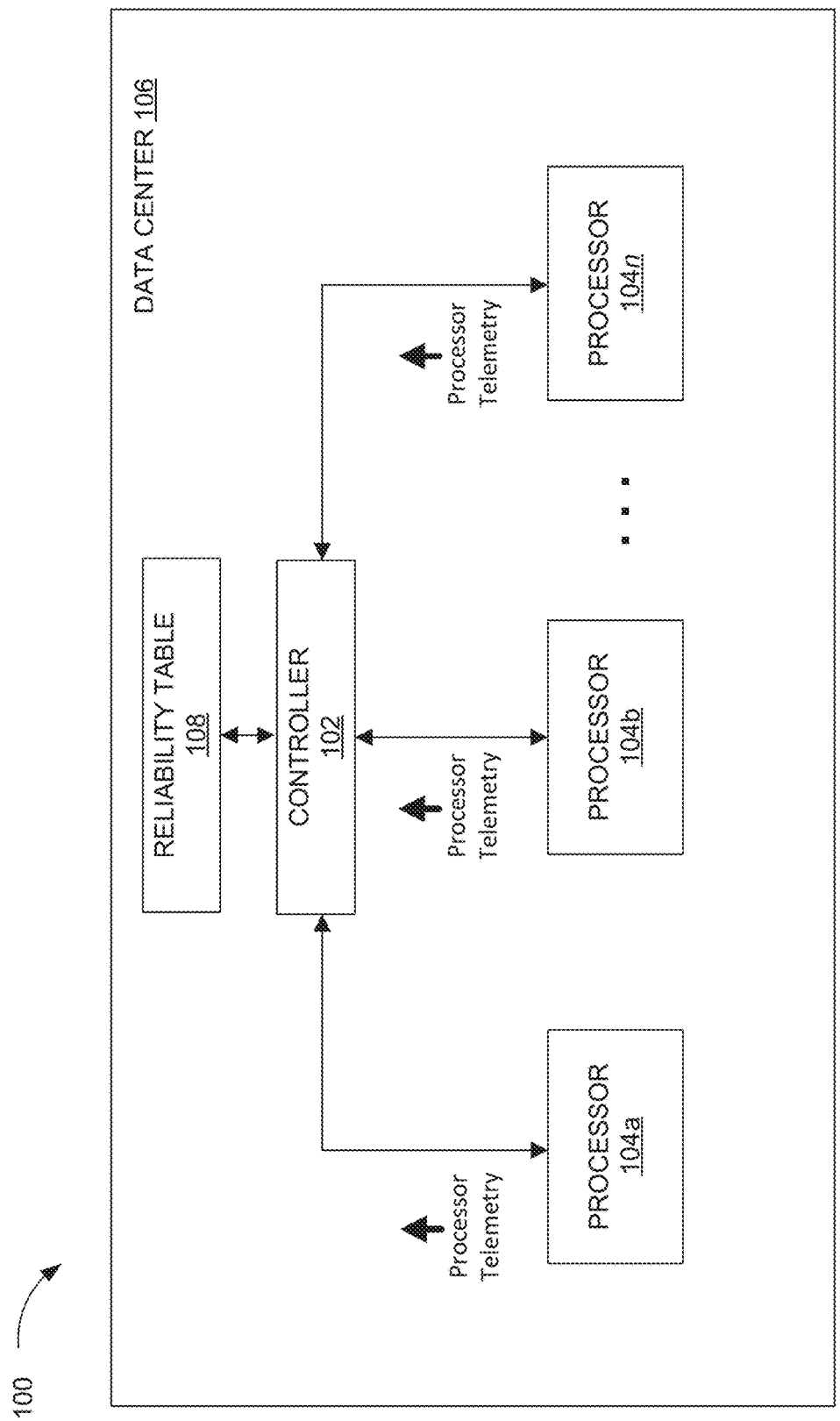
FIG. 1 illustrates a block diagram representing relationships between a controller and processors within a data center to optimize processor performance, according to at least one embodiment.

FIG. 1 illustrates a block diagram 100, representing, at least in part, relationships between a controller and processors within a data center to optimize overall performance of a group of processors, according to at least one embodiment. In at least embodiment, one or more aspects of one or more embodiments described in conjunction with FIG. 1 are combined with one or more aspects of one or more embodiments described herein, including embodiments described at least in conjunction with FIGS. 2-5. In at least one embodiment, optimizing overall performance of a group of processors, such as processors 104*a-n*, includes one or more circuits to cause an operating voltage of one or more integrated circuits to be adjusted based, at least in part, on an error rate (ER) of the one or more integrated circuits. In at least one embodiment, integrated circuits include processors, which are described further herein at least in conjunction with FIG. 1. In at least one embodiment, an error rate is a soft error rate (SER), which are described further herein at least in conjunction with FIG. 1. In at least one embodiment, an error rate is a number of defective parts per million (DIM that occur over a fixed period of time, as described further herein at least in conjunction with FIG. 1.

Figure 2:
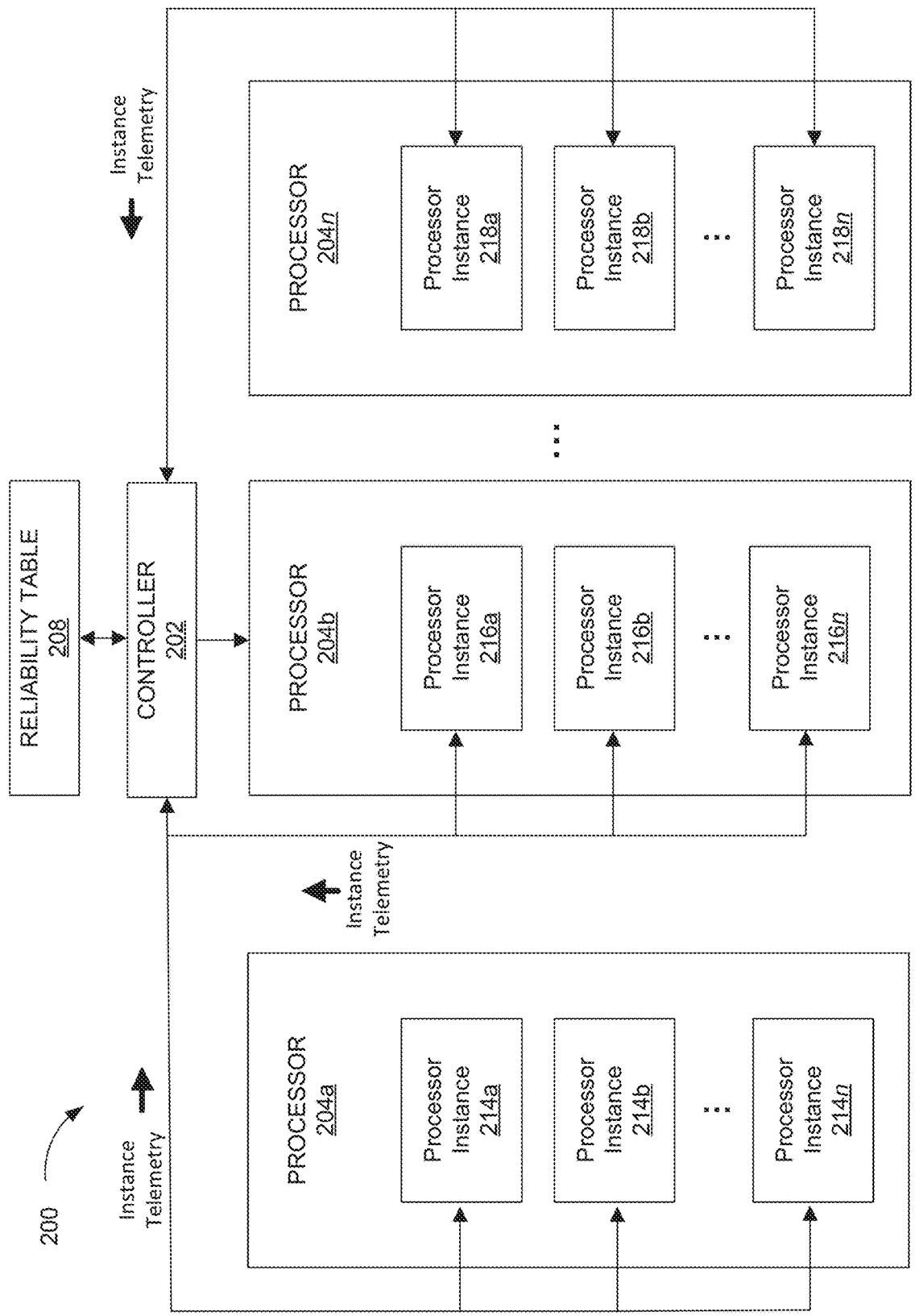
FIG. 2 illustrates a block diagram representing relationships between a controller and processor instances to optimize processor instance performance, according to at least one embodiment.
Figure 6:
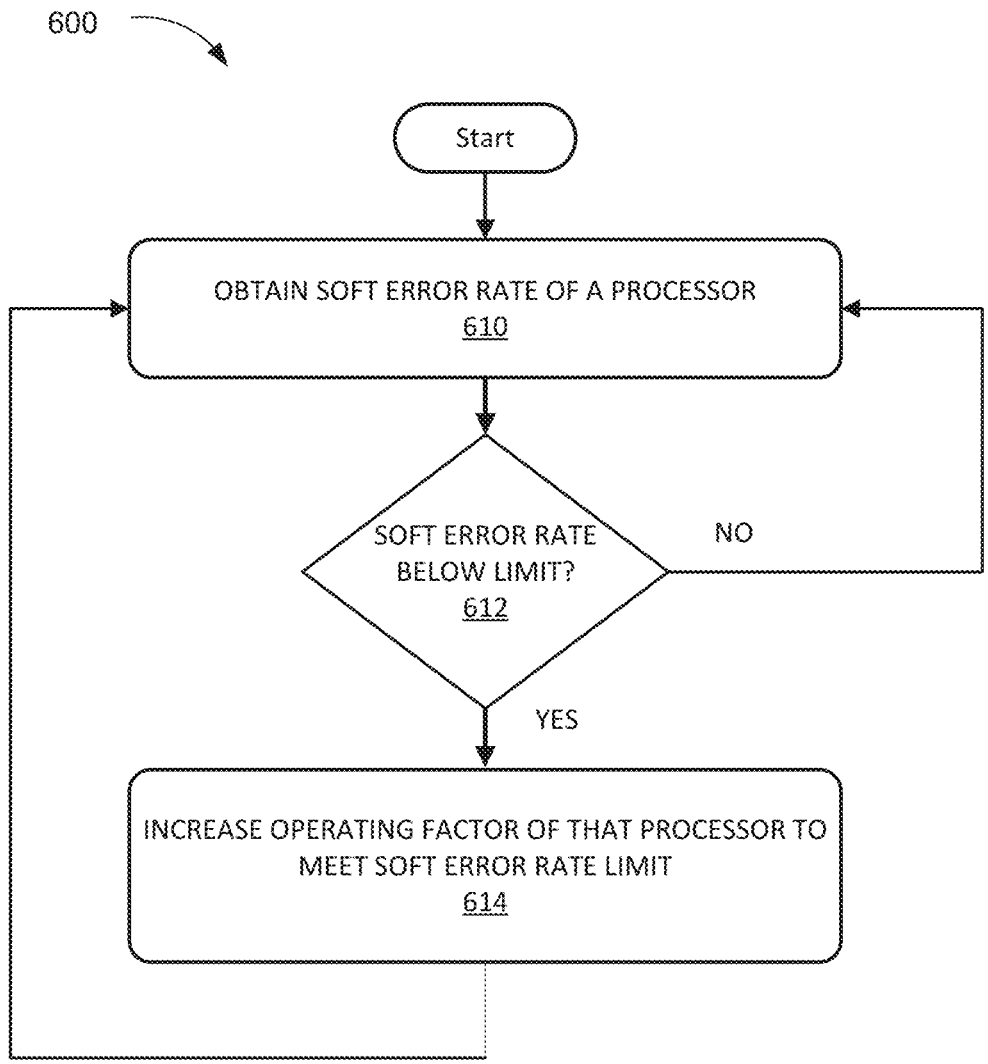
FIG. 6 illustrates a process for optimizing processor performance based on an error rate, according to at least one embodiment.

In at least one embodiment, diagram 100 includes controller 102, processors 104*a-n*, data center 106, and reliability table 108. In at least one embodiment, controller 102 is communicatively connected to one or more of processors 104*a-n*. In at least one embodiment, one or more of processors 104*a-n* is communicatively connected to controller 102. In at least one embodiment, information such as telemetry data, described further herein at least in conjunction with FIGS. 1-2 and 6, is communicated between controller 102 and one or more of processors 104*a-n*. In at least one embodiment, information, such as computing instructions that manage operations of a processor, is communicated between controller 102 and one or more processors 104*a-n*.

In at least one embodiment, a module includes any combination of any type of logic (e.g., software, hardware, firmware) and/or circuitry configured to perform a function as described. In at least one embodiment, a module includes one or more circuits that form part of a larger system (e.g., an integrated circuit (IC), system-on-chip (SoC), central processing unit (CPU), graphics processing unit (GPU), data processing unit (DPU), etc.). In at least one embodiment, a controller includes any combination of any type of logic (e.g., software, hardware, firmware) and/or circuitry configured to perform a function as described. In at least one embodiment, software includes software packages, code, programming language, drivers, instructions, instruction sets, or some combination thereof. In at least one embodiment, hardware includes hardwired circuits, programmable circuits, state machine circuits, fixed function circuits, execution unit circuits, firmware with stored instructions executed by programmable circuits, or some combination thereof.

In at least one embodiment, a logic unit includes firmware logic, hardware logic, or some combination thereof configured to provide any function as described further herein. In at least one embodiment, a logic unit includes circuitry that forms part of a larger system (e.g., IC, SoC, CPU, GPU, DPU). In at least one embodiment, a logic unit includes logic circuitry for implementation of firmware and/or hardware.

In at least one embodiment, an engine includes a module and/or logic unit as described further herein. In at least one embodiment, a component includes a module and/or logic unit as described further herein. In at least one embodiment, an engine includes software logic, firmware logic, hardware logic, or some combination thereof configured to provide any function as described further herein. In at least one embodiment, a component includes software logic, firmware logic, hardware logic, or some combination thereof configured to provide any function as described further herein. In at least one embodiment, operations performed by hardware and/or firmware may alternatively be implemented via a software module, which may be embodied as a software package, code and/or instruction set. In at least one embodiment, a logic unit may also utilize a portion of software to implement its function.

In at least one embodiment, controller 102 is hardware, software, firmware, a driver, a utility, or some combination thereof, configured to manage behavior of hardware, software, or some combination thereof. In at least one embodiment, controller 102 is hardware and/or software configured to, at least in part, monitor performance characteristics of one or more processors. In at least one embodiment, controller 102 is hardware and/or software configured to, at least in part, manage performance characteristics of one or more processors by causing modifications to processor inputs such as power delivered to said processors. In at least one embodiment, controller 102 is hardware and/or software configured to, at least in part, set threshold (e.g., maximum, minimum, optimum) values associated with one or more processors, such as voltage values, power delivery values, frequency values, or workload factor values. In at least one embodiment, controller 102 sets threshold values based, at least in part, on one or more functions that include as inputs values associated with a processor, such as power, leakage power, dynamic power, average power, voltage, capacitance, dynamic capacitance, temperature, frequency, frequency margin, clock speed, activity factor, workload factor, number of processors in a group, error rates, or some combination thereof and further described herein, in at least one embodiment, a function is referred to as an equation. In at least one embodiment, a threshold is referred to as a limit. In at least one embodiment, controller 102 receives telemetry information (metrics) from one or more processors, information such as power, leakage power, dynamic power, average power, voltage, capacitance, dynamic capacitance, temperature, frequency, clock speed, activity factor, workload factor, number of processors in a group, soft error rate, or some combination thereof. In at least one embodiment, controller 102 is a central controller, which is a controller that controls multiple processors on a device. In at least one embodiment, controller 102 is a controller such as a rack-level controller that manages hardware within one or more racks of a data center. In at least one embodiment, controller 102 is a region controller that manages an entire data center and/or one or more regions of a data center. In at least one embodiment, controller 102 is an element of a GPU manager (e.g., Intel® SPU Manager, NVIDIA® Data Center CPU Manager (DOW)) such as hardware and/or software configured to manage and monitor data center GPUs in cluster environments.

In at least one embodiment, one or more controllers (not shown) in addition to controller 102 are communicatively connected with one or more of processors 104*a-n*, wherein those one or more additional controllers are configured to perform one or more operations as described further herein. In at least one embodiment, controller 102 is communicatively connected with reliability table 208, which is described further herein at least in conjunction with FIGS. 1-8. In at least one embodiment, controller 102 increases an operating voltage and/or operating frequency for one or more of processors 104*a-n* by accessing and retrieving data from reliability table 208. In at least one embodiment, controller 102 In at least one embodiment, controller 102 manages a flow of information between two devices, such as between processor 104*a* and a memory device. In at least one embodiment, controller 102 is a controller implemented on a device such as a processor. In at least one embodiment, controller 102 is a microcontroller, which includes one or more other processors and software configured to perform one or more tasks such as calculating a soft error rate as described further herein. In at least one embodiment, controller 102 is a baseboard controller, alternatively referred to as a baseboard management controller (BMC). In at least one embodiment, controller 102 is a baseboard controller implemented on a server motherboard, which can be used to monitor and manage a host system. In at least one embodiment, controller 102 is a rack-level controller that monitors and manages devices in a server rack. In at least one embodiment, controller 102 is a cluster-level controller that monitors and manages multiple processors within a cluster of processors. In at least one embodiment, a cluster of processors is referred to as a group of processors. In at least one embodiment, controller 102 is a clock synchronization controller that uses one or more outputs of models to set one or more operational values (e.g., clock frequency, operating voltage) for one or more processors 104*a-n*. In at least one embodiment, operational values are referred to as operating factors, operating values, operating parameters, or operation factors. In at least one embodiment, a model includes one or more mathematical functions used to calculate operational values. In at least one embodiment, controller 102 sets one or more threshold clock speeds under which one or more of processors 104*a-n* aim to operate. In at least one embodiment, controller 102 sets a maximum operating voltage (Vmax) and/or maximum clock frequency (Fmax) for one or more processors. In at least one embodiment, controller 102 sets one or more maximum operating voltages and/or maximum operating frequencies for one or more processors on a device based, at least in part, on a soft error rate for one or more of those processors. In at least one embodiment, controller 102 sets one or more maximum operating voltages and/or maximum operating frequencies for one or more processors on a device based, at least in part on a DPPM rate for one or more of those processors. In at least one embodiment, controller 102 includes, conceptually, two or more portions, wherein each portion is configured to perform a specific task, for example, one portion of controller 102 increases and/or decreases a clock frequency and/or operating voltage of one or more processors 104*a-n* and another portion of controller 102 prevents one or more processors 104*a-n* from exceeding a power consumption budget, which is described further herein. In at least one embodiment, controller 102 performs tasks related to monitoring processor telemetry data.

In at least one embodiment, controller 102 performs rack-balancing operations, such a rack-level power balancing, based, at least in part, on one or more soft error rates. In at least one embodiment, rack-balancing operations include adjusting power consumption and/or clock frequency of one or more processors of a server rack to fit within a power budget. In at least one embodiment, pod-balancing operations, such as pod-level power balancing, is based, at least in part, on one or more soft error rates, wherein a pod may be a mostly self-contained zone of computing devices networked together according to a particular computing architecture, such as a rack of servers configured to optimize machine learning operations. In at least one embodiment, a pod is referred to as a cluster. In at least one embodiment, pod-balancing operations include adjusting power consumption and/or clock frequency of one or more processors of a pod to fit within a power budget. In at least one embodiment, superpod-balancing operations, such as superpod-level power balancing, is based, at least in part, on one or more soft error rates, wherein a superpod is a larger-scale version of a pod, such as a supercomputer. In at least one embodiment, superpod-balancing operations include adjusting power consumption and/or clock frequency of one or more processors of a superpod to fit within a power budget.

In at least one embodiment, one or more of processors 104*a-n* may be a single-core processor, a multi-core processor, a graphics processor, a parallel processor, or a general purpose processor, or some combination thereof. In at least one embodiment, processors 104*a-n* represent cores of a processor, wherein a core is a separate processing unit that executes computing instructions. In at least one embodiment, one or more of processors 104*a-n* are implemented on a system-on-chip (SoC). In at least one embodiment, one or more of processors 104*a-n* operate with an operating voltage up to a limit via one or more power rails, wherein a power rail limits all processors associated with that power rail to an operating voltage. In at least one embodiment, processors 104*a-n* are part of a processor group sorted by activity factor, a metric related to an application's workload and described further herein at least in conjunction with FIG. 1. In at least one embodiment, processors 104*a-n* are part of a processor group sorted by workload factor, a metric related to activity factor and described further herein at least in conjunction with FIGS. 1-2. In at least one embodiment, two or more of processors 104*a-n* are part of a multi-processor device designed to perform operations within a data center context, wherein a data center is further described herein at least in conjunction with FIGS. 1 and 10. In at least one embodiment, a multi-processor device is referred to as a superchip. In at least one embodiment, a multi-processor device includes two or more different types of processors, such as a central processing unit (CPU) and a graphics processing unit (GPU), to create a heterogenous computing environment. In at least one embodiment, a multi-processor device includes two or more processors of a single type, such as two CPUs, to create a homogenous computing environment. In at least one embodiment, one or more processors (not shown) in addition to processors 104*a-n* are communicatively connected to one or more of processors 104*a-n*. In at least one embodiment, one or more controllers (not shown) in addition to controller 102 are communicatively connected to one or more of processors 104*a-n*. In at least one embodiment, one or more of processors 104*a-n* is an integrated circuit.

In at least one embodiment, one or more processors 104*a-n* is an element of a data processing unit (DPU), a multi-component device including one or more types of processors such as accelerated processing units (APUs) central processing units (CPUs), graphics processing units (GPUs), or some combination thereof. In at least one embodiment, one or more processors 104*a-n* includes two or more devices connected by a cache-coherent interconnect, wherein cache-coherency refers to maintaining consistency and/or uniformity of data stored in multiple memory devices such as caches in at least one embodiment, a cache-coherent interconnect is referred to as a coherent interconnect. In at least one embodiment, one or more of processors 104*a-n* is an element of a processing system such as processing system 2900 described herein. In at least one embodiment, one or more of processors 104*a-n* is an element of a system, such as system 3100. In at least one embodiment, one or more of processors 104*a-n* is an element of computing system 3300 described herein. In at least one embodiment, one or more of processors 104*a-n* are located on-premises, in a cloud, or some combination thereof. In at least one embodiment, one or more of processors 104*a-n* is an element of a data center, such as data center 1000 described herein.

In at least one embodiment, one or more of processors 104*a-n* is a data processing unit (DPU). In at least one embodiment, one or more of processors 104*a-n* is a type of XPU such as an application-specific processor including CPUs, GPUs field-programmable gate arrays (FPGAs), vision processing units (VPUs), digital signal processors (DSPs), tensor processing units (TPUs), and application-specific integrated circuits (ASICs), or some combination thereof. In at least one embodiment, one or more of processors 104*a-n* is a data center processor (e.g., AMD® Instinct™, AMD® EPYC™, Intel® Xeon™, NVIDIA® Data Center GPUs). In at least one embodiment, one or more of processors 104*a-n* is an accelerator such as specialized hardware circuitry configured to and/or implemented with functions to perform certain operations with higher performance or greater energy efficiency over more generalized hardware. In at least one embodiment, one or more of processors 104*a-n* is an APU such as APU 3400 described herein. In at least one embodiment, one or more of processors 104*a-n* is a CPU such as CPU 3500 described herein. In at least one embodiment, one or more of processors 104*a-n* is a general-purpose graphics processing unit (GPGPU) such as GPGPU 38B. In at least one embodiment, one or more of processors 104*a-n* is a parallel processing unit (PPU) such as PPU 3902 described herein. In at least one embodiment, one or more of processors 104*a-n* is a GPU. In at least one embodiment, one or more of processors 104*a-n* is a virtual CPU (vCPU).

In at least one embodiment, one or more of processors 104*a-n* is an x86 processor, a processor that supports an x86 instruction set architecture. In at least one embodiment, one or more of processors 104*a-n* is an ARM processor, a processor that supports a Reduced Instruction Set Computer (RISC) instruction set architecture. In at least one embodiment, one or more of processors 104*a-n* is running on a cluster, a collection of standalone computers networked together. In at least one embodiment, a cluster can include a high-performance computing (HPC) cluster. In at least one embodiment, one or more of processors 104*a-n* is connected to other processors (not shown).

In at least one embodiment, one or more of processors 104*a-n* operates up to and/or within a range of a maximum operating temperature that is set to allow one or more of processors 104*a-n* to reliably operate for a targeted lifespan. In at least one embodiment, a maximum operating temperature is based, at least in part, on a maximum thermal junction temperature (Tjmax) that a processor will allow prior to using internal thermal control mechanisms to reduce power and limit temperature. In at least one embodiment, Tjmax is set by a user (or an application). In at least one embodiment, a maximum operating temperature is based, at least in part, on any temperature associated with operating a processor, including a processor's maximum case temperature (Tcmax). In at least one embodiment, an average operating temperature is based, at least in part, on an overall average thermal junction temperature (Tjavg) for a group of processors. In at least one embodiment. Tjavg is a value that is measured and calculated as a group of processor operates. In at least one embodiment, Tjavg is a target value at which a group of processors attempts to operate and is set by a user (or an application). In at least one embodiment, a thermal junction temperature observed during operation of a processor is referred to as Tj. In at least one embodiment, Tj max is referred to as Tj when noted as such. In at least one embodiment, Tjavg is referred to as Tj when noted as such. In at least one embodiment, one or more processors 104*a-n* operates up to maximum operating value e.g., clock frequency, operating voltage) based, at least in part, on a thermal design power (TDP) value that represents a maximum amount of heat generated by a processor that a cooling system is configured to dissipate under a workload.

In at least one embodiment, one or more of processors 104*a-n* operates up to a maximum clock frequency (Fmax), wherein clock speed refers to a frequency at which a clock generator of a processor can generate pulses, which are used to synchronize operations of its components and is used as an indicator of said processor's speed. In at least one embodiment, clock frequency is referred to as clock or clock speed. In at least one embodiment, Fmax is set by a user (or an application). In at least one embodiment, Fmax varies between processors manufactured to identical specifications due to variations created during manufacture. In at least one embodiment, a user (or an application) sets a target clock speed for one or more processors 104*a-n* at which to operate. In at least one embodiment, a target clock speed for one or more processors 104*a-n* is set by one or more models, such as clock speed models 106*a-n*, which are described further herein at least in conjunction with FIG. 1. In at least one embodiment, clock speed is measured in a number of cycles per second (e.g., megahertz (MHz), gigahertz (GHz)).

In at least one embodiment, one or more of processors 104*a-n* exhibit an activity value, wherein an activity value is any value that indicates a level of processor usage and/or processor activity over a specified period of time. In at least one embodiment, a controller, such as controller 102, monitors an activity value exhibited by a processor. In at least one embodiment, a controller determines an activity value of a processor by, at least in part, accessing a table that correlates applications, or portions of applications, with activity values; for example, if a controller 102 receives information that a processor is performing a specific portion of an application, controller 102 accesses a table and looks up what activity value is associated with that portion of that application. In at least one embodiment, an activity factor (A) is an activity value related to a number of times a processor switches from off to on within a clock cycle and is dependent on a task being executed by a processor; for example, an application that includes tasks that require many calculations over a period of time would cause an AF higher than an AF caused by an application requiring fewer calculations over that same period of time. In at least one embodiment, dynamic capacitance (Cdyn) is a capacitance of a processor related to an amount of supply voltage. In at least one embodiment, dynamic power is a product of activity, factor, Cdyn, voltage squared (e.g., $V_{dd}^2$), and clock frequency. In at least one embodiment, total power is a sum of dynamic power with leakage power (static power consumption). In at least one embodiment, total power is a sum of dynamic power (power as a function of time) with leakage power (static power consumption), as expressed with a function such as:

Total Power=Leakage Power+Dynamic Power, wherein dynamic power is expressed with a function such as:

Dynamic Power=Activity Factor*Cdyn*Voltage^2*Frequency

In at least one embodiment, one or more of processors 104a-n exhibit a workload factor (WF), wherein WF is an activity value that is a product (multiplication) of an activity factor and Cdyn. In at least one embodiment, a workload factor is based, at least in part, on total power of a processor as detected by a sensor connected to said processor. In at least one embodiment, a workload factor is based, at least in part, on an analog-to-digital converter (ADC) voltage at a settled frequency. In at least one embodiment, a workload factor is calculated dynamically by subtracting leakage power from a total power observed and dividing the result by an observed voltage and frequency. In at least one embodiment, leakage power is an estimate based, at least in part, on simulated models of specific processors. In at least one embodiment, WF is expressed with a function such as:

Workload Factor=Activity Factor*Cdyn

In at least one embodiment, one or more of processors 104a-n experience errors, such as physical failures, operational failures, signal failures, data failures, or some combination thereof and as described further herein at least in conjunction with FIGS. 1 and 6. In at least one embodiment, an error rate is a number of errors that a processor experiences, or is predicted to experience, during a specified period of time. In at least one embodiment, one or more of processors 104a-n experience one or more soft errors, wherein a soft error is a transient or temporary malfunction in those processors' performance. In at least one embodiment, a soft error includes an unintended signal or incorrect data. In at least one embodiment, a soft error is a computational error. In at least one embodiment, a soft error is an operational error. In at least one embodiment, a soft error is referred to as a single event upset (SEU). In at least one embodiment, a rate at which a system or device is experiencing or is estimated to experience soft errors is referred to as a soft error rate (SER). In at least one embodiment, a processor's SER is based, at least in part, on operating factors such as operating voltage, operating temperature, clock frequency, or some combination thereof. In at least one embodiment, when a processor's operating voltage increases, that processor's SER increases, and when a processor's operating voltage decreases, that processor's SER decreases. In at least one embodiment, a device that includes two or more processors has an overall error rate, such as an overall SER, calculated by, summing together individual SERs of each processor, which is described further herein at least in conjunction with FIG. 6. In at least one embodiment, a processor's SER is based on a model of that processor, wherein that model is based on empirical and/or simulated testing. In at least one embodiment, modeling a processor is referred to as characterizing that processor. In at least one embodiment, controller 102 determines a processor's SER by accessing a table, such as reliability table 108 described further herein at least in conjunction with FIGS. 1-8, that correlates a processor's SER with a range of operating conditions. In at least one embodiment, a SER is a number of defective parts per million (DPPM) that occur over a specified period of time. In at least one embodiment, SER is referred to as DPPM, with DPPM being implied as a rate. In at least one embodiment, a DPPM value represents a number of processor part failures that are estimated to occur over a period of time (e.g., 5 years, 10 years). In at least one embodiment, SER is based, at least in part, on one or more silicon degradation types. In at least one embodiment, silicon degradation types are referred to as silicon wearout failure modes. In at least one embodiment, a silicon degradation type that contributes to SER is time-dependent dielectric breakdown (WINO, which is a type of transistor aging and occurs when a gate dielectric breaks as a result of long-term exposure to an electric field. In at least one embodiment, a silicon degradation type that contributes to SER is bias temperature instability (an), which is a type of transistor aging and is a voltage instability that results from stresses imposed by voltage and temperature.

Figure 10:
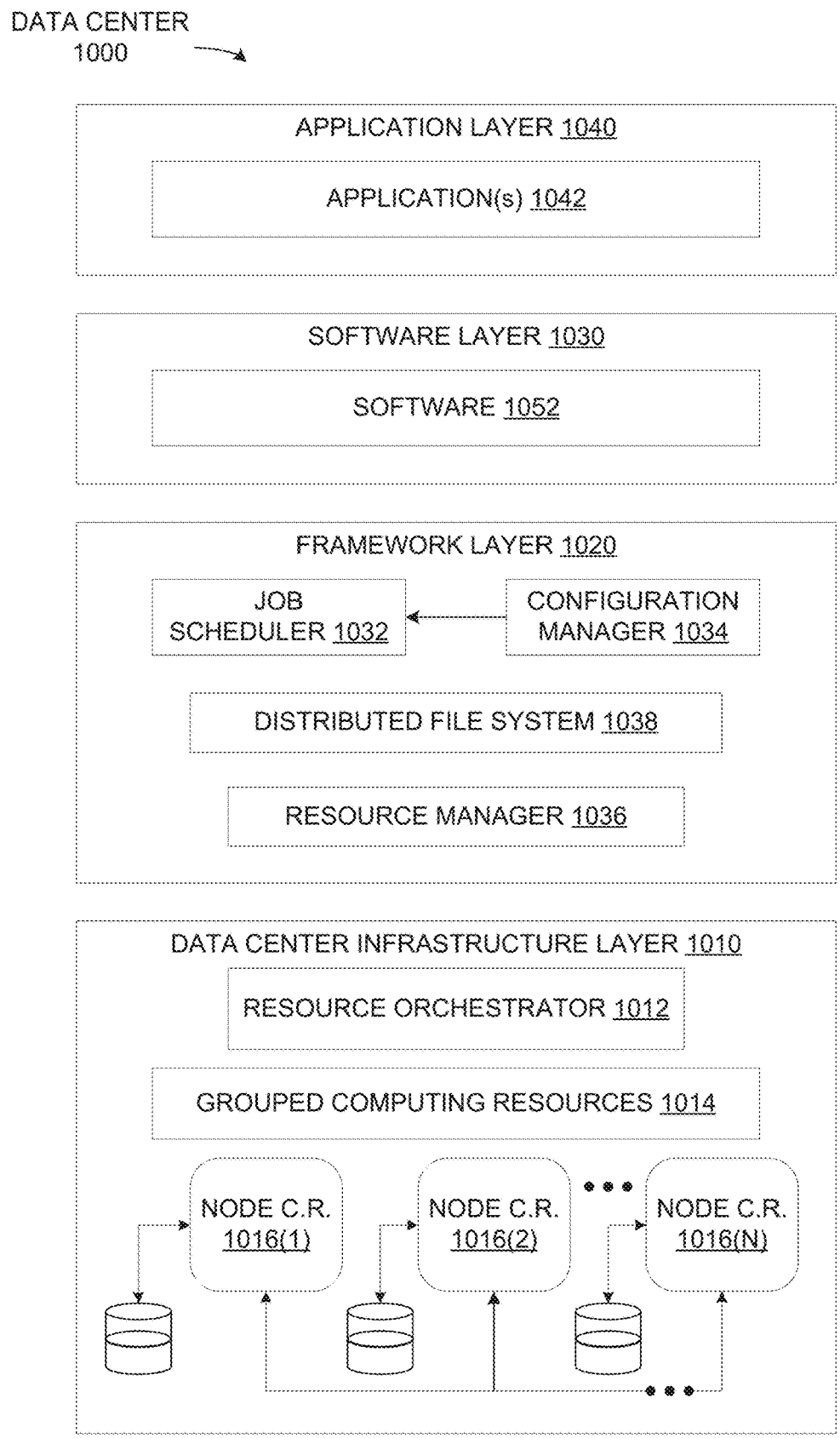
FIG. 10 illustrates an exemplary data center, in accordance with at least one embodiment.

In at least one embodiment, data center 106 is a data center as described in conjunction with FIG. 10. In at least one embodiment, data center 106 includes data centers run on-premises, in a cloud, in a hybrid cloud, with a composable infrastructure, or some combination thereof. In at least one embodiment, composable infrastructure approaches include disaggregating resources in the context of data centers, for example, include decoupling high-performance applications and workloads from underlying hardware to improve computing performance. In at least one embodiment, data center 106 is used in conjunction with artificial intelligence (AI) training and/or inferencing, operations. In at least one embodiment, two or more of controller 102 and processors 104a-n reside in different physical locations as part of a disaggregated computing network. In at least one embodiment, two or more controller 102 and processors 104a-n are connected by a network such as a 5G-Radio Access Network (RAN), described further herein at least in conjunction with FIG. 23.

In at least one embodiment, reliability table 108 is a table accessible by controller 102. In at least one embodiment, reliability table 108 is a table that correlates an error rate, such as SER, with a processor's operating voltage and/or operating frequency, such as table 400 as described further herein at least in conjunction with FIG. 4. In at least one embodiment, reliability table 108 is a table that correlates an error rate with an increased operating voltage and/or operating frequency, such as table 500 and table 700 as described further herein at least in conjunction with FIGS. 5 and 7. In at least one embodiment, reliability table 108 includes data related to two or more types of processors such as CPUs and GPUs. In at least one embodiment, reliability table 108 is stored in a memory device such as dynamic randomly addressable memory (DRAM), static randomly addressable memory (SRAM), non-volatile memory (e.g., flash memory), or other storage, as described further herein at least in conjunction with FIG. 21.

FIG. 2 illustrates a block diagram 200, representing, at least in part, relationships between a controller and processor instances to allow said processor instances to perform over a limit when said processor instances previously performed under that limit, according to at least one embodiment. One or more aspects of one or more embodiments described in conjunction with FIG. 2 can be combined with one or more aspects of one or more embodiments described herein, including embodiments described at least in conjunction with FIGS. 1 and 3-8. In at least one embodiment, diagram 200 includes controller 202, processors 204a-n, reliability table 208, and processor instances 214a-n, 216a-n, and 218a-n. In at least one embodiment, one or more of processors 204a-n are communicatively connected to controller 202. In at least one embodiment, one or more of processors instances 214a-n, 216a-n, and 218a-n, are communicatively connected to controller 202. In at least one embodiment, controller 202 is communicatively connected with credits storage 208. In at least one embodiment, one or more of processor instances 214a-n are one or more processor cores.

In at least one embodiment, controller 202 and one or more other controllers (not shown) are communicatively connected to processor groups 204a-n, wherein controllers are described further herein, at least in conjunction with FIG. 1. In at least one embodiment, controller 202 is controller 102 as described further herein at least in conjunction with FIG. 1. In at least one embodiment, controller 202 is configured to receive telemetry data from processor instances 214a-n, 216a-n, 218a-n (instance telemetry), such as an operating workload factor and an operating clock frequency, which is described further herein at least in conjunction with FIG. 2. In at least one embodiment, controller 202 is configured to associate a specific SER with a processor that is operating under specific conditions and/or performing specific computing instructions, wherein associating that SER is described further herein at least in conjunction with FIGS. 1-8.

In at least one embodiment, diagram 200 includes processors 204a-n as described further herein and at least in conjunction with FIGS. 1-2. In at least one embodiment, one or more of processors 204a-n are one or more of processors 104a-n as described further herein at least in conjunction with FIG. 1. In at least one embodiment, one or more processors 204a-n are used, at least in part, to perform artificial intelligence (AI) training and/or inferencing tasks. In at least one embodiment, one or more of processors 204a-n are partitioned into separate processor instances 214a-n, 216a-n, 218a-n, providing multiple users with separate processor resources for optimal processor utilization. In at least one embodiment, a Gal may be partitioned into a number of separate GPU instances (e.g., 7 instances) to each be used by different users. In at least one embodiment, processor instances 214a-n, 216a-n, 218a-n are virtual processor instances. In at least one embodiment, one or more of processor instances 214a-n, 216a-n, 218a-n have separate and isolated paths through a memory system, such as paths to on-chip crossbar ports, L2 cache banks, memory controllers, and DRAM address busses.

In at least one embodiment, reliability table 208 is a table accessible by controller 202. In at least one embodiment, reliability table 208 is reliability table 108, table 400, table 500, table 700, or some combination thereof, as described further herein at least in conjunction with FIGS. 1, 4-5, and 7. In at least one embodiment, reliability table 208 includes information that correlates an error rate, such as SER, with a processor instance that is operating under specific conditions. In at least one embodiment, reliability table 208 includes information that correlates increases in operating voltage (voltage boosts) with operating factors such as Tjmax, Vmax, SER, DPPM, or some combination thereof. In at least one embodiment, voltage boosts for a processor instance operating under specific conditions are based, at least in part, on operating conditions of two or more other processor instances, which is described further herein at least in conjunction with FIGS. 4 and 7. In at least one embodiment, reliability table 208 includes data related to two or more types of processor instances such as GPU instances and CPU instances. In at least one embodiment, reliability table 208 includes information on how much to increase a Vmax of a processor instance based, at least in part, on operating conditions of that processor instance.

Figure 3:
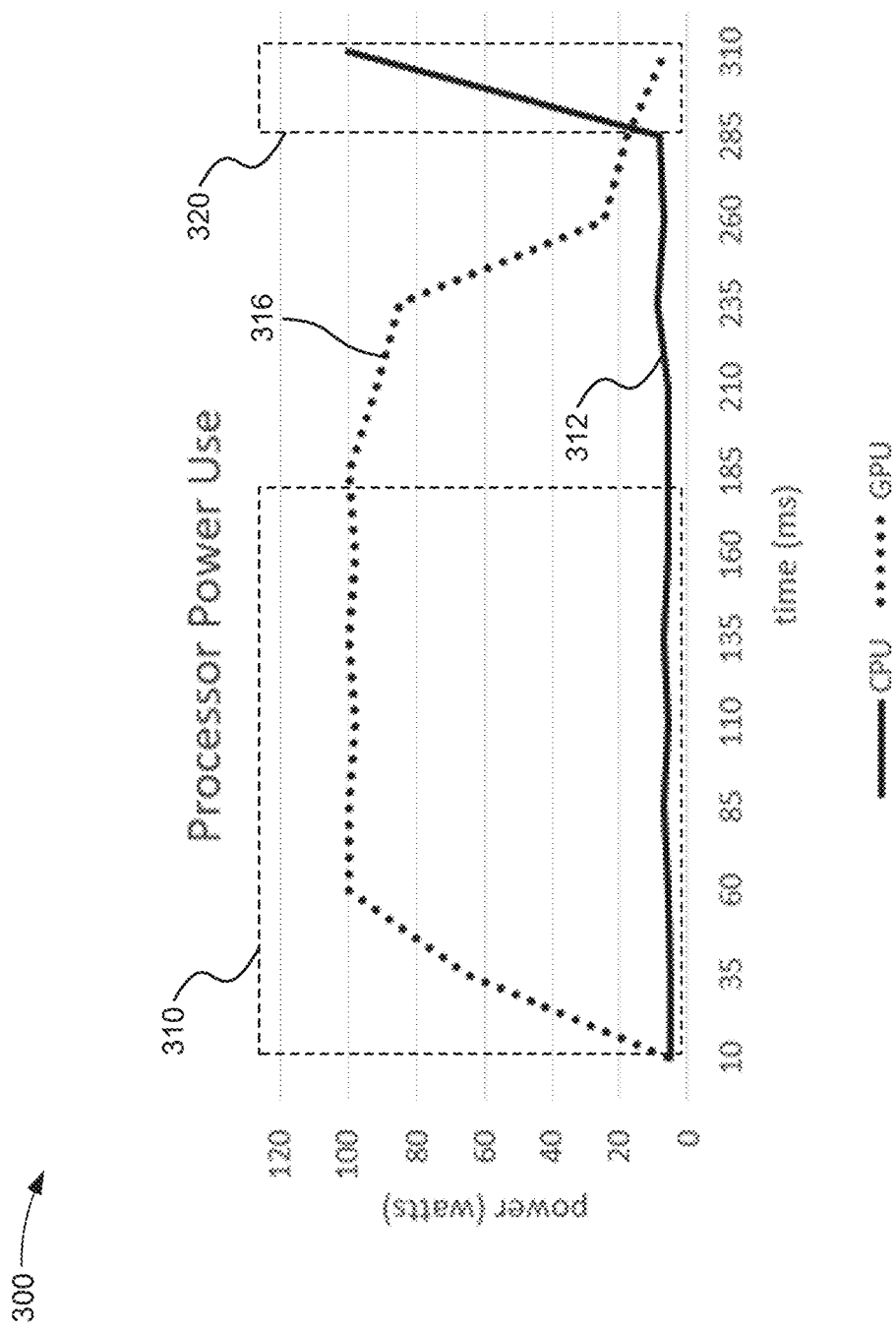
FIG. 3 illustrates a plot of processor power use used to represent data included in optimizing processor performance, according to at least one embodiment.

FIG. 3 illustrates a plot 300 (not drawn to scale) of power delivered to multiple processors as they perform an application, according to at least one embodiment. In at least one embodiment, one or more aspects of one or more embodiments described in conjunction with FIG. 3 are combined with one or more aspects of one or more embodiments described herein, including embodiments described at least in conjunction with FIGS. 1-2 and 4-8. In at least one embodiment, plot 300 includes a CPU plot line 312 and GPU plot line 316 that indicate power consumption of those processors as a function of time in milliseconds. In at least one embodiment, CPU plot line 312 and GPU plot line 316 represent power consumption of two or more of processors 104a-n as described further herein at least in conjunction with FIG. 1. In at least one embodiment, plot 300 indicates processor utilization as two or more processors perform an application, wherein processor utilization is a measure of how much time a processor is in use during a fixed period of time. In at least one embodiment, plot 300 indicates processor utilization of 100% for the entire period from 10 ms to 310 ms of processing an application but indicates varying power consumption during that period. In at least one embodiment, plot 300 indicates power consumption that is correlated with Vmax. In at least one embodiment, a plot, similar to plot 300, is based on one more processors' Vmax, clock frequency, operating temperature, error rate, or some combination thereof and is used to represent modification of one or more operating factors of those one or more processors.

In at least one embodiment, plot 300 indicates that an application causes each processor to consume a level of power based on a number and/or types of instructions being performed by each processor. In at least one embodiment, plot 300 indicates a period of time for a GPU boost 310 between approximately 10 ms and 185 ms. In at least one embodiment, a controller, such as controller 202 as described further herein at least in conjunction with FIG. 2, causes GPU boost 310 after determining that both a CPU and GPU are operating with an overall (total) error rate, such as an overall DPPM or overall SER, below a specified threshold. In at least one embodiment, a GPU boost 310 is based, at least in part, on an threshold error rate across two or more processors belonging to a plurality of processors. In at least one embodiment, a threshold error rate across two or more processors is referred to as an overall error rate for two or more processors. In at least one embodiment, controller 202 causes GPU boost 310 after determining that an application does not require a certain level of utilization from another processor, such as a CPU. In at least one embodiment, an overall error rate is calculated by summing together each processor's individual error rate. In at least one embodiment, plot 300 indicates a period of time for a CPU boost 320 after determining that both a CPU and GPU are operating with an overall error rate below a specified threshold. In at least one embodiment, a controller causes GPU boost 310 and GPU boost 320 as described further herein at least in conjunction with FIGS. 4-8. In at least one embodiment, a controller causes a GPU boost 310 and/or a CPU boost 320 while keeping those processors within threshold clock frequency values as implemented in firmware to prevent one or more processors from operating below a minimum clock frequency and from operating above a maximum clock frequency. In at least one embodiment, threshold clock frequency values are referred to as guardbands (GB). In at least one embodiment, threshold clock frequency values are determined based, at least in part, on an operating voltage and/or operating temperature of a processor.

FIG. 4 illustrates a table 400 representing processor performance modified based, at least in part, on error rate (ER), according to at least one embodiment. In at least one embodiment, one or more aspects of one or more embodiments described in conjunction with FIG. 4 are combined with one or more aspects of one or more embodiments described herein, including embodiments described at least in conjunction with FIGS. 1-3 and 5-8. In at least one embodiment, table 400 includes example CPU operational values 430 and example GPU operational values 440 observed during a fraction of a second while said. CPU and GPU perform one or more applications. In at least one embodiment, table 400 includes values based on a two processors connected on a single board, such as a GPU configured to work in conjunction with a CPU on a board via a coherent interconnect as with a superchip. In at least one embodiment, table 400 bases its error rate values on soft errors. In at least one embodiment, table 400 bases its error rate values on DPPM. In at least one embodiment, table 400 includes example CPU values 430 associated with a CPU running an application, wherein those values include CPU usage (utilization), CPU Vmax, CPU Tjmax, CPU Fmax, and CPU ER. In at least one embodiment, table 400 includes example GPU values 440 associated with a GPU running an application, wherein said values include GPU usage utilization), GPU Vmax, GPU Tj max, and GPU ER. In at least one embodiment, Vmax is an operating voltage of a processor. In at least one embodiment, to increase an operating voltage of a processor, a controller, such as controller 102, increases that processor's Vmax. In at least one embodiment, a controller adjusts a processor's operating voltage by adjusting power delivered through a power rail associated with that processor. In at least one embodiment, a controller causes an operating voltage of a processor to be increased while one or more other processors run at or below threshold operation voltage. In at least one embodiment, a controller causes an operating voltage of a processor to be increased while one or more other processors run at a maximum operating voltage.

In at least one embodiment, a controller decreases an operating voltage of a processor by decreasing that processor's Vmax. In at least one embodiment, Fmax is an operating frequency of a processor. In at least one embodiment, to increase an operating frequency of a processor, a controller increases that processor's Fmax. In at least one embodiment, Tjmax is an operating temperature of a processor. In at least one embodiment, a controller measures a processor's Tjmax using as sensor installed on that processor. In at least one embodiment, table 400 illustrates, conceptually, one processor trading its allotted but unused error rate with another processor so that a device, such a superchip, can achieve improved overall performance while remaining within an overall threshold error rate; for example, a CPU's operating voltage can be increased until that CPU exhibits an error rate of 1.98 because a GPU exhibits an error rate of 0.02 and an overall threshold error rate for a device is 2, which is described further herein at least in conjunction with FIG. 7.

In at least one embodiment, table 400 includes a total error rate for a device based on a CPU and GPU's individual error rates. In at least one embodiment, table 400 includes a total error rate of 2, which is set by a user (or an application) as a threshold value. In at least one embodiment a threshold total error rate represents a total number of errors between two processors that a user can tolerate over a fixed period of time 5 years). In at least one embodiment, one or more error rate values are estimates and predictions of how many soft errors will occur within a fixed period of time. In at least one embodiment, CPU ER, GPU ER, and total ER is based, at least in part, on a metric (indication) associated with degradation of a processor, which is described further herein at least in conjunction with FIG. 7. In at least one embodiment, CPU ER, GPU ER, and total ER is based, at least in part, on a metric associated with a probable number of defects on a processor. In at least one embodiment, CPU ER, GPU ER, and total ER is based, at least in part, on a permissible number of failures set by a user (or configured by an application). In at least one embodiment, table 400 lists default values for a CPU and GPU implemented to work together as a superchip. In at least one embodiment, values in default row 410 represent default operating values that would be observed if a controller did not modify performance of either of those processors. In at least one embodiment, values found default row 410 are example values for a default (base) case, a situation in which a processor's operating factors have been set based on an assumption that a CPU and a GPU will run at a 100% usage rate whenever one or more applications are run on said CPU and GPU. In at least one embodiment, values for table 400's base case are based, at least in part, on a given error rate for a CPU, GPU, and combined CPU and GPU.

In at least one embodiment, table 400 lists a default CPU ER as 1 soft error over 5 years, which represents that one soft error is predicted to occur during 5 years of that CPU's operation. In at least one embodiment, table 400 lists a default GPU ER as 1 soft error over 5 years, which represents that one soft error is predicted to occur during 5 years of that GPU's operation. In at least one embodiment, table 400 lists a default total ER of 2, which represents a number of total predicted soft errors during a 5-year period of operation for a combined CPU and GPU superchip.

In at least one embodiment, values listed in table 400's bottom row 420 are example values for a case using modification operations, such as those described further herein, wherein a controller observes a GPU's operating voltage to determine if another processor's operating voltage, such as a CPU's operating voltage, can be boosted. In at least one embodiment, modifying operating factors for a processor is referred to as balancing. In at least one embodiment, modifying operating voltages for a processor is referred to as static Vmax balancing. In at least one embodiment, determining whether a processor's operating voltage can be boosted is described further herein at least in conjunction with FIGS. 5-6. In at least one embodiment, a sensor connected to a GPU sends information to a controller that a GPU's Vmax is 0.9 V for a fractional second of time. In at least one embodiment, a sensor connected to a GPU sends information to a controller that a GPU's Tjmax is 83° C. In at least one embodiment, because a GPU's operating voltage of 0.9 V is below a set maximum of 1.05 V and/or because a GPU's operating temperature of 83° C. is below a set maximum of 105° C., a controller accesses a table, such as reliability table 208 as described further herein at least in conjunction with FIG. 2, and retrieves information from that table indicating that a GPU operating at 0.9 V and 83° C. exhibits an error rate of 0.02. In at least one embodiment a GPU's operating voltage is below a set maximum because of an application's demands, or lack thereof, on that GPU. In at least one embodiment, a controller increases a CPU's operating voltage to 1.058 V because a CPU operating at that voltage exhibits a error rate of 1.98, which allows both that CPU and a GPU with a error rate of 0.02 to exhibit a total error rate of 2. In at least one embodiment, a controller has increased a CPU's Vmax to 1.058 V from a base case Vmax of 1.05 V, which in turn increases that CPU's Fmax from 3136 MHz to 3152 MHz. In at least one embodiment, overall performance of an application by a device improves by increasing a CPU's operating voltage while a GPU's operating voltage is below a limit, all while maintaining that device's overall error rate.

FIG. 5 illustrates a table 500 that correlates increased operating voltages with various operating values for multiple processors, according to at least one embodiment. In at least one embodiment, one or more aspects of one or more embodiments described in conjunction with FIG. 5 are combined with one or more aspects of one or more embodiments described herein, including embodiments described at least in conjunction with FIGS. 1-4 and 6-8. In at least one embodiment, a controller, such as controller 202 as described further herein at least in conjunction with FIG. 2, accesses table 500 when adjusting operating parameters for one or more processors. In at least one embodiment, table 500 is based, at least in part, on a table that correlates processor operating parameters with error rates, such as table 400 as described further herein at least in conjunction with 4. In at least one embodiment, table 500 includes example values associated with a CPU for a given period of time. In at least one embodiment, a controller adjusts operating parameters of a processor based, at least in part, on operating parameters of another processor measured by one or more sensors; for example, a controller increases a Vmax value for a processor to increase that processor's operating voltage based, at least in part, receiving an operating temperature for another processor that is below that other processor's Tjmax. In at least one embodiment, operating factors and their values listed in table 500 are based, at least in part, on error rate values that one or more processors would exhibit if they operated with those operating values. In at least one embodiment, a controller boosts a CPU's Vmax when a GPU's operating voltage is below that GPU's Vmax.

In at least one embodiment, table 500 includes values for GPU voltage, GPU operating temperature, CPU voltage, CPU operating temperature. GPU Vmax boost, CPU Vmax boost, GPU Vmax, and CPU Vmax. In at least one embodiment, values listed in table 500 are based, at least in part, on error rate values as described further herein, at least in conjunction with FIGS. 1-4 and 6-8. In at least one embodiment, table 500 includes multiple CPU and GPU example use cases such as with row 510, wherein GPU voltage is 1.05 V, GPU operating temperature is 105° C., CPU Voltage is 1.05 V, and CPU operating temperature is 105° C. In at least one embodiment, example values shown in row 510 represent a default, or base, case for operating a CPU and GPU on a superchip. In at least one embodiment, a use case as shown in row 510 results in no GPU or CPU Vmax boosts, and therefore, GPU and CPU Vmax values each remain at 1.05 V.

In at least one embodiment, table 500 includes a use case with row 512, wherein GPU voltage is 0.9 V, GPU operating temperature is 83° C., CPU voltage is 1.05 V, and CPU operating temperature is 105° C. In at least one embodiment, a use case as shown in row 512 results in a reduction in GPU Vmax by 150 mV to 0.9 V and an increase of CPU Vmax by 10 mV to 1.06 V. In at least one embodiment, a use case as shown in row 512 represents a optimization of processor use based, at least in part, one or more error rate values. In at least one embodiment, a use case as shown in row 512 represents an optimization of processor use based, at least in part, on maximizing a threshold and overall error rate for a device on which a GPU and CPU are implemented. In at least one embodiment, row 512 represents a Vmax balanced use case.

In at least one embodiment, table 500 includes a use case with row 514, wherein GPU voltage is 0.9 V, GPU operating temperature is 105° C., CPU Voltage is 1.05 V, and CPU operating temperature is 105° C. In at least one embodiment, a use case as shown in row 514 results in a reduction in GPU Vmax by 150 mV to 0.9 V and an increase of CPU Vmax by 5 mV to 1.06 V. In at least one embodiment, a processor's error rate is based, at least in part, on its operating temperature and/or operating temperature. In at least one embodiment, a use case as shown in row 514 represents an optimization of processor use based, at least in part, on maximizing a threshold and overall error rate for a device on which a GPU and CPU are implemented. In at least one embodiment, row 514 represents a Vmax balanced use case.

In at least one embodiment, table 500 includes an example use case with row 516, wherein GPU voltage is 0.8 V, GPU operating temperature is 65° C., CPU Voltage is 1.05 V, and CPU operating temperature is 105° C. In at least one embodiment, a use case as shown in row 516 results in a reduction in GPU Vmax by 250 mV to 0.8 V and an increase of CPU Vmax by 25 mV to 1.075 V. In at least one embodiment, a processor's error rate is based, at least in part, on its operating temperature and/or operating temperature. In at least one embodiment, a use case as shown in row 516 represents an optimization of processor use based, at least in part, on maximizing a threshold and overall error rate for a device on which a GPU and CPU are implemented. In at least one embodiment, row 516 represents a Vmax balanced use case.

In at least one embodiment, table 500 includes a use case with row 518, wherein GPU voltage is 0.8 V, GPU operating temperature is 65° C., CPU Voltage is 0.9 V, and CPU operating temperature is 90° C. In at least one embodiment, a use case as shown in row 518 results in no operating voltage increase to either a CPU or GPU. In at least one embodiment, a CPU and a GPI's operating voltages are not increased because that CPU's and GPU's operating voltage and operating temperature are not operating at a specified limit (e.g., Tjmax, Vmax), FIG. 6 illustrates a process 600 for optimizing performance of a processor based, at least in part, on one or more error rates, according to at least one embodiment. In at least one embodiment, one or more aspects of one or more embodiments described in conjunction with FIG. 6 are combined with one or more aspects of one or more embodiments described herein, including embodiments described at least in conjunction with FIGS. 1-5 and 7-8. In at least one embodiment, one or more aspects of process 600 are performed by a controller, such as controller 202 as described further herein at least in conjunction with FIG. 1. In at least one embodiment, a controller performs one or more operations of process 600 by accessing a table that correlates processor operating parameters with Vmax boosts, such as table 500 as described further herein at least in conjunction with FIG. 5. In at least one embodiment, a controller performs one or more operations of process 600 by accessing a table that correlates processor operating parameters with clock frequency boosts, such as table 700 as described further herein at least in conjunction with FIG. 7. In at least one embodiment, two or more of operations performed as part of process 600 can be performed in various orders and/or concurrently. In at least one embodiment, process 600 begins with operation 610 by obtaining an error rate for one or more processors, as described further herein at least in conjunction with FIGS. 1-5 and 7-8. In at least one embodiment, a controller obtains an error rate of one or more processors by accessing and retrieving data from one or more tables that correlate a processor's operating conditions with error rate values, such as table 400, table 500, table 700, or some combination thereof and as described further herein at least in conjunction with FIGS. 4, 5, and 7. In at least one embodiment, a controller obtains an error rate for a processor by receiving data from a model and/or a sensor implemented on that processor to dynamically output error rate values to another device such as that controller. In at least one embodiment, a controller obtains an error rate by first measuring a processor's operating voltage and/or operating temperature and then accessing a table, such as table 400, table 500, table 700, or some combination thereof, to correlate those measurements with an error rate. In at least one embodiment, an error rate used as part of operation 610 is based on soft errors and/or DPPM. In at least one embodiment, process 600 is based, at least in part, on DPPM values and a controller obtains a DPPM value for a processor by using a equation such as:

$$\text{DPPM} = f(\text{processor } V\text{max}, \text{processor } Tj) \tag{1}$$

In at least one embodiment, Tj is replaced with a processor's Tjmax in Equation 1.

In at least one embodiment, process 600 continues with operation 612 by calculating whether a processor is operating below a threshold error rate. In at least one embodiment, process 600 continues with operation 612 by calculating whether a multi-processor device, such as a superchip, is operating below an overall threshold error rate. In at least one embodiment, a controller calculates whether a processor is operating below a threshold error rate by comparing an error rate obtained with operation 610 with a threshold error rate input by a user into a memory device such as inforom, a non-volatile storage device implemented on a GPU that stores information related to operating parameters. In at least one embodiment, operation 612 includes determining whether increasing an error rate of a processor by increasing operating parameters, such as Vmax and/or Tjmax, would increase performance of an application, for example, by decreasing an application's processing time. In at least one embodiment, determining whether increasing a processor's operating parameters would increase performance of an application is based, at least in part, on a table correlating operating parameters of a processor with performance of one or more portions of an application. In at least one embodiment, operation 612 includes determining whether increasing a processor's operating parameters would increase and/or exceed a power consumption budget for that processor and/or a device on which that processor operates. In at least one embodiment, a power consumption budget is referred to as a total graphics power (TGP) budget. In at least one embodiment, if a controller determines that a processor is operating at or above an error rate threshold, process 600 continues by returning to performing operation 610. In at least one embodiment, process 600 is based, at least in part, on DPPM values and a controller calculates a total DPPM for a device (system) with a equation such as:

$$\text{Total System DPPM} = \text{DPPM of processor1} + \text{CPU of processor2} \tag{2}$$

If a controller determines that a processor is operating with an error rate below a threshold, process 600 continues with operation 614 by increasing an operating parameter, such as operating voltage and/or operating frequency, of that processor to meet that error rate threshold. In at least one embodiment, increasing operating voltage and/or operating frequency of a processor is based, at least in part, on retrieving data from a table such as table 500 and/or table 700. In at least one embodiment, operation 614 increases an operating parameter of a processor after a controller determines with operation 612 that such an increase would improve application performance and/or keep that processor within a power consumption budget. In at least one embodiment, operation 614 increases operating parameters of one or more processors on a device, such as a superchip. In at least one embodiment, operation 614 decreases operating parameters of one or more processors on a device. Once a controller increases an operating parameter of a processor with operation 614, process 600 continues by returning to perform operation 610.

In at least one embodiment, a controller performing one or more operations of process 600 receives telemetry of operating parameters, such as operating voltages, of two or more processors such as a CPU and GPU. In at least one embodiment, a controller receives telemetry of operating parameters based, at least in part, on sensors connected to and/or installed on processors. In at least one embodiment, to perform one or more operations of process 600, a controller accesses Tjavg and Tjmax values for two or more processors. In at least one embodiment, a controller performs one or more operations of process 600 by monitoring operating temperatures of one or more processors to prevent processors from exceeding an operating temperature threshold as a result of adjustments to other operating parameters for those processors. In at least one embodiment, a controller performs one or more operations of process 600 by managing operating temperatures of one or more processors to prevent processors from exceeding an operating temperature threshold as a result of adjustments to other operating parameters for those processors. In at least one embodiment, a controller performs one or more operations of process 600 periodically so that telemetry data received from a processor can be aggregated and/or averaged. In at least one embodiment, a controller periodically performs one or more operations of process 600 based, at least in part, on periods used by a power controller such as a TGP controller. In at least one embodiment, a controller periodically performs one or more operations of process 600 based, at least in part, on periods that optimize performance of one or more processors being adjusted by that process:

In at least one embodiment, process 600 is based, at least in part, on DPPM values. In at least one embodiment, increasing an operating parameter for a processor is based, at least conceptually, on trading available DPPM as if they were credits; for example, if one processor of a device is operating with a DPPM of 0.4, which is below its threshold (allowed) DPPM of 1, that processor (or another processor)

increases its operating voltage and/or operating temperature in a way that correlates with an increased DPPM of 0.6 (1 DPPM−0.4 DPPM=0.6 DPPM). In at least one embodiment, a controller calculates an amount of DPPM available to trade by, using an equation such as:

$$\text{DPPM to trade} = \text{GPU DPPM allowed} - \text{GPU DPPM operating} \quad (3)$$

wherein "DDPM operating" is a DPPM exhibited by a processor as it operates. In at least one embodiment, "GPU DPPM allowed" and/or "GPU DPPM operating" is based, at least in part, on operating voltage (Voper) and operating temperature (Toper). In at least one embodiment, (IPU DPPM (allowed or operating) is based on a equation such as:

$$\text{GPU DPPM} = f(\text{slack in frequency margin}), \quad (4)$$

wherein a slack in frequency margins is a range between a set frequency and an operating frequency. In at least one embodiment, frequency margin represents a range of frequencies within which a processor can effectively operate. In at least one embodiment, a frequency margin is a value that represents how much lower a processor's frequency is allowed to run below an ideal and/or target frequency; for example, an ideal processor frequency may be 1 GHz, but a frequency margin of 40 MHz indicates that a processor may run down to 40 MHz below 1 GHz, or 960 MHz. In at least one embodiment, a frequency margin is a value that represents how much higher a processor's frequency is allowed to run above an ideal and/or target frequency. In at least one embodiment, a processor's operating frequency is based on a frequency margin; for example, an operating frequency of 1.04 GHz is based on a frequency margin of 40 MHz that allows a processor to operate 40 MHz above an ideal and/or target frequency. In at least one embodiment, process 600 calculates available DPPM to trade based on a voltage margin, which represents a range of operating voltages within which a processor can effectively operate. In at least one embodiment, a processor's operating frequency is referred to as its frequency margin; for example, a processor with an operating frequency of 15 MHz has a frequency margin of 15 Mhz. In at least one embodiment, slack in frequency margin is based on an equation such as:

$$\text{slack in frequency margin} = \text{GB in firmware} - \text{GB required} \quad (5)$$

wherein, "GB in firmware" represents a frequency guardband stored in firmware and as described further herein at least in conjunction with FIG. 3, and "GB required" is based on operating voltage and operating temperature. In at least one embodiment, a processor's lifetime in hours is based on an equation such as:

Equivalent hours in HTOL=Lifetime in hours*Usage at $$V\text{max}^*(V\text{oper/HTOL Voltage})\hat{\ }V\text{acc factor}^*\text{EXP}(T\text{acc factor}/0.0000862^*((1/\text{HTOL } T+273)-(1/T\text{oper})), \quad (6)$$

wherein HTOL represents high-temperature operating lifetime, a stress test that determines device reliability under a given voltage and temperature. In at least one embodiment, "Equivalent hours in HIM" represent an estimated operating lifetime of a processor based on actual usage and HTOL testing factors. In at least one embodiment, "Vacc factor" is a factor related to supply voltage for the processor. In at least one embodiment, "Tacc factor" is a factor related to operating temperature of a processor. In at least one embodiment, GB required is calculated with a equation such as:

$$\text{GB required} = \text{BTI intercept}^*(\text{Equivalent hrs in HTOL})\hat{\ }\text{BTI slope}), \quad (7)$$

wherein "GB in firmware" is a fixed number greater than "GB required."

Figure 8:
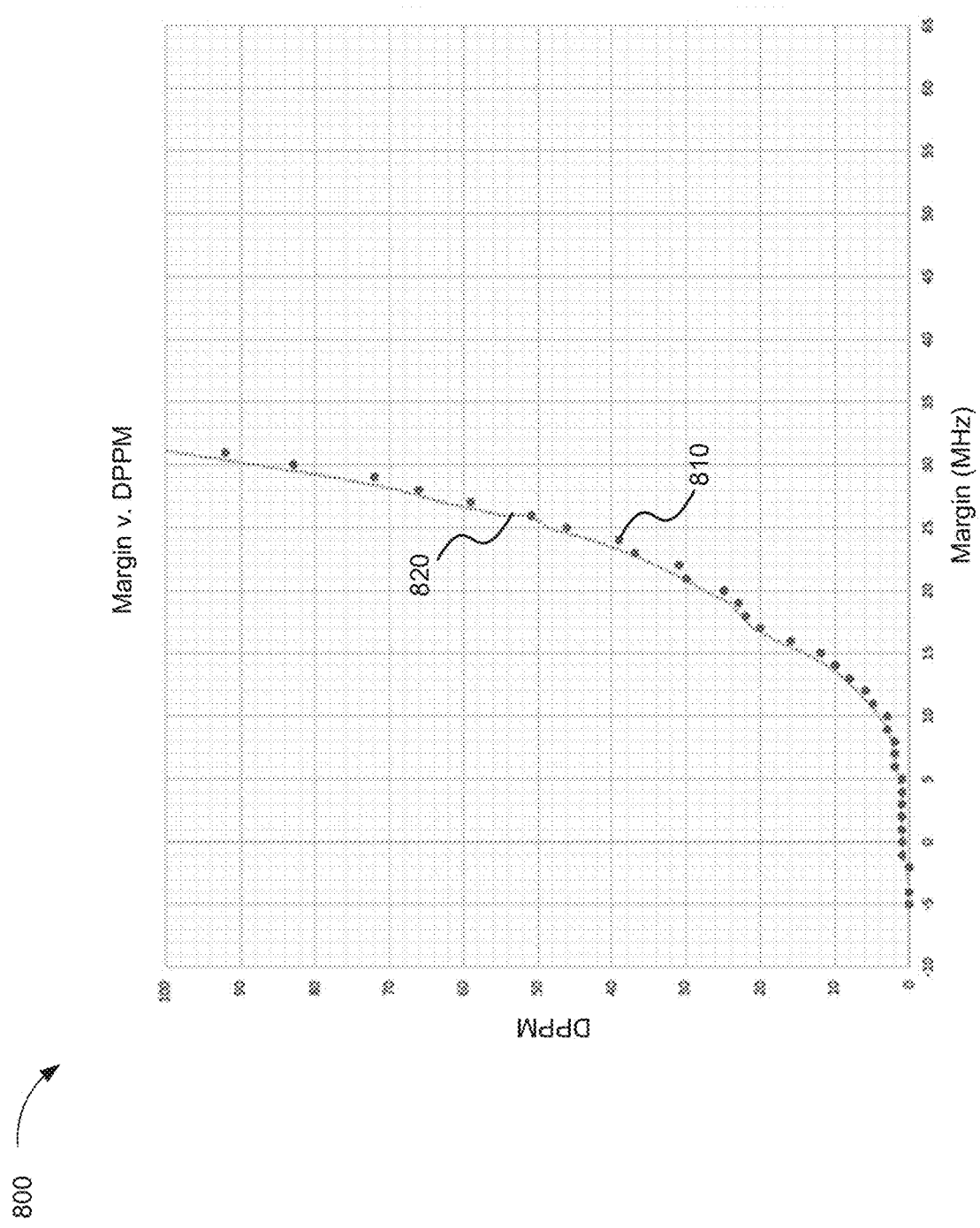
FIG. 8 illustrates a plot of reliability value as a function of a frequency value, according to at least one embodiment.

In at least one embodiment, for every 15 MHz of slack, 1 order of DPPM is gained based on empirical results of frequency margins to DPPM, such as those illustrated with plot 800 as described further herein in conjunction with FIG. 8.

Figure 7:
FIG. 7 illustrates a table representing how processor operating factors are modified based on an error rate, according to at least one embodiment.

FIG. 7 illustrates a table 700 representing modification of processor operating parameters based, at least in part, on error rates, according to at least one embodiment. In at least one embodiment, one or more aspects of one or more embodiments described in conjunction with FIG. 7 are combined with one or more aspects of one or more embodiments described herein, including embodiments described at least in conjunction with FIGS. 1-8. In at least one embodiment, a controller, such as controller 202 as described further herein at least in conjunction with FIG. 2, increases a Vmax of a processor based, at least in part, on frequency margins, which are described further herein at least in conjunction with FIG. 6. In at least one embodiment, a controller increases a Vmax of a processor based, at least in part, on DPPM values that are based on bias temperature instability (BTI), which is further described herein at least in conjunction with FIG. 1. In at least one embodiment, a controller increases a Vmax of a processor without increasing that processor's wear due to BTI. In at least one embodiment, a base clock frequency for a processor is a default clock frequency set by a user. In at least one embodiment, table 700 includes example values associated with a CPU and a GPU while those processors perform one or more applications.

In at least one embodiment, table 700 includes example values associated with a CPU running an application, wherein those values include CPU usage (utilization), CPU Tjmax, CPU Vmax, CPU frequency margin stored in firmware, CPU frequency margin needed, CPU BTI frequency margin needed after balancing, CPU BTI DPPM, CPU frequency improvement (increase), CPU frequency, and CPU frequency upside. In at least one embodiment, table 700 includes example values associated with a GPU running an application, wherein those values include GPU usage (utilization), GPU Tjmax, GPU's max, GPU frequency margin stored in firmware, GPU margin needed, and GPU BTI DPPM. In at least one embodiment, table 700 includes example values for an overall BTI DPPM for a device.

In at least one embodiment, a controller measures that a GPU's frequency margin as it performs an application is 15 MHz, which is 35 MHz less than its frequency margin set in firmware. In at least one embodiment, when a controller observes that a GPU's frequency margin is lower or smaller than that set in firmware, that controller accesses a table, such as table 700, that correlates that GPU's frequency margins with DPPM values to determine what DPPM that GPU is exhibiting; for example, if a GPU's frequency margin is 15 MHz, which is 35 MHz less than its frequency margin of 40 MHz in firmware, then a controller accesses table 700 and retrieves data that indicates that a GPU running at 15 MHz lower than its ideal frequency exhibits a bias temperature instability (BTI) DPPM of 0.02, wherein a DPPM is a DPPM value based on degradation effects from BTI. In at least one embodiment, a BTI DPPM value for a processor is associated with a GPU running anywhere between its lowest frequency bounded by a frequency margin and its ideal and/or target frequency. In at least one embodiment, a frequency margin is referred to as slack; for example, a GPU with a frequency margin of 40 MHz has a slack of 40 MHz and can operate at a frequency between its ideal and/or target frequency and 40 MHz below that ideal and/or target frequency. In at least one embodiment, a controller calculates that a GPU exhibits a BTI DPPM of 1 when that GPU operates with a frequency margin of 40 MHz; that controller then calculates that GPU to exhibit a BTI DPPM of 0.02 when it operates at 15 MIL below an ideal and/or target frequency; as a result, that controller calculates that GPU to have 0.98 BTI DPPM to conceptually trade with another processor when that GPU operates at 15 MHz (BTI DPPM to trade=1 BTI DPPM−0.02 BTI DPPM=0.98 BTI DPPM). In at least one embodiment, a CPU has a default BTI DPPM of 1. In at least one embodiment, a GPU can trade 0.98 of its BTI DPPM to a CPU so that CPU can operate with up to a BTI DPPM of 1.98. In at least one embodiment, a controller calculates an amount of BTI DPPM a. GPU can trade based on an equation derived from empirical test results as described further herein at least in conjunction with FIG. 8. In at least one embodiment, an equation is programmed into firmware that a controller can access and read. In at least one embodiment, an equation indicates that a GPU's DPPM shrinks by 2 orders of magnitude to 0.02 when its slack is approximately 35 MHz. In at least one embodiment, when a processor operates at a frequency below a default frequency, a controller calculates a required frequency margin based on that lower frequency; for example, when a GPU operates at a frequency 15 MHz below a default frequency, a controller calculates that a frequency margin required for that GPU is 15 MHz.

In at least one embodiment, after a controller calculates how much DPPM a (IPU can trade, that controller calculates how much it can boost CPU's Vmax to increase its operating voltage by accessing a table such as table 700. In at least one embodiment, a controller uses an equation derived from empirical test results to calculate what 0.98 in DPPM translates into frequency margins; for example, a controller uses an equation to calculate that 0.998 DPPM translates to approximately 6 MHz as a frequency margin, which correlates with a 16 MHz frequency boost. In at least one embodiment, a controller boosts a CPU's operating voltage to also boost that CPU's clock frequency as if that CPU has 46 MHz of frequency margin as opposed to a default frequency margin of 40 MHz found in firmware. In at least one embodiment, to boost a CPU's operating voltage, a CPU margin of 46 MHz is needed. In at least one embodiment, after a controller calculates that it can increase a CPU's frequency margin to 46 MHz and boost a CPU's operating voltage by 16 MHz, that controller increases that CPU's Vmax by 0.008 V from 1.050 V to 1.058 V based, at least in part, on a table that correlates operating voltages with clock frequencies. In at least one embodiment, a controller calculates how much it can boost a CPU's operating voltage by solving for Vmax using an equation such as Equation (7), which is described further herein at least in conjunction with FIG. 6. In at least one embodiment, a controller solves for Vmax using Equation (7) because a CPU's operating temperature and frequency margins are fixed.

In at least one embodiment, after a controller calculates how much it can boost a CPU's operating voltage based on values listed in table 700, that controller caps a CPU's Vmax to 0.9 V and allows that CPU's frequency to scale up based on an equation that correlates voltage to frequency, resulting in a boosted CPU clock frequency of 3152 MHz, which correlates with a CPU frequency upside of 0.5% (frequency increase baseline frequency×100=16 MHz÷3136 MHz× 100=0.05%). In at least one embodiment, after boosting a CPU's clock frequency, a frequency margin needed afterwards is 40 MHz.

FIG. 8 illustrates a plot 800 of DPPM values as a function of frequency margin, according to at least one embodiment. In at least one embodiment, one or more aspects of one or more embodiments described in conjunction with FIG. 8 are combined with one or more aspects of one or more embodiments described herein, including embodiments described at least in conjunction with FIGS. 1-7. In at least one embodiment, plot 800 includes empirically-derived data points such as data point 810 used to correlate frequency margins with an error value such as DPPM. In at least one embodiment, a controller, such as controller 202 as described further herein at least in conjunction with FIG. 2, accesses data from plot 800 to retrieve a DPPM value that correlates with a frequency margin. In at least one embodiment, plot 800 correlates frequency margins with an error rate such as a DPPM rate or soft error rate. In at least one embodiment, plot 800 includes a curve 820 fitted to the empirically-derived data points. In at least one embodiment, plot 800 is derived empirically by recording DPPM results from a test of one or more processors subjected to a range of frequency margins. In at least one embodiment, an increase in frequency margin correlates with an increase of DPPM values. In at least one embodiment, plot 800 is used to derive a function that represents a correlation between frequency margins and DPPM values. In at least one embodiment, a controller accesses a table based on data included in plot 800 to retrieve an error value, such as a DPPM value or soft error rate value, that correlates with a frequency margin. In at least one embodiment, plot 800 indicates that for every 15 MHz of slack, approximately 1 order of DPPM is gained.

Servers and Data Centers

The following figures set forth, without limitation, exemplary network server and data center based systems that can be used to implement at least one embodiment.

Figure 9:
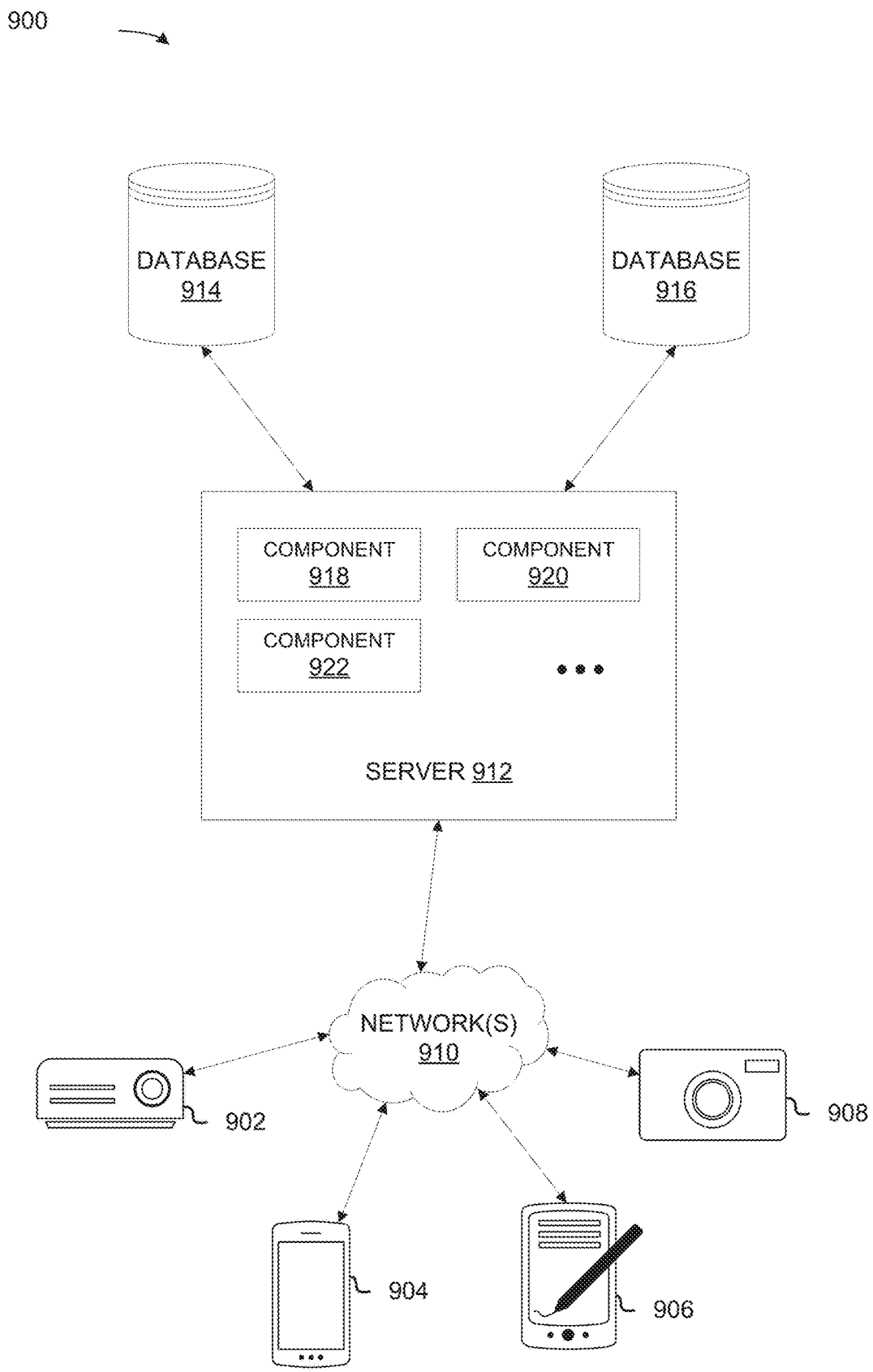
FIG. 9 illustrates a distributed system, in accordance with at least one embodiment.

FIG. 9 illustrates a distributed system 900, in accordance with at least one embodiment. In at least one embodiment, distributed system 900 includes one or more client computing devices 902, 904, 906, and 908, which are configured to execute and operate a client application such as a web browser, proprietary client, and/or variations thereof over one or more network(s) 910. In at least one embodiment, server 912 may be communicatively coupled with remote client computing devices 902, 904, 906, and 908 via network 910.

In at least one embodiment, server 912 may be adapted to run one or more services or software applications such as services and applications that may manage session activity of single sign-on (SSO) access across multiple data centers. In at least one embodiment, server 912 may also provide other services or software applications can include non-virtual and virtual environments. In at least one embodiment, these services may be offered as web-based or cloud services or under a Software as a Service (SaaS) model to users of client computing devices 902, 904, 906, and/or 908. In at least one embodiment, users operating client computing devices 902, 904, 906, and/or 908 may in turn utilize one or more client applications to interact with server 912 to utilize services provided by these components.

In at least one embodiment, software components 918, 920 and 922 of system 900 are implemented on server 912. In at least one embodiment, one or more components of system 900 and/or services provided by these components may also be implemented by one or more of client computing devices 902, 904, 906, and/or 908. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

In at least one embodiment, client computing devices 902, 904, 906, and/or 908 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaining system (e.g., a Microsoft Xbox gaming console with or without a Kinect® gesture input device), and/or a personal messaging device, capable of communicating over network(s) 910. Although distributed system 900 in FIG. 9 is shown with four client computing devices, any number of client computing devices may be supported. Other devices, such as devices with sensors, etc., may interact with server 912.

In at least one embodiment, network(s) 910 in distributed system 900 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 910 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 912 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 912 using software defined networking. In at least one embodiment, server 912 may be adapted to run one or more services or software applications.

In at least one embodiment, server 912 may run any operating system, as well as any commercially available server operating system. In at least one embodiment, server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 912 may include one or more applications to analyze and consolidate data feeds and/or event updates received from users of client computing devices 902, 904, 906, and 908, in at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 912 may also include one or more applications to display data feeds and/or real-time events via one or more display devices of client computing devices 902, 904, 906, and 908.

In at least one embodiment, distributed system 900 may also include one or more databases 914 and 916. In at least one embodiment, databases may provide a mechanism for storing information such as user interactions information, usage patterns information, adaptation rules information, and other information. In at least one embodiment, databases 914 and 916 may reside in a variety of locations. In at least one embodiment, one or more of databases 914 and 916 may reside on a non-transitory storage medium local to (and/or resident in) server 912. In at least one embodiment, databases 914 and 916 may be remote from server 912 and in communication with server 912 via a network-based or dedicated connection. In at least one embodiment, databases 914 and 916 may reside in a storage-area network (SAN). In at least one embodiment, any necessary files for performing functions attributed to server 912 may be stored locally on server 912 and/or remotely, as appropriate. In at least one embodiment, databases 914 and 916 may include relational databases, such as databases that are adapted to store, update, and retrieve data in response to SQL-formatted commands.

In at least one embodiment, at least one component shown or described with respect to FIG. 9 is used to implement techniques and/or functions described herein and at least in conjunction with FIGS. 1-8. In at least one embodiment, server 912 causes an operating voltage of one or more integrated circuits to be adjusted, based at least in part, on an error rate as described herein and at least in conjunction with FIGS. 1-8.

FIG. 10 illustrates an exemplary data center 1000, in accordance with at least one embodiment. In at least one embodiment, data center 1000 includes, without limitation, a data center infrastructure layer 1010, a framework layer 1020, a software layer 1030 and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1012 may configure or otherwise control one or more node C.R.s 1016(1)-1016(N) and/or grouped computing resources 1014. In at least one embodiment, resource orchestrator 1012 may include a software design infrastructure ("SDI") management entity for data center 1000. In at least one embodiment, resource orchestrator 1012 may include hardware, software or some combination thereof.

In at least one embodiment, as shown in FIG. 10, framework layer 1020 includes, without limitation, a job scheduler 1032, a configuration manager 1034, a resource manager 1036 and a distributed file system 1038. In at least one embodiment, framework layer 1020 may include a framework to support software 1052 of software layer 1030 and/or one or more application(s) 1042 of application layer 1040. In at least one embodiment, software 1052 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. In at least one embodiment, configuration manager 1034 may be capable of configuring different layers such as software layer 1030 and framework layer 1020, including Spark and distributed file system 1038 for supporting large-scale data processing. In at least one embodiment, resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. In at least one embodiment, resource manager 1036 may coordinate with resource orchestrator 1012 to manage these mapped or allocated computing resources.

In at least one embodiment, software 1052 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, applications) 1042 included in application layer 1040 may include one or more types of applications used by at least portions of node C.R.s 1016(1)-1016(N), grouped computing resources 1014, and/or distributed file system 1038 of framework layer 1020. In at least one or more types of applications may include, without limitation, CUDA applications, 5G network applications, artificial intelligence application, data center applications, and/or variations thereof.

In at least one embodiment, any of configuration manager 1034, resource manager 1036, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center. In at least one embodiment, at least one component shown or described with respect to FIG. 10 is used to implement techniques and/or functions described herein and at least in conjunction with FIGS. 1-8. In at least one embodiment, resource manager 1036 causes an operating voltage of one or more integrated circuits to be adjusted, based at least in part, on an error rate as described herein and at least in conjunction with FIGS. 1-8.

Figure 11:
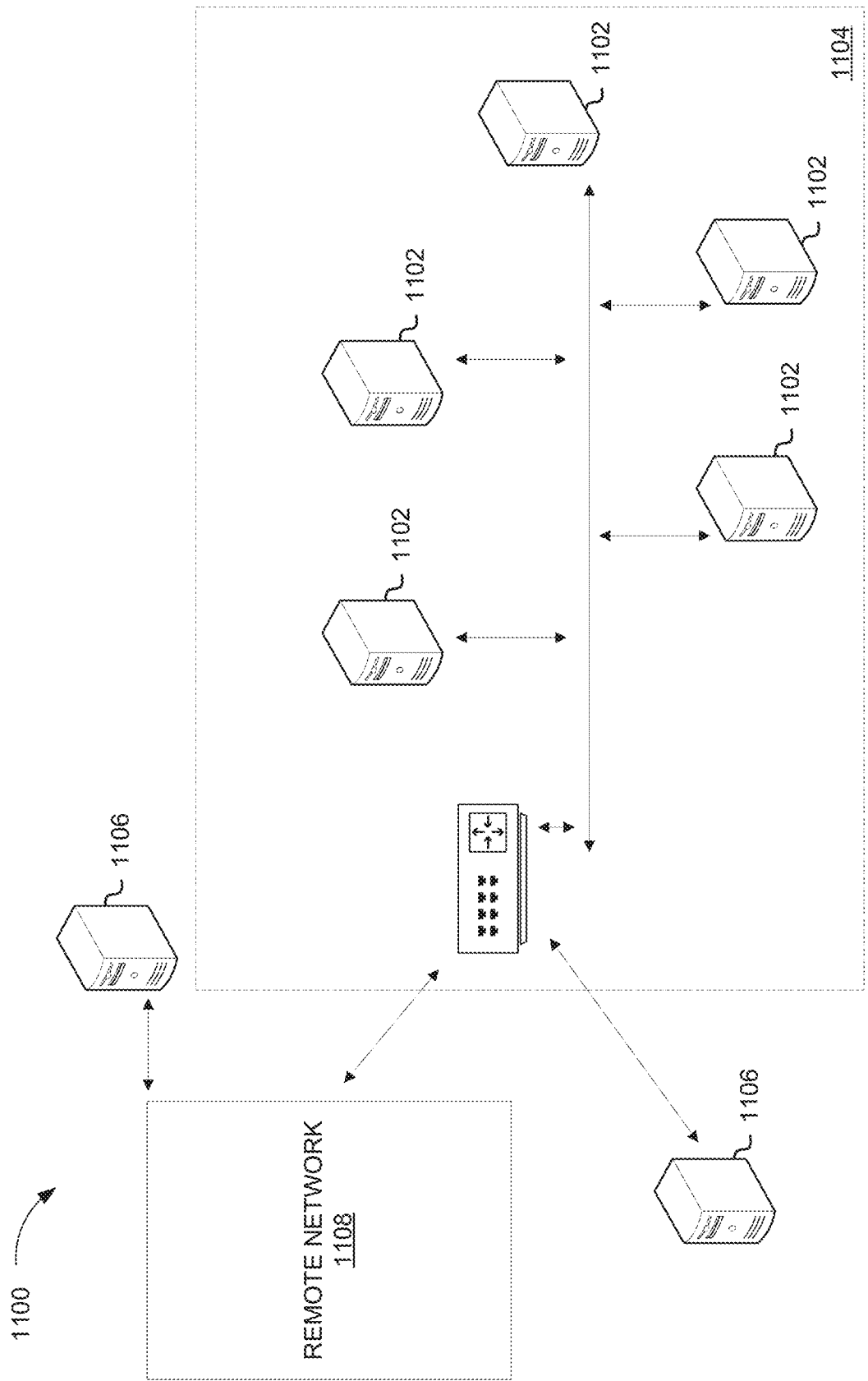
FIG. 11 illustrates a client-server network, in accordance with at least one embodiment.

FIG. 11 illustrates a client-server network 1104 formed by a plurality of network server computers 1102 which are interlinked, in accordance with at least one embodiment. In at least one embodiment, in a system 1100, each network server computer 1102 stores data accessible to other network server computers 1102 and to client computers 1106 and networks 1108 which link into a wide area network 1104. In at least one embodiment, configuration of a client-server network 1104 may change over time as client computers 1106 and one or more networks 1108 connect and disconnect from a network 1104, and as one or more trunk line server computers 1102 are added or removed from a network 1104. In at least one embodiment, when a client computer 1106 and a network 1108 are connected with network server computers 1102, client-server network includes such client computer 1106 and network 1108. In at least one embodiment, the term computer includes any device or machine capable of accepting data, applying prescribed processes to data, and supplying results of processes.

In at least one embodiment, client-server network 1104 stores information which is accessible to network server computers 1102, remote networks 1108 and client computers 1106.

In at least one embodiment, network server computers 1102 are formed by main frame computers minicomputers, and/or microcomputers having one or more processors each. In at least one embodiment, server computers 1102 are linked together by wired and/or wireless transfer media, such as conductive wire, fiber optic cable, and/or microwave transmission media, satellite transmission media or other conductive, optic or electromagnetic wave transmission media. In at least one embodiment, client computers 1106 access a network server computer 1102 by a similar wired or a wireless transfer medium. In at least one embodiment, a client computer 1106 may link into a client-server network 1104 using a modem and a standard telephone communication network. In at least one embodiment, alternative carrier systems such as cable and satellite communication systems also may be used to link into client-server network 1104. In at least one embodiment, other private or time-shared carrier systems may be used. In at least one embodiment, network 1104 is a global information network, such as the Internet. In at least one embodiment, network is a private intranet using similar protocols as the Internet, but with added security measures and restricted access controls. In at least one embodiment, network 1104 is a private, or semi-private network using proprietary communication protocols.

In at least one embodiment, client computer 1106 is any end user computer, and may also be a mainframe computer, mini-computer or microcomputer having one or more microprocessors. In at least one embodiment, server computer 1102 may at times function as a client computer accessing another server computer 1102. In at least one embodiment, remote network 1108 may be a local area network, a network added into a wide area network through an independent service provider (ISP) for the Internet, or another group of computers interconnected by wired or wireless transfer media having a configuration which is either fixed or changing over time. In at least one embodiment, client computers 1106 may link into and access a network 1104 independently or through a remote network 1108. In at least one embodiment, at least one component shown or described with respect to FIG. 11 is used to implement techniques and/or functions described herein and at least in conjunction with FIGS. 1-8. In at least one embodiment, network server computers 1102 causes an operating voltage of one or more integrated circuits to be adjusted, based at least in part, on an error rate as described herein and at least in conjunction with FIGS. 1-8.

Figure 12:
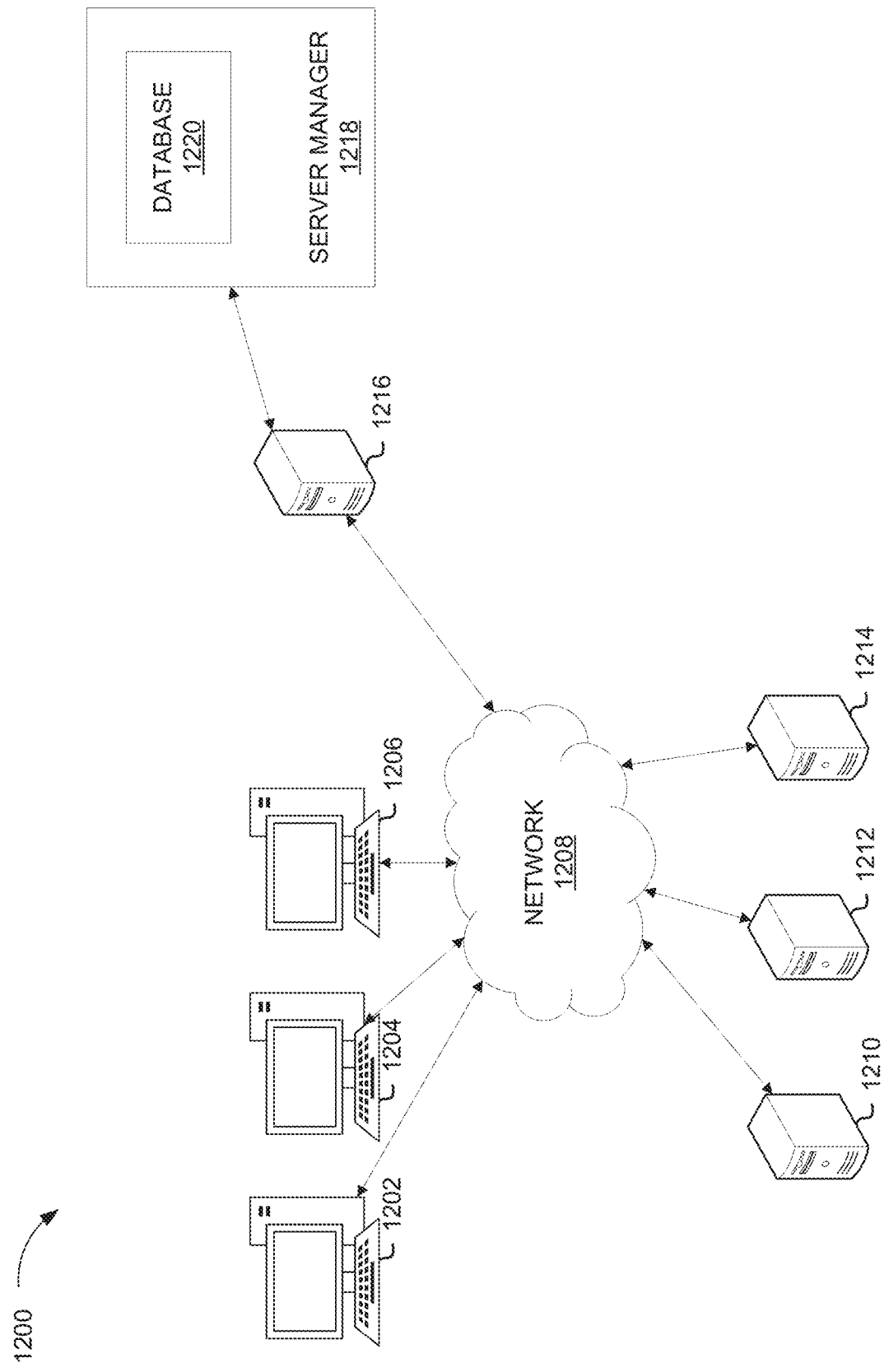
FIG. 12 illustrates an example of a computer network, in accordance with at least one embodiment.

FIG. 12 illustrates an example 1200 of a computer network 1208 connecting one or more computing machines, in accordance with at least one embodiment. In at least one embodiment, network 1208 may be any type of electronically connected group of computers including, for instance, the following networks: Internet, Intranet, Local Area Networks (LAN), Wide Area Networks (EVAN) or an interconnected combination of these network types. In at least one embodiment, connectivity within a network 1208 may be a remote modem, Ethernet (WEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1208 may include, at least in part, the world-wide public Internet which generally connects a plurality of users in accordance with a client-server model in accordance with a transmission control protocol/Internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1208 comprises the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g., www.site.com) which maps to an IP address of a network server.

In at least one embodiment, a plurality of clients 1202, 1204, and 1206 are connected to a network 1208 via respective communication links. In at least one embodiment, each of these clients may access a network 1208 via any desired form of communication, such as via a dial-up modem connection, cable link, a digital subscriber line (DSL), wireless or satellite link, or any other form of communication. In at least one embodiment, each client may communicate using any machine that is compatible with a network 1208, such as a personal computer (PC), work station, dedicated terminal, personal data assistant (PDA), or other similar equipment. In at least one embodiment, clients 1202, 1204, and 1206 may or may not be located in a same geographical area.

In at least one embodiment, a plurality of servers 1210, 1212, and 1214 are connected to a network 1208 to serve clients that are in communication with a network 1208. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1210, 1212, 1214 run application programs that respond to client commands. In at least one embodiment, server 1210 may run a web server application for responding to client requests for HTML pages and may also run a mail server application for receiving and routing electronic mail. In at least one embodiment, other application programs, such as an FTP server or a media server for streaming audio/video data to clients may also be running on a server 1210. In at least one embodiment, different servers may be dedicated to performing different tasks. In at least one embodiment, server 1210 may be a dedicated web server that manages resources relating to web sites for various users, whereas a server 1212 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1210, 1212, 1214 are under control of a web hosting provider in a business of maintaining and delivering third party content over a network 1208.

In at least one embodiment, web hosting providers deliver services to two different types of clients. In at least one embodiment, one type, which may be referred to as a browser, requests content from servers 1210, 1212, 1214 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1216 is in communication with a network 1208 via a communication link. In at least one embodiment, intranet server 1216 is in communication with a server manager 1218. In at least one embodiment, server manager 1218 comprises a database of an application program configuration parameters which are being utilized in servers 1210, 1212, 1214. In at least one embodiment, users modify a database 1220 via an intranet 1216, and a server manager 1218 interacts with servers 1210, 1212, 1214 to modify application program parameters so that they match a content of a database. In at least one embodiment, a user logs onto an intranet server 1216 by connecting to an intranet 1216 via computer 1202 and entering authentication information, such as a username and password.

In at least one embodiment, when a user wishes to sign up for new service or modify an existing service, an intranet server 1216 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1216 updates a database 1220. In at least one embodiment, server manager 1218 forwards this information to an appropriate server, and a new parameter is used during application program operation. In at least one embodiment, an intranet server 1216 is configured to provide users with access to configuration parameters of hosted network resources (e.g., web pages, email, FTP sites, media sites, etc.), for which a user has contracted with a web hosting service provider. In at least one embodiment, at least one component shown or described with respect to FIG. 12 is used to implement techniques and/or functions described herein and at least in conjunction with FIGS. 1-8. In at least one embodiment, server 1210 causes an operating voltage of one or more integrated circuits to be adjusted, based at least in part, on an error rate as described herein and at least in conjunction with FIGS. 1-8.

FIG. 13A illustrates a networked computer system 1300A, in accordance with at least one embodiment. In at least one embodiment, networked computer system 1300A comprises a plurality of nodes or personal computers ("PCs") 1302, 1318, 1320. In at least one embodiment, personal computer or node 1302 comprises a processor 1314, memory 1316, video camera 1304, microphone 1306, mouse 1308, speakers 1310, and monitor 1312. In at least one embodiment, PCs 1302, 1318, 1320 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 1302, 1318, 1320 and other nodes of a network are interconnected via medium 1322. In at least one embodiment, medium 1322 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may comprise other nodes or elements such as routers, servers, and/or variations thereof.

In at least one embodiment, processor 1314 is a general-purpose programmable processor. In at least one embodiment, processors of nodes of networked computer system 1300A may also be special-purpose video processors. In at least one embodiment, various peripherals and components of a node such as those of node 1302 may vary from those of other nodes. In at least one embodiment, node 1318 and node 1320 may be configured identically to or differently than node 1302. In at least one embodiment, a node may be implemented on any suitable computer system in addition to PC systems.

FIG. 13B illustrates a networked computer system 1300B, in accordance with at least one embodiment. In at least one embodiment, system 1300B illustrates a network such as LAN 1324, which may be used to interconnect a variety of nodes that may communicate with each other. In at least one embodiment, attached to LAN 1324 are a plurality of nodes such as PC nodes 1326, 1328, 1330. In at least one embodiment, a node may also be connected to the LAN via a network server or other means. In at least one embodiment, system 1300B comprises other types of nodes or elements, for example including routers, servers, and nodes.

Figure 13C:
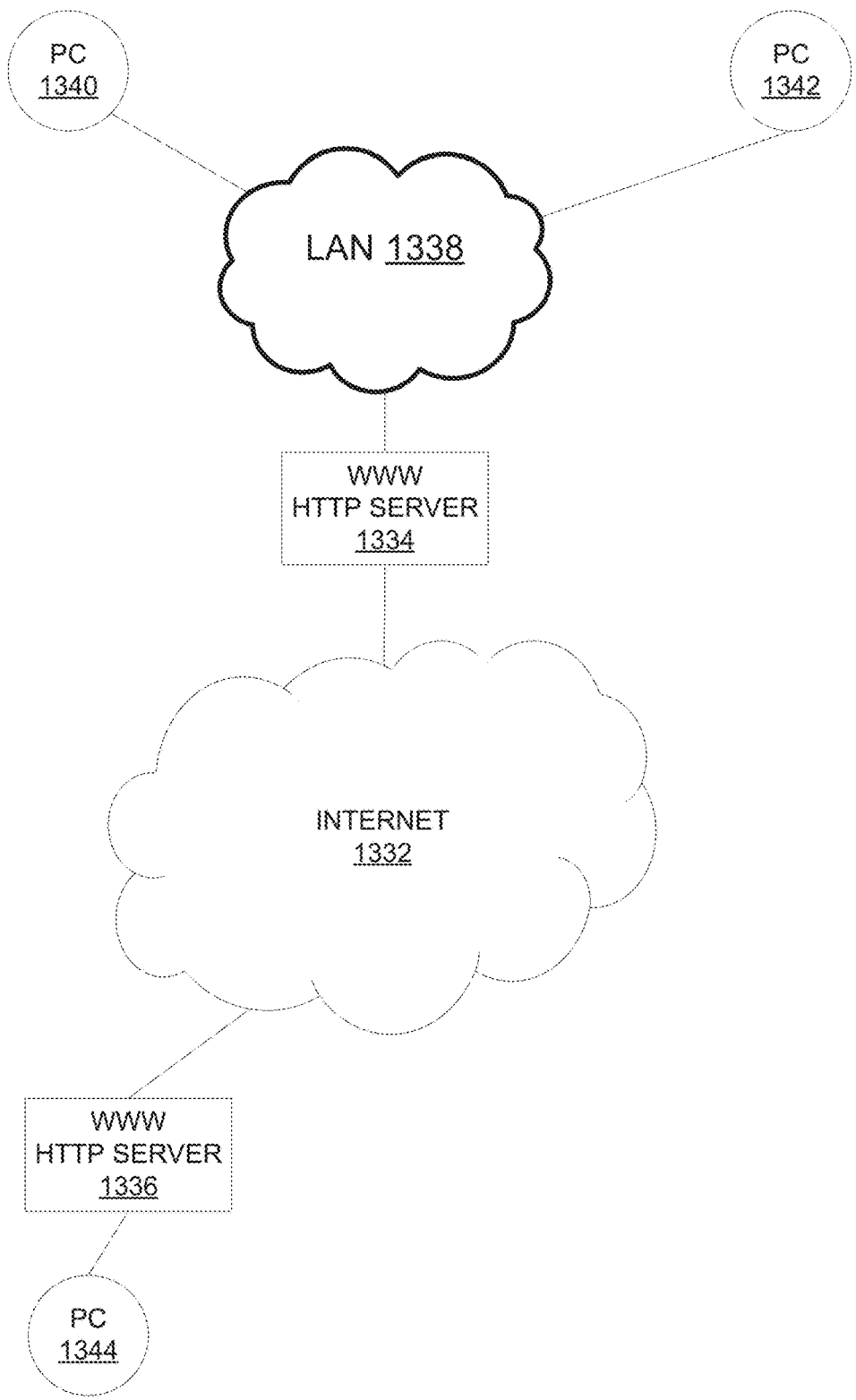
FIG. 13C illustrates a networked computer system, in accordance with at least one embodiment.

FIG. 13C illustrates a networked computer system 1300C, in accordance with at least one embodiment. In at least one embodiment, system 1300C illustrates a WWW system having communications across a backbone communications network such as Internet 1332, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1332 in WWW are a plurality of nodes such as PCs 1340, 1342, 1344. In at least one embodiment, a node is interfaced to other nodes of WWW through a WWW HTTP server such as servers 1334, 1336. In at least one embodiment, PC 1344 may be a PC forming a node of network 1332 and itself running its server 1336, although PC 1344 and server 1336 are illustrated separately in FIG. 13C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1338 as illustrated with respect to WWW HTTP server 1334. In at least one embodiment, system 1300C may also comprise other types of nodes or elements. In at least one embodiment, a WWW HTTP server is an application running on a machine, such as a PC. In at least one embodiment, each user may be considered to have a unique "server," as illustrated with respect to PC 1344. In at least one embodiment, a server may be considered to be a server such as WWW HTTP server 1334, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human inter-action with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs) In at least one embodiment, cloud computing is characterized by resource pooling, in which a provider's computing resources are pooled to serve multiple consumers using a multi-tenant model, with different physical and virtual resources dynamically, assigned and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability. In at least one embodiment, at least one component shown or described with respect to FIGS. 13A-13C is used to implement techniques and/or functions described herein and at least in conjunction with FIGS. 1-8. In at least one embodiment, processor 1914 causes an operating voltage of one or more integrated circuits to be adjusted, based at least in part, on an error rate as described herein and at least in conjunction with FIGS. 1-8.

Figure 14:
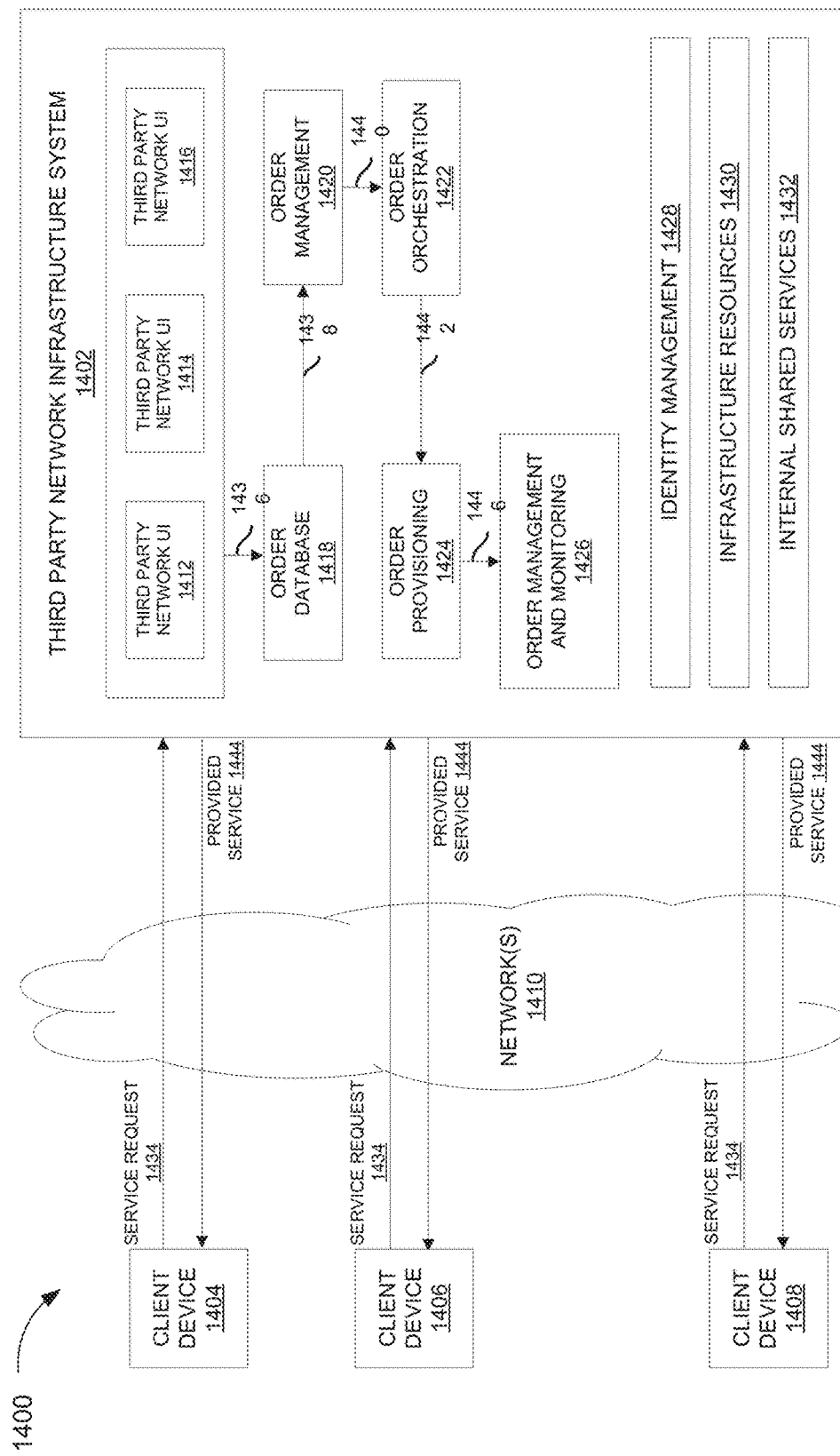
FIG. 14 illustrates one or more components of a system environment in which services may be offered as third party network services, in accordance with at least one embodiment.

FIG. 14 illustrates one or more components of a system environment 1400 in which services may be offered as third party network services, in accordance with at least one embodiment. In at least one embodiment, a third party network may be referred to as a cloud, cloud network, cloud computing network, and/or variations thereof. In at least one embodiment, system environment 1400 includes one or more client computing devices 1404, 1406, and 1408 that may be used by users to interact with a third party network infrastructure system 1402 that provides third party network services, which may be referred to as cloud computing services. In at least one embodiment, third party network infrastructure system 1402 may comprise one or more computers and/or servers.

It should be appreciated that third party network infrastructure system 1402 depicted in FIG. 14 may have other components than those depicted. Further, FIG. 14 depicts an embodiment of a third party network infrastructure system. In at least one embodiment, third party network infrastructure system 1402 may have more or fewer components than depicted in FIG. 14, may combine two or more components, or may have a different configuration or arrangement of components.

In at least one embodiment, client computing devices 1404, 1406, and 1408 may be configured to operate a client application such as a web browser, a proprietary client application, or some other application, which may be used by a user of a client computing device to interact with third party network infrastructure system 1402 to use services provided by third party network infrastructure system 1402. Although exemplary system environment 1400 is shown with three client computing devices, any number of client computing devices may be supported. In at least one embodiment, other devices such as devices with sensors, etc. may interact with third party network infrastructure system 1402. In at least one embodiment, network(s) 1410 may facilitate communications and exchange of data between client computing devices 1404, 1406, and 1408 and third party network infrastructure system 1402.

In at least one embodiment, services provided by third party network infrastructure system 1402 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 1402 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 1402 may include a suite of applications, middleware, and database service offerings that are delivered to a customer in a self-service, subscription-based, elastically scalable, reliable, highly available, and secure manner. In at least one embodiment, third party network infrastructure system 1402 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 1402 may be adapted to automatically provision, manage and track a customer's subscription to services offered by third party network infrastructure system 1402. In at least one embodiment, third party network infrastructure system 1402 may provide third party network services via different deployment models. In at least one embodiment, services may be provided under a public third party network model in which third party network infrastructure system 1402 is owned by an organization selling third party network services and services are made available to a general public or different industry enterprises. In at least one embodiment, services may be provided under a private third party network model in which third party network infrastructure system 1402 is operated solely for a single organization and may provide services for one or more entities within an organization. In at least one embodiment, third party network services may also be provided under a community third party network model in which third party network infrastructure system 1402 and services provided by third party network infrastructure system 1402 are shared by several organizations in a related community. In at least one embodiment, third party network services may also be provided under a hybrid third party network model, which is a combination of two or more different models.

In at least one embodiment, services provided by third party network infrastructure system 1402 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third party network infrastructure system 1402. In at least one embodiment, third party network infrastructure system 1402 then performs processing to provide services in a customer's subscription order.

In at least one embodiment, services provided by third party network infrastructure system 1402 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 1402 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 1402 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 1402 may also include infrastructure resources 1430 for providing resources used to provide various services to customers of a third party network infrastructure system. In at least one embodiment, infrastructure resources 1430 may include pre-integrated and optimized combinations of hardware, such as servers, storage, and networking resources to execute services provided by a Paas platform and a SaaS platform, and other resources.

In at least one embodiment, resources in third party network infrastructure system 1402 may be shared by multiple users and dynamically re-allocated per demand. In at least one embodiment, resources may be allocated to users in different time zones. In at least one embodiment, third party network infrastructure system 1402 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 1432 may be provided that are shared by different components or modules of third party network infrastructure system 1402 to enable provision of services by third party network infrastructure system 1402. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 1402 may provide comprehensive management of third party network services (e.g., SaaS, PaaS, and IaaS services) in a third party network infrastructure system. In at least one embodiment, third party network management functionality may include capabilities for provisioning, managing and tracking a customer's subscription received by third party network infrastructure system 1402, and/or variations thereof.

In at least one embodiment, as depicted in FIG. 14, third party network management functionality may be provided by one or more modules, such as an order management module 1420, an order orchestration module 1422, an order provisioning module 1424, an order management and monitoring module 1426, and an identity management module 1428. In at least one embodiment, these modules may include or be provided using one or more computers and/or servers, which may be general purpose computers, specialized server computers, server farms, server clusters, or any other appropriate arrangement and/or combination.

In at least one embodiment, at step 1434, a customer using a client device, such as client computing devices 1404, 1406 or 1408, may interact with third party network infrastructure system 1402 by requesting one or more services provided by third party network infrastructure system 1402 and placing an order for a subscription for one or more services offered by third party network infrastructure system 1402. In at least one embodiment, a customer may access a third party network User Interface (UT) such as third party network UI 1412, third party network UI 1414 and/or third party network UI 1416 and place a subscription order via these UIs. In at least one embodiment, order information received by third party network infrastructure system 1402 in response to a customer placing an order may include information identifying a customer and one or more services offered by a third party network infrastructure system 1402 that a customer intends to subscribe to.

In at least one embodiment, at step 1436, an order information received from a customer may be stored in an order database 1418. In at least one embodiment, if this is a new order, a new record may be created for an order. In at least one embodiment, order database 1418 can be one of several databases operated by third party network infrastructure system 1418 and operated in conjunction with other system elements.

In at least one embodiment, at step 1438, an order information may be forwarded to an order management module 1420 that may be configured to perform billing and accounting functions related to an order, such as verifying an order, and upon verification, booking an order.

In at least one embodiment, at step 1440, information regarding an order may be communicated to an order orchestration module 1422 that is configured to orchestrate provisioning of services and resources for an order placed by a customer. In at least one embodiment, order orchestration module 1422 may use services of order provisioning module 1424 for provisioning. In at least one embodiment, order orchestration module 1422 enables management of business processes associated with each order and applies business logic to determine whether an order should proceed to provisioning.

In at least one embodiment, at step 1442, upon receiving an order for a new subscription, order orchestration module 1422 sends a request to order provisioning module 1424 to allocate resources and configure resources needed to fulfill a subscription order. In at least one embodiment, order provisioning module 1424 enables an allocation of resources for services ordered by a customer, in at least one embodiment, order provisioning module 1424 provides a level of abstraction between third party network services provided by third party network infrastructure system 1400 and a physical implementation layer that is used to provision resources for providing requested services. In at least one embodiment, this enables order orchestration module 1422 to be isolated from implementation details, such as whether or not services and resources are actually provisioned in real-time or pre-provisioned and only allocated/assigned upon request.

In at least one embodiment, at step 1444, once services and resources are provisioned, a notification may be sent to subscribing customers indicating that a requested service is now ready for use. In at least one embodiment, information (e.g., a link) may be sent to a customer that enables a customer to start using requested services.

In at least one embodiment, at step 1446, a customer's subscription order may be managed and tracked by an order management and monitoring module 1426. In at least one embodiment, order management and monitoring module 1426 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infrastructure system 1400 may include an identity management module 1428 that is configured to provide identity services, such as access management and authorization services in third party network infrastructure system 1400. In at least one embodiment, identity management module 1428 may control information about customers who wish to utilize services provided by third party network infrastructure system 1402. In at least one embodiment, such information can include information that authenticates identities of such customers and information that describes which actions those customers are authorized to perform relative to various system resources (e.g., files, directories, applications, communication ports, memory segments, etc.). In at least one embodiment, identity management module 1428 may also include management of descriptive information about each customer and about how and by whom that descriptive information can be accessed and modified. In at least one embodiment, at least one component shown or described with respect to FIG. 14 is used to implement techniques and/or functions described herein and at least in conjunction with FIGS. 1-8. In at least one embodiment, third party network infrastructure system 1402 causes an operating voltage of one or more integrated circuits to be adjusted, based at least in part, on an error rate as described herein and at least in conjunction with FIGS. 1-8.

Figure 15:
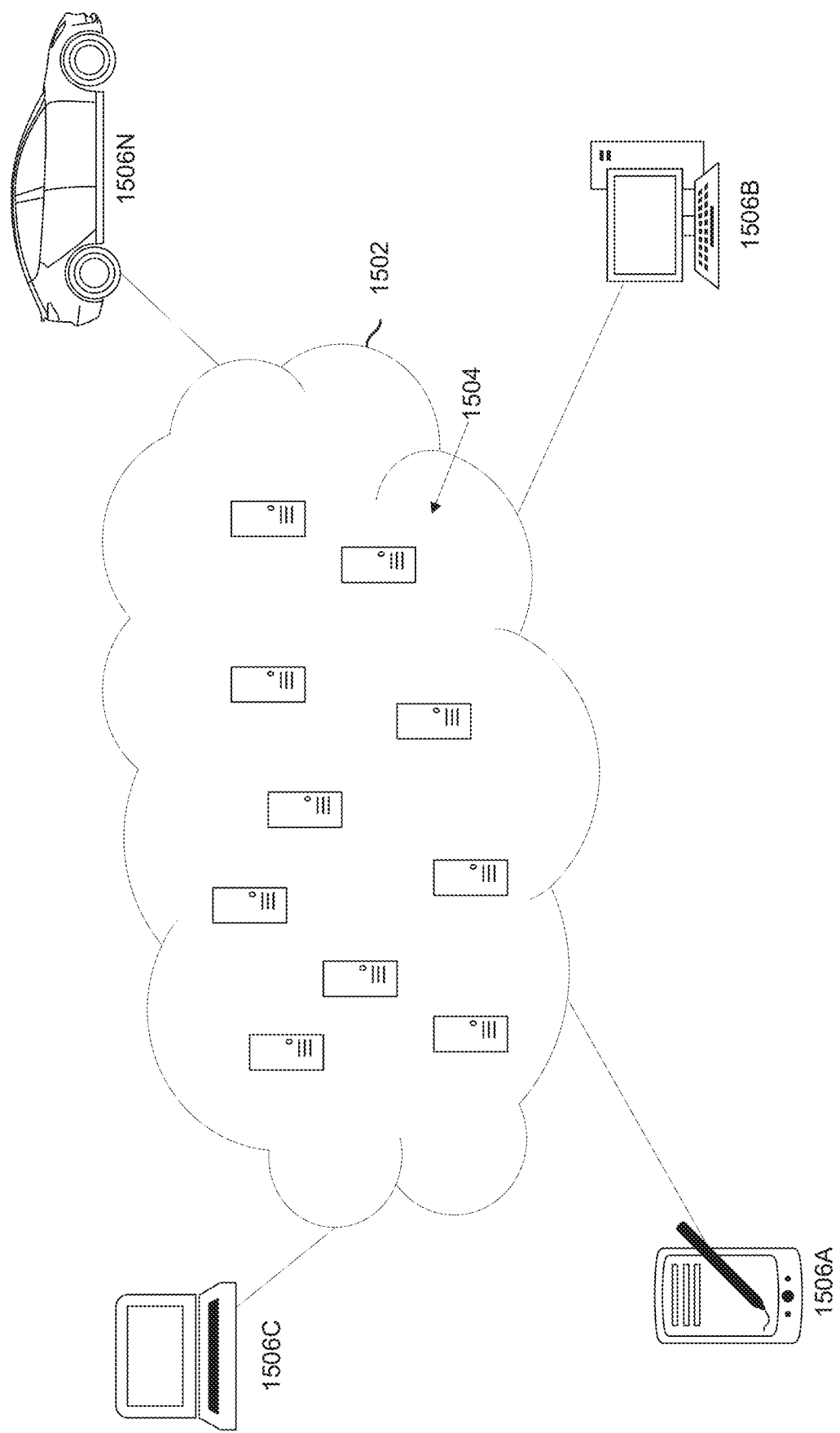
FIG. 15 illustrates a cloud computing environment, in accordance with at least one embodiment.

FIG. 15 illustrates a cloud computing environment 1502, in accordance with at least one embodiment. In at least one embodiment, cloud computing environment 1502 comprises one or more computer system servers 1504 with which computing devices such as, personal digital assistant (PDA) or cellular telephone 1506A, desktop computer 1506B, laptop computer 15060, and/or automobile computer system 1506N communicate. In at least one embodiment, this allows for infrastructure, platforms and/or software to be offered as services from cloud computing environment 1502, so as to not require each client to separately maintain such resources. It is understood that types of computing devices 1506A-N shown in FIG. 15 are intended to be illustrative only and that cloud computing environment 1502 can communicate with any type of computerized device over any type of network and/or network/addressable connection (e.g., using a web browser).

In at least one embodiment, a computer system/server 1504, which can be denoted as a cloud computing node, is operational with numerous other general purpose or special purpose computing system environments or configurations. In at least one embodiment, examples of computing systems, environments, and/or configurations that may be suitable for use with computer system/server 1504 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 1504 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/server 1504 may be practiced in distributed loud computing environments where tasks are performed by remote processing devices that are linked through a communications network. In at least one embodiment, in a distributed cloud computing environment, program modules may be located in both local and remote computer system storage media including memory storage devices. In at least one embodiment, at least one component shown or described with respect to FIG. 15 is used to implement techniques and/or functions described herein and at least in conjunction with FIGS. 1-8. In at least one embodiment, computer system/server 1504 causes an operating voltage of one or more integrated circuits to be adjusted, based at least in part, on an error rate as described herein and at least in conjunction with FIGS. 1-8.

Figure 16:
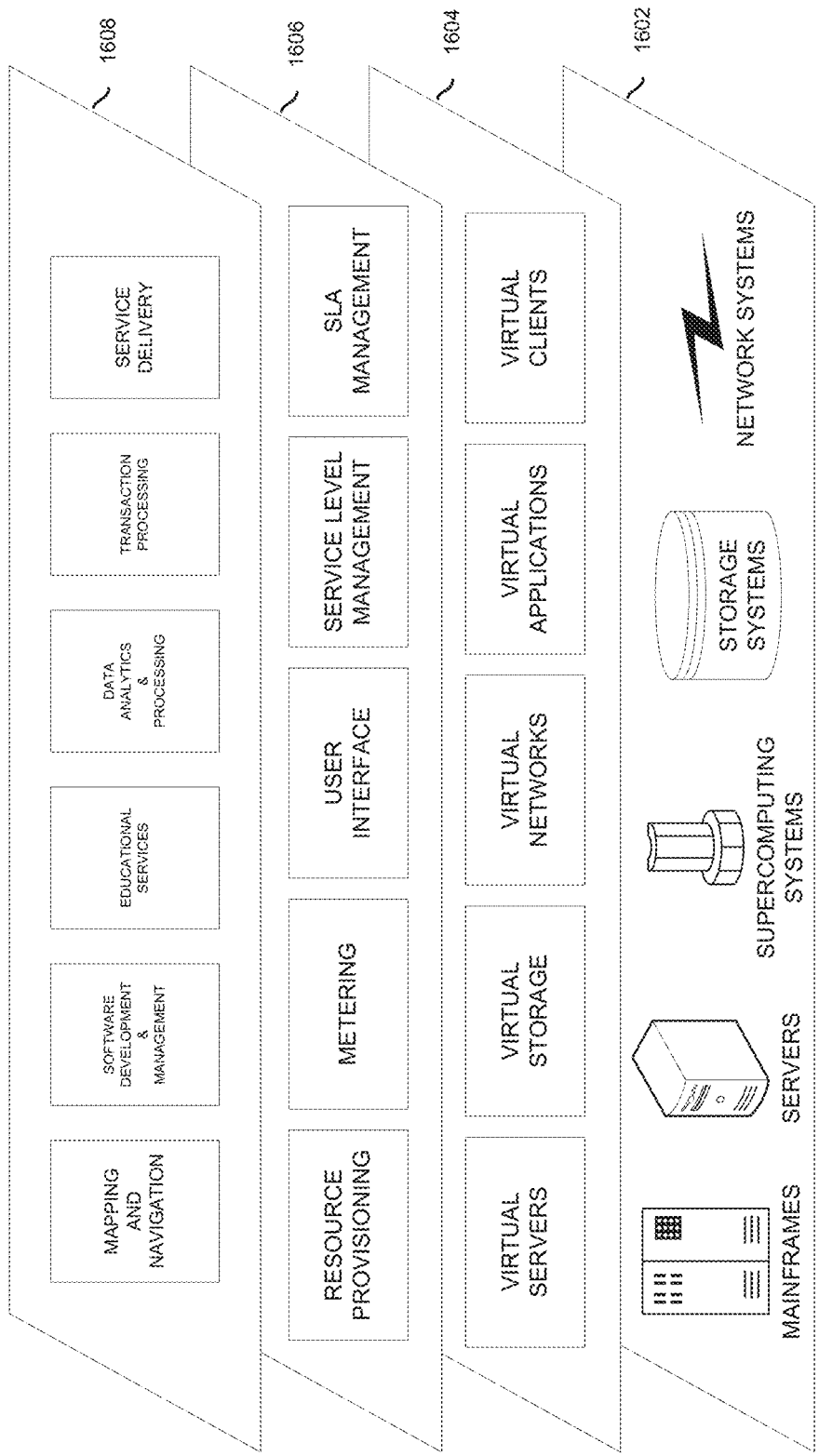
FIG. 16 illustrates a set of functional abstraction layers provided by a cloud computing environment, in accordance with at least one embodiment.

FIG. 16 illustrates a set of functional abstraction layers provided by cloud computing environment 1502 (FIG. 15), in accordance with at least one embodiment. It should be understood in advance that components, layers, and functions shown in FIG. 16 are intended to be illustrative only, and components, layers, and functions may vary.

In at least one embodiment, hardware and software layer 1602 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 1604 provides an abstraction layer from which following exemplary virtual entities may be provided: virtual servers, virtual storage, virtual networks, including virtual private networks, virtual applications, virtual clients, and/or variations thereof.

In at least one embodiment, management layer 1606 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 1608 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase. In at least one embodiment, at least one component shown or described with respect to FIG. 16 is used to implement techniques and/or functions described herein and at least in conjunction with FIGS. 1-8. In at least one embodiment, server of software layer 1602 causes an operating voltage of one or more integrated circuits to be adjusted, based at least in part, on an error rate as described herein and at least in conjunction with FIGS. 1-8.

Figure 17:
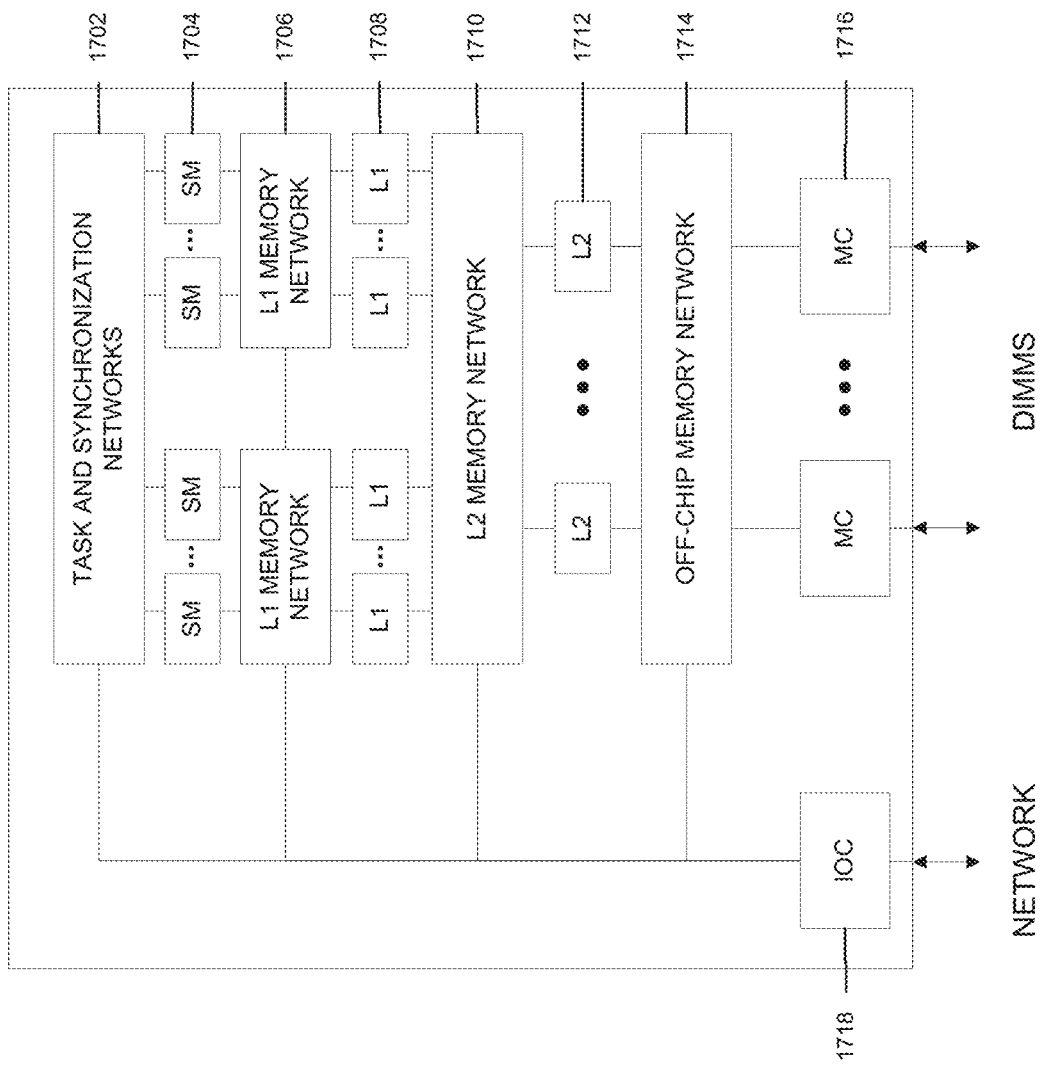
FIG. 17 illustrates a supercomputer at a chip level, in accordance with at least one embodiment.
Figure 18:
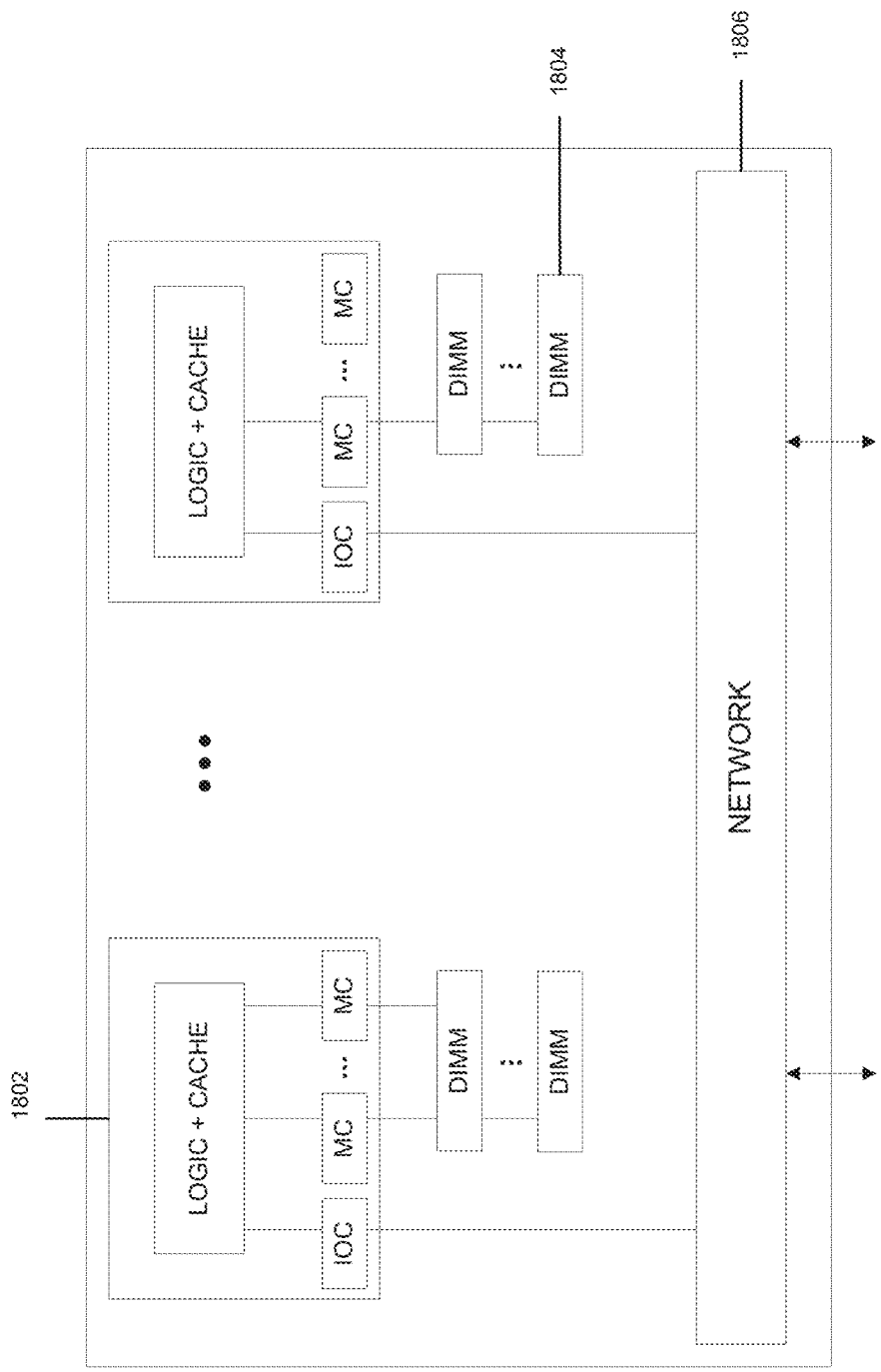
FIG. 18 illustrates a supercomputer at a rack module level, in accordance with at least one embodiment.

FIG. 17 illustrates a supercomputer at a chip level, in accordance with at least one embodiment. In at least one embodiment, inside an FPGA or ASIC chip, main computation is performed within finite state machines (1704) called thread units. In at least one embodiment, task and synchronization networks (1702) connect finite state machines and are used to dispatch threads and execute operations in correct order. In at least one embodiment, a multi-level partitioned on-chip cache hierarchy (1708, 1712) is accessed using memory networks (1706, 1710). In at least one embodiment, off-chip memory is accessed using memory controllers (1716) and an off-chip memory network (1714). In at least one embodiment, I/O controller (1718) is used for cross-chip communication when a design does not fit in a single logic chip. In at least one embodiment, at least one component shown or described with respect to FIG. 17 is used to implement techniques and/or functions described herein and at least in conjunction with FIGS. 1-8. In at least one embodiment, a supercomputer as described in conjunction with FIG. 17 causes an operating voltage of one or more integrated circuits to be adjusted, based at least in part, on an error rate as described herein and at least in conjunction with FIGS. 1-8, FIG. 18 illustrates a supercomputer at a rock module level, in accordance with at least one embodiment. In at least one embodiment, within a rack module, there are multiple FPGA or ASIC chips (1802) that are connected to one or more DRAM units (1804) which constitute main accelerator memory. In at least one embodiment, each FPGA/ASIC chip is connected to its neighbor FPGA/ASIC chip using wide busses on a board, with differential high speed signaling (1806). In at least one embodiment, each FPGA/ASIC chip is also connected to at least one high-speed serial communication cable. In at least one embodiment, at least one component shown or described with respect to FIG. 18 is used to implement techniques and/or functions described herein and at least in conjunction with FIGS. 1-8. In at least one embodiment, at least one or more of FPGA or ASIC chips (1802) causes an operating voltage of one or more integrated circuits to be adjusted, based at least in part, on an error rate as described herein and at least in conjunction with FIGS. 1-8.

Figure 19:
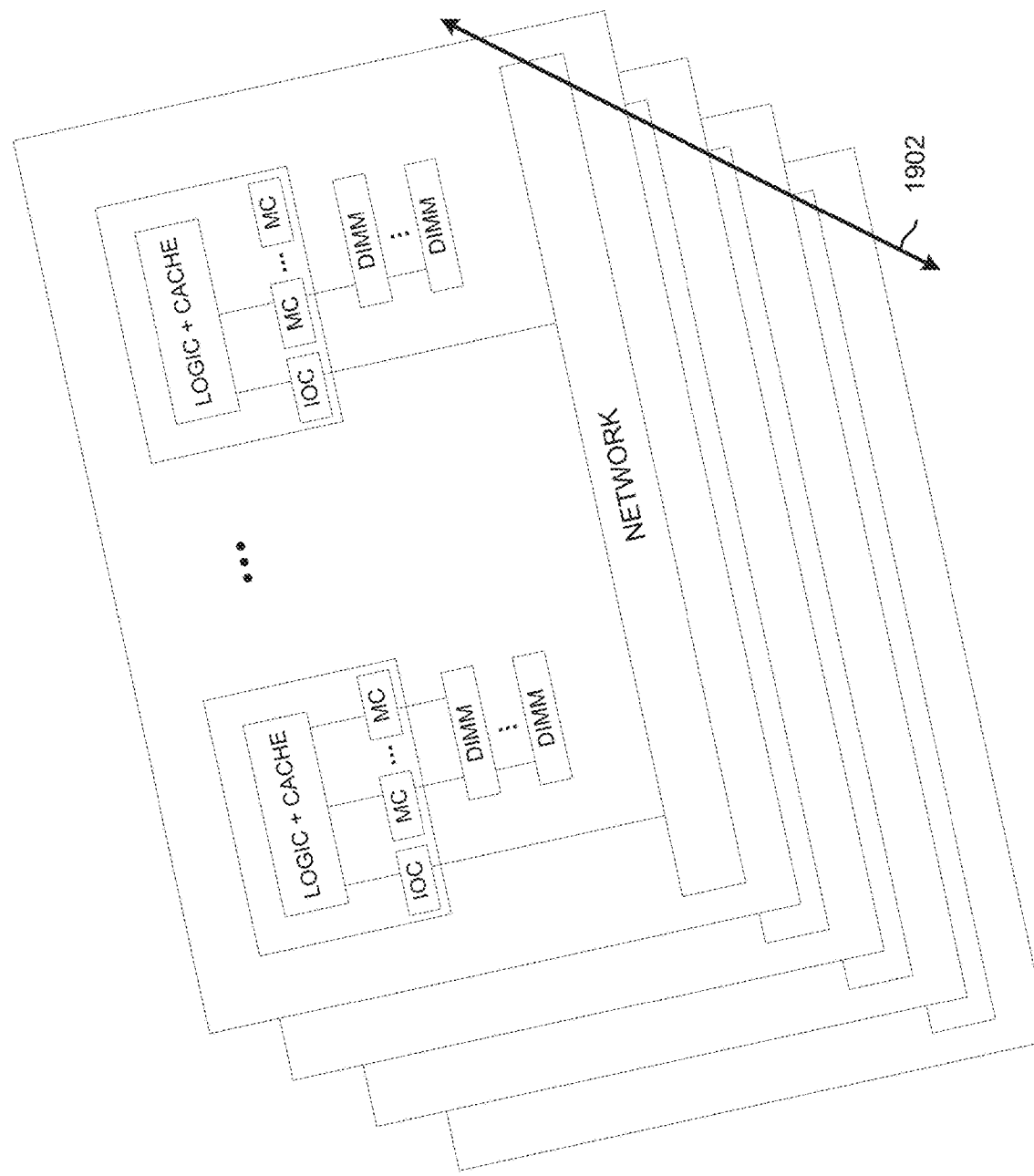
FIG. 19 illustrates a supercomputer at a rack level, in accordance with at least one embodiment.
Figure 20:
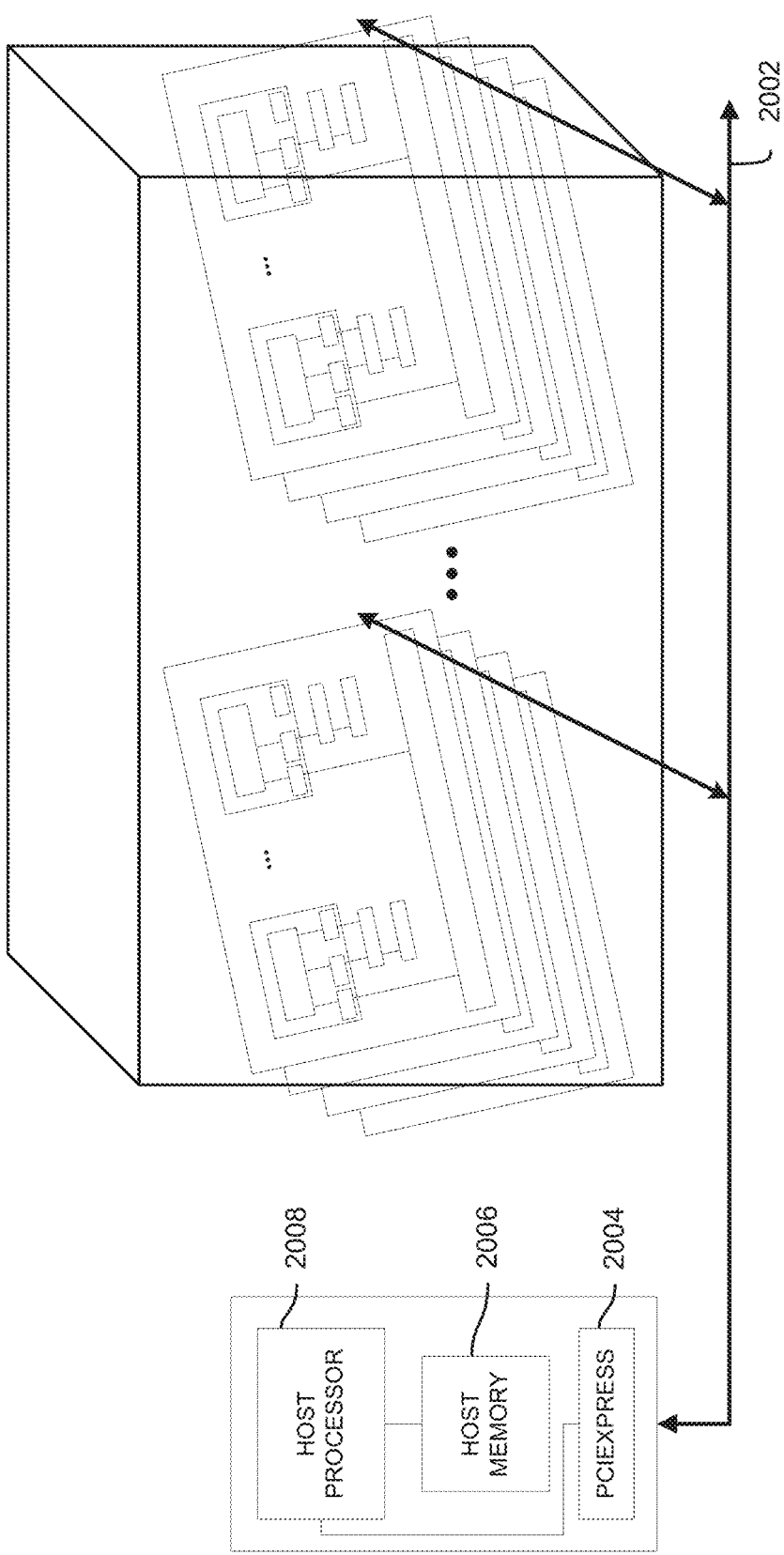
FIG. 20 illustrates a supercomputer at a whole system level, in accordance with at least one embodiment.

FIG. 19 illustrates a supercomputer at a rack level, in accordance with at least one embodiment. FIG. 20 illustrates a supercomputer at a whole system level, in accordance with at least one embodiment. In at least one embodiment, referring to FIG. 19 and FIG. 20, between rack modules in a rack and across racks throughout an entire system, high-speed serial optical or copper cables (1902, 2002) are used to realize a scalable, possibly incomplete hypercube network. In at least one embodiment, one of FPGA/ASIC chips of an accelerator is connected to a host system through a PCI-Express connection (2004). In at least one embodiment, host system comprises a host microprocessor (2008) that a software part of an application runs on and a memory consisting of one or more host memory DRAM units (2006) that is kept coherent with memory on an accelerator. In at least one embodiment, host system can be a separate module on one of racks, or can be integrated with one of a supercomputers modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip 1) connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented. In at least one embodiment, at least one component shown or described with respect to FIGS. 19-20 is used to implement techniques and/or functions described herein and at least in conjunction with FIGS. 1-8. In at least one embodiment, at least one or more of an accelerator's FPGA/ASIC chips causes an operating voltage of one or more integrated circuits to be adjusted, based at least in part, on an error rate as described herein and at least in conjunction with FIGS. 1-8.

Artificial Intelligence

The following figures set forth, without limitation, exemplary artificial intelligence-based systems that can be used to implement at least one embodiment.

Figure 21A:
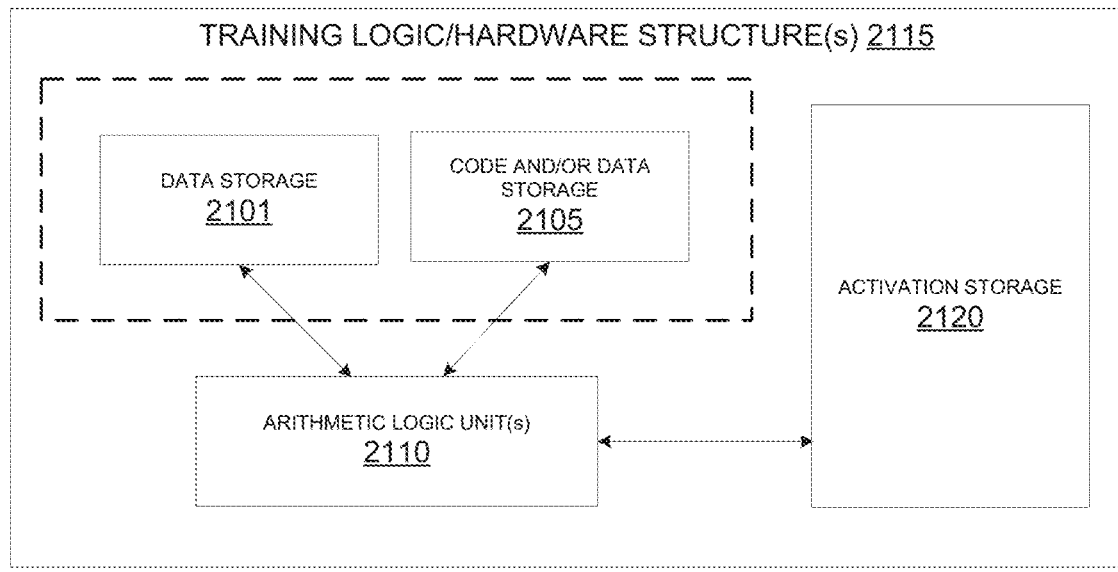
FIG. 21A illustrates inference and/or training logic, in accordance with at least one embodiment.

FIG. 21A illustrates inference and/or training logic 2115 used to perform inferencing and/or training operations associated with one or more embodiments. Details regarding inference and/or training logic 2115 are provided below in conjunction with FIGS. 21A and/or 21B.

In at least one embodiment, inference and/or training logic 2115 may include, without limitation, code and/or data storage 2101 to store forward and/or output weight and/or input/output data, and/or other parameters to configure neurons or layers of a neural network trained and/or used for inferencing in aspects of one or more embodiments. In at least one embodiment, training logic 2115 may include, or be coupled to code and/or data storage 2101 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2101 may be included with other on-chip or off-chip data storage, including a processor's L1, L2, or L3 cache or system memory.

In at least one embodiment, any portion of code and/or data storage 2101 may be internal or external to one or more processors or other hardware logic devices or circuits. In at least one embodiment, code and/or code and/or data storage 2101 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2101 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2115 may include, without limitation, a code and/or data storage 2105 to store backward and/or output weight and/or input/output data corresponding to neurons or layers of a neural network trained and/or used for inferencing in aspects of one or more embodiments. In at least one embodiment, code and/or data storage 2105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2115 may include, or be coupled to code and/or data storage 2105 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 2105 may be included with other on-chip or off-chip data storage, including a processor's L1, L2, or L3 cache or system memory. In at least one embodiment, any portion of code and/or data storage 2105 may be internal or external to one or more processors or other hardware logic devices or circuits. In at least one embodiment, code and/or data storage 2105 may be cache memory, DRAM. SRAM, non-volatile memory (e.g., flash memory), or other storage. In at least one embodiment, a choice of whether code and/or data storage 2105 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2101 and code and/or data storage 2105 may be separate storage structures. In at least one embodiment, code and/or data storage 2101 and code and/or data storage 2105 may be a combined storage structure. In at least one embodiment, code and/or data storage 2101 and code and/or data storage 2105 may be partially combined and partially separate. In at least one embodiment, any portion of code and/or data storage 2101 and code and/or data storage 2105 may be included with other on-chip or off-chip data storage, including a processor's L1, L2, or L3 cache or system memory.

In at least one embodiment, inference and/or training logic 2115 may include, without limitation, one or more arithmetic logic unit(s) ("ALU(s)") 2110, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2120 that are functions of input/output and/or weight parameter data stored in code and/or data storage 2101 and/or code and/or data storage 2105. In at least one embodiment, activations stored in activation storage 2120 are generated according to linear algebraic and or matrix-based mathematics performed by ALU(s) 2110 in response to performing instructions or other code, wherein weight values stored in code and/or data storage 2105 and/or data storage 2101 are used as operands along with other values, such as bias values, gradient information, momentum values, or other parameters or hyperparameters, any or all of which may be stored in code and/or data storage 2105 or code and/or data storage 2101 or another storage on or off-chip.

In at least one embodiment, ALU(s) 2110 are included within one or more processors or other hardware logic devices or circuits, whereas in another embodiment, ALU(s) 2110 may be external to a processor or other hardware logic device or circuit that uses them (e.g., a co-processor). In at least one embodiment, ALUs 2110 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2101, code and/or data storage 2105, and activation storage 2120 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2120 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2120 may be cache memory, DRAM, SRAM, non-volatile memory (e.g., flash memory), or other storage. In at least one embodiment, activation storage 2120 may be completely or partially within or external to one or more processors or other logical circuits. In at least one embodiment, a choice of whether activation storage 2120 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2115 illustrated in FIG. 21A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2115 illustrated in FIG. 21A may be used in conjunction with central processing unit ("CPU") hardware, graphics processing unit ("GPU") hardware or other hardware, such as field programmable gate arrays ("FPGAs").

Figure 21B:
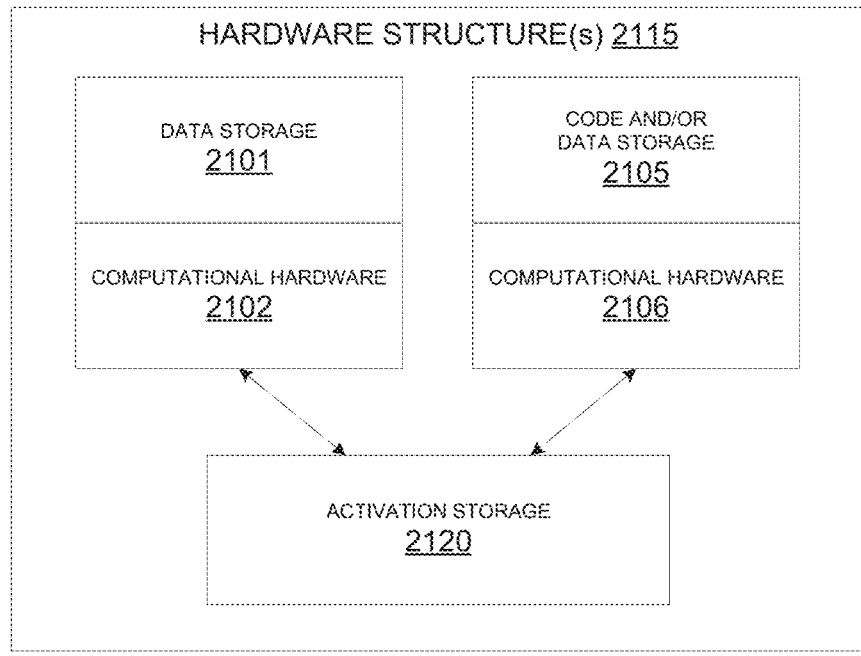
FIG. 21B illustrates inference and/or training logic, in accordance with at least one embodiment.

FIG. 21B illustrates inference and/or training logic 2115, according to at least one embodiment. In at least one embodiment, inference and/or training logic 2115 may include, without limitation, hardware logic in which computational resources are dedicated or otherwise exclusively used in conjunction with weight values or other information corresponding to one or more layers of neurons within a neural network. In at least one embodiment, inference and/or training logic 2115 illustrated in FIG. 21.13 may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2115 illustrated in FIG. 21B may be used in conjunction with central processing unit (CPU) hardware, graphics processing unit (GPU) hardware or other hardware, such as field programmable gate arrays (FPGAs). In at least one embodiment, inference and/or training logic 2115 includes, without limitation, code and/or data storage 2101 and code and/or data storage 2105, which may be used to store code (e.g., graph code), weight values and/or other information, including bias values, gradient information, momentum values, and/or other parameter or hyperparameter information. In at least one embodiment illustrated in FIG. 21B, each of code and/or data storage 2101 and code and/or data storage 2105 is associated with a dedicated computational resource, such as computational hardware 2102 and computational hardware 2106, respectively. In at least one embodiment, each of computational hardware 2102 and computational hardware 2106 comprises one or more ALUs that perform mathematical functions, such as linear algebraic functions, only on information stored in code and/or data storage 2101 and code and/or data storage 2105, respectively, result of which is stored in activation storage 2120.

In at least one embodiment, each of code and/or data storage 2101 and 2105 and corresponding computational hardware 2102 and 2106, respectively, correspond to different layers of a neural network, such that resulting activation from one storage/computational pair 2101/2102 of code and/or data storage 2101 and computational hardware 2102 is provided as an input to a next storage/computational pair 2105/2106 of code and/or data storage 2105 and computational hardware 2106, in order to mirror a conceptual organization of a neural network. In at least one embodiment, each of storage/computational pairs 2101/2102 and 2105/2106 may correspond to more than one neural network layer. In at least one embodiment, additional storage/computation pairs (not shown) subsequent to or in parallel with storage/computation pairs 2101/2102 and 2105/2106 may be included in inference and/or training logic 2115. In at least one embodiment, at least one component shown or described with respect to FIG. 21 is used to implement techniques and/or functions described herein and at least in conjunction with FIGS. 1-8.

Figure 22:
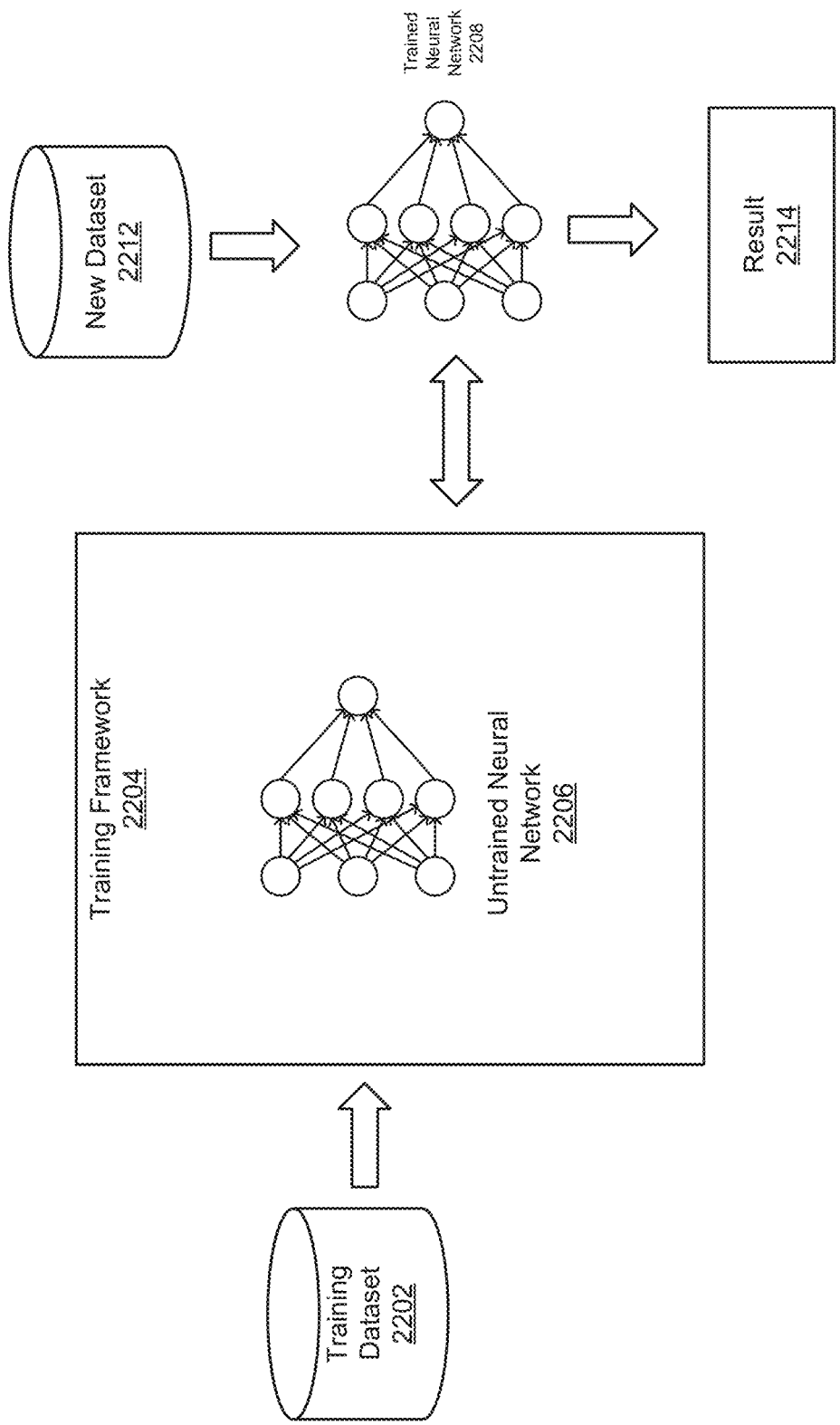
FIG. 22 illustrates training and deployment of a neural network, in accordance with at least one embodiment.

FIG. 22 illustrates training and deployment of a deep neural network, according to at least one embodiment. In at least one embodiment, untrained neural network 2206 is trained using a training dataset 2202. In at least one embodiment, training framework 2204 is a PyTorch framework, whereas in other embodiments, training framework 2204 is a TensorFlow, Boost, Caffe, Microsoft Cognitive Toolkit/CNTK, MXNet, Chainer, Keras, Deeplearning4j, or other training framework. In at least one embodiment, training framework 2204 trains an untrained neural network 2206 and enables it to be trained using processing resources described herein to generate a trained neural network 2208. In at least one embodiment, weights may be chosen randomly or by pre-training using a deep belief network. In at least one embodiment, training may be performed in either a supervised, partially supervised, or unsupervised manner.

In at least one embodiment, untrained neural network 2206 is trained using supervised learning, wherein training dataset 2202 includes an input paired with a desired output for an input, or where training dataset 2202 includes input having a known output and an output of neural network 2206 is manually graded. In at least one embodiment, untrained neural network 2206 is trained in a supervised manner and processes inputs from training dataset 2202 and compares resulting outputs against a set of expected or desired outputs. In at least one embodiment, errors are then propagated back through untrained neural network 2206. In at least one embodiment, training framework 2204 adjusts weights that control untrained neural network 2206. In at least one embodiment, training framework 2204 includes tools to monitor how well untrained neural network 2206 is converging towards a model, such as trained neural network 2208, suitable to generating correct answers, such as in result 2214, based on input data such as a new dataset 2212. In at least one embodiment, training framework 2204 trains untrained neural network 2206 repeatedly while adjust weights to refine an output of untrained neural network 2206 using a loss function and adjustment algorithm, such as stochastic gradient descent. In at least one embodiment, training framework 2204 trains untrained neural network 2206 until untrained neural network 2206 achieves a desired accuracy. In at least one embodiment, trained neural network 2208 can then be deployed to implement any number of machine learning operations.

In at least one embodiment, untrained neural network 2206 is trained using unsupervised learning, wherein untrained neural network 2206 attempts to train itself using unlabeled data. In at least one embodiment, unsupervised learning training dataset 2202 will include input data without any associated output data or "ground truth" data. In at least one embodiment, untrained neural network 2206 can learn groupings within training dataset 2202 and can determine how individual inputs are related to untrained dataset 2202. In at least one embodiment, unsupervised training can be used to generate a self organizing map in trained neural network 2208 capable of performing operations useful in reducing dimensionality of new dataset 2212. In at least one embodiment, unsupervised training can also be used to perform anomaly detection, which allows identification of data points in new dataset 2212 that deviate from normal patterns of new dataset 2212.

In at least one embodiment, semi-supervised learning may be used, which is a technique in which in training dataset 2202 includes a mix of labeled and unlabeled data. In at least one embodiment, training framework 2204 may be used to perform incremental learning, such as through transferred learning techniques. In at least one embodiment, incremental learning enables trained neural network 2208 to adapt to new dataset 2212 without forgetting knowledge instilled within trained neural network 2208 during initial training. In at least one embodiment, at least one component shown or described with respect to FIG. 22 is used to implement techniques and/or functions described herein and at least in conjunction with FIGS. 1-8.

5G Networks

The following figures set forth, without limitation, exemplary 5G network-based systems that can be used to implement at least one embodiment.

Figure 23:
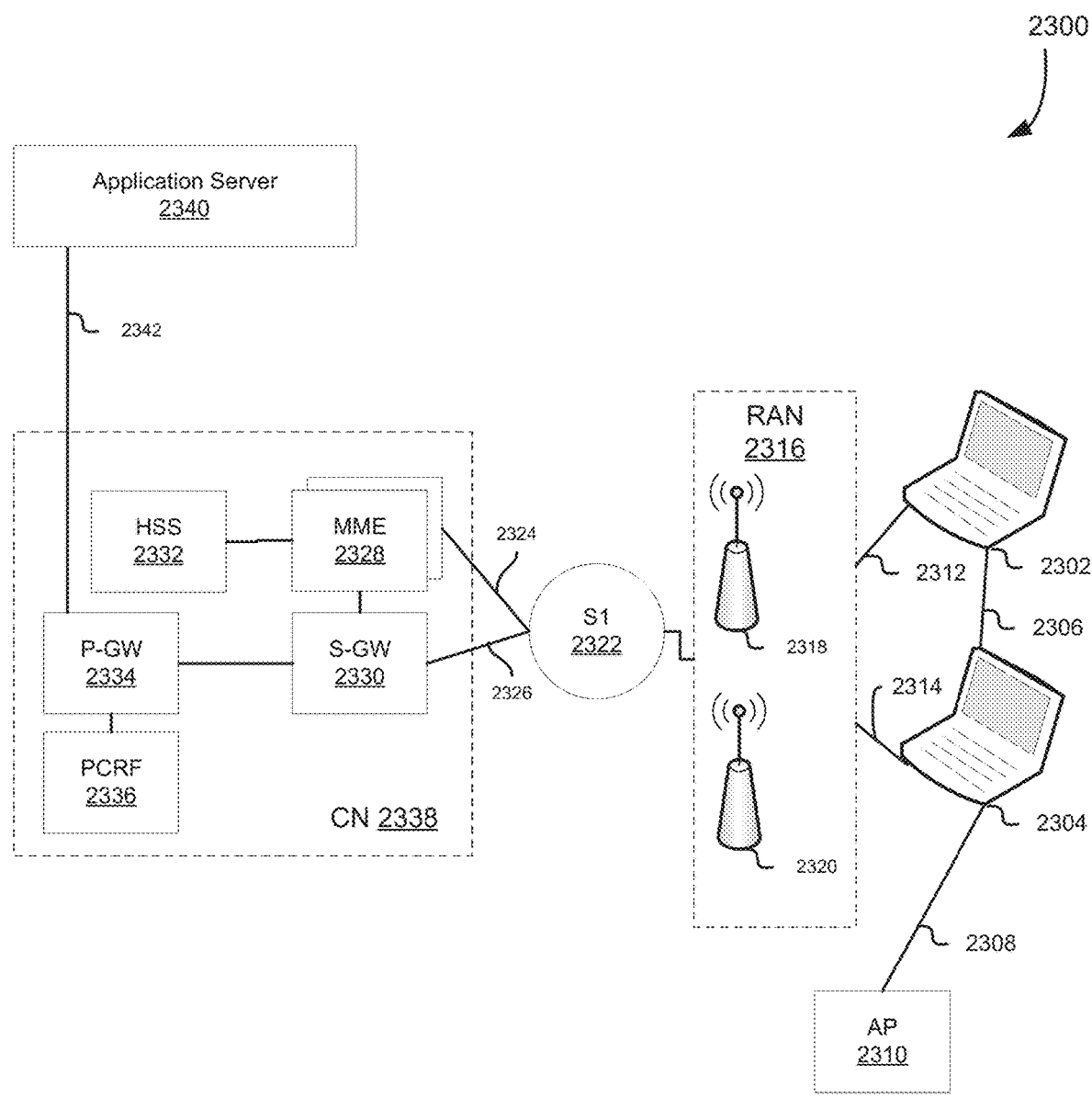
FIG. 23 illustrates an architecture of a system of a network, in accordance with at least one embodiment.

FIG. 23 illustrates an architecture of a system 2300 of a network, in accordance with at least one embodiment. In at least one embodiment, system 2300 is shown to include a user equipment (UE) 2302 and a UE 2304. In at least one embodiment, UEs 2302 and 2304 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 2302 and 2304 can comprise an Internet of Things (IoT) UE, which can comprise a network access layer designed for low-power applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting LTEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 2302 and 2304 may be configured to connect, e.g., communicatively couple, with a radio access network (RAN) 2316. In at least one embodiment, RAN 2316 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 2302 and 2304 utilize connections 2312 and 2314, respectively, each of which comprises a physical communications interface or layer. In at least one embodiment, connections 2312 and 2314 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, LTEs 2302 and 2304 may further directly exchange communication data via a ProSe interface 2306. In at least one embodiment, ProSe interface 2306 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, LTE 2304 is shown to be configured to access an access point (AP) 2310 via connection 2308. In at least one embodiment, connection 2308 can comprise a local wireless connection, such as a connection consistent with any IEEE 802.11 protocol, wherein AP 2310 would comprise a wireless fidelity (WiFi®) router. In at least one embodiment, AP 2310 is shown to be connected to an Internet without connecting to a core network of a wireless system.

In at least one embodiment, RAN 2316 can include one or more access nodes that enable connections 2312 and 2314. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 2316 may include one or more RAN nodes for providing macrocells, e.g., macro RAN node 2318, and one or more RAN nodes for providing femtocells or picocells (e.g., cells having smaller coverage areas, smaller user capacity, or higher bandwidth compared to macrocells), e.g., low power (LP) RAN node 2320.

In at least one embodiment, any of RAN nodes 2318 and 2320 can terminate an air interface protocol and can be a first point of contact for UEs 2302 and 2304. In at least one embodiment, any of RAN nodes 2318 and 2320 can fulfill various logical functions for RAN 2316 including, but not limited to, radio network controller (RNC) functions such as radio bearer management, uplink and downlink dynamic radio resource management and data packet scheduling, and mobility management.

In at least one embodiment, UEs 2302 and 2304 can be configured to communicate using Orthogonal Frequency-Division Multiplexing (OFDM) communication signals with each other or with any of RAN nodes 2318 and 2320 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal subcarriers.

In at least one embodiment, a downlink resource grid can be used for downlink transmissions from any of RAN nodes 2318 and 2320 to UEs 2302 and 2304, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 2302 and 2304. In at least one embodiment, a physical downlink control channel (PDCCH) may carry information about a transport format and resource allocations related to PDSCH channel, among other things. In at least one embodiment, it may also inform UEs 2302 and 2304 about a transport format, resource allocation, and HARQ (Hybrid Automatic Repeat Request) information related to an uplink shared channel. In at least one embodiment, typically, downlink scheduling (assigning control and shared channel resource blocks to UE 2302 within a cell) may be performed at any of RAN nodes 2318 and 2320 based on channel quality information fed back from any of UEs 2302 and 2304. In at least one embodiment, downlink resource assignment information may be sent on a PDCCH used for (e.g., assigned to) each of UEs 2302 and 2304.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 2316 is shown to be communicatively coupled to a core network (CN) 2338 via an S1 interface 2322. In at least one embodiment, CN 2338 may be an evolved packet core (EPC) network, a NextGen Packet Core (NPC) network, or some other type of CN. In at least one embodiment, S1 interface 2322 is split into two parts: S1-U interface 2326, which carries traffic data between RAN nodes 2318 and 2320 and serving gateway (S-GW) 2330, and a S1-mobility management entity (MME) interface 2324, which is a signaling interface between RAN nodes 2318 and 2320 and MMEs 2328.

In at least one embodiment, CN 2338 comprises MMEs 2328, S-GW 2330, Packet Data Network (PDN) Gateway (P-GW) 2334, and a home subscriber server (HSS) 2332. In at least one embodiment, MMEs 2328 may be similar in function to a control plane of legacy Serving General Packet Radio Service (CPRS) Support Nodes (SGSN). In at least one embodiment, MMEs 2328 may manage mobility aspects in access such as gateway selection and tracking area list management. In at least one embodiment, HSS 2332 may comprise a database for network users, including subscription related information to support a network entities' handling of communication sessions. In at least one embodiment, CN 2338 may comprise one or several HSSs 2332, depending on a number of mobile subscribers, on a capacity of an equipment, on an organization of a network, etc. In at least one embodiment, HSS 2332 can provide support for routing/roaming, authentication, authorization, naming/addressing resolution, location dependencies, etc.

In at least one embodiment, S-GW 2330 may terminate a S1 interface 2322 towards RAN 2316, and routes data packets between RAN 2316 and CN 2338. In at least one embodiment, S-GW 2330 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 2334 may terminate an S1 interface toward a PDN. In at least one embodiment, P-GW 2334 may route data packets between an EPC network 2338 and external networks such as a network including application server 2340 (alternatively referred to as application function (AF)) via an Internet Protocol (IP) interface 2342. In at least one embodiment, application server 2340 may be an element offering applications that use IP bearer resources with a core network (e.g., UMTS Packet Services (PS) domain, LTE PS data services, etc.). In at least one embodiment, P-GIN 2334 is shown to be communicatively coupled to an application server 2340 via an IP communications interface 2342. In at least one embodiment, application server 2340 can also be configured to support one or more communication services (e.g., Voice-over-Internet Protocol (VoIP) sessions, PTT sessions, group communication sessions, social networking services, etc.) for UEs 2302 and 2304 via CN 2338.

In at least one embodiment, P-GW 2334 may further be a node for policy enforcement and charging data collection. In at least one embodiment, policy and Charging Enforcement Function (PCRF) 2336 is a policy and charging control element of CN 2338. In at least one embodiment, in a non-roaming scenario, there may be a single PCP' in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 2336 may be communicatively coupled to application server 2340 via P-GW 2334. In at least one embodiment, application server 2340 may signal PCRF 2336 to indicate a new service flow and select an appropriate Quality of Service (QoS) and charging parameters. In at least one embodiment, PCRF 2336 may provision this rule into a Policy and Charging Enforcement Function (PCEF) (not shown) with an appropriate traffic flow template (TFT) and QoS class of identifier (QCI), which commences a QoS and charging as specified by application server 2340. In at least one embodiment, at least one component shown or described with respect to FIG. 23 is used to implement techniques and/or functions described herein and at least in conjunction with FIGS. 1-8. In at least one embodiment, one or more UEs 2304 causes an operating voltage of one or more integrated circuits to be adjusted, based at least in part, on an error rate as described herein and at least in conjunction with FIGS. 1-8.

Figure 24:
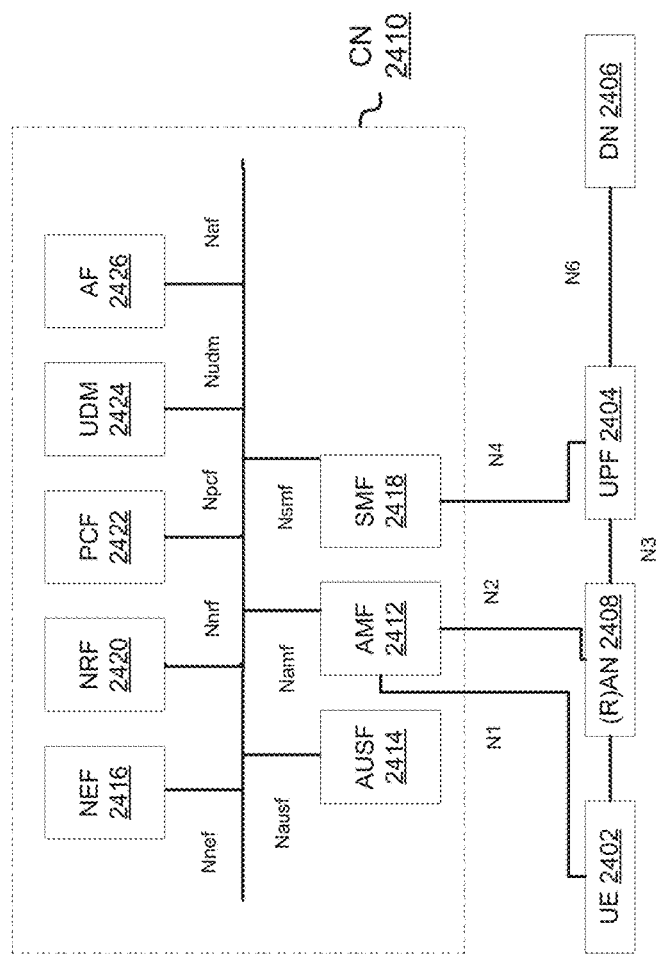
FIG. 24 illustrates an architecture of a system of a network, in accordance with at least one embodiment.

FIG. 24 illustrates an architecture of a system 2400 of a network in accordance with some embodiments. In at least one embodiment, system 2400 is shown to include a UE 2402, a 5G access node or RAN node (shown as (R)AN node 2408), a User Plane Function (shown as UPF 2404), a Data Network (DN 2406), which may be, for example, operator services, Internet access or 3rd party services, and a 5G Core Network (5GC) (shown as CN 2410).

In at least one embodiment, CN 2410 includes an Authentication Server Function (AUSF 2414); a Core Access and Mobility Management Function OW 2412); a Session Management Function (SMF 2418); a Network Exposure Function (NEF 2416); a Policy Control Function (PCF 2422); a Network Function (INF) Repository Function (NRF 2420); a Unified Data Management (UDM 2424); and an Application Function (AF 2426). In at least one embodiment, CN 2410 may also include other elements that are not shown, such as a Structured Data Storage network function (SDSF), an Unstructured Data. Storage network function (UDSF), and variations thereof.

In at least one embodiment, UPF 2404 may act as an anchor point for intra-RAT and inter-RAT mobility, an external PDU session point of interconnect to DN 2406, and a branching point to support multi-homed PDU session. In at least one embodiment, UPF 2404 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 2404 may include an uplink classifier to support routing traffic flows to a data network. In at least one embodiment, DN 2406 may represent various network operator services, Internet access, or third party services.

In at least one embodiment, AUSF 2414 may store data for authentication of LE 2402 and handle authentication related functionality. In at least one embodiment, AUSF 2414 may facilitate a common authentication framework for various access types.

In at least one embodiment, AMF 2412 may be responsible for registration management (e.g., for registering UE 2402, etc.), connection management, reachability management, mobility management, and lawful interception of AMF-related events, and access authentication and authorization. In at least one embodiment, AMF 2412 may provide transport for SM messages for SMF 2418, and act as a transparent proxy for routing SM messages. In at least one embodiment, AMF 2412 may also provide transport for short message service (SMS) messages between UE 2402 and an SMS function (SMSF) (not shown by FIG. 24). In at least one embodiment, AMF 2412 may act as Security Anchor Function (SEA), which may include interaction with AUSF 2414 and UE 2402 and receipt of an intermediate key that was established as a result of UE 2402 authentication process. In at least one embodiment, where USIM based authentication is used, AMF 2412 may retrieve security material from AUSF 2414. In at least one embodiment, AMF 2412 may also include a Security Context Management (SCM) function, which receives a key from SEA that it uses to derive access-network specific keys. In at least one embodiment, furthermore, AMF 2412 may be a termination point of RAN CP interface (N2 reference point), a termination point of NAS (NI) signaling, and perform NAS ciphering and integrity protection.

In at least one embodiment, AMF 2412 may also support NAS signaling with a UE 2402 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 2402 and AMF 2412, and relay uplink and downlink user-plane packets between UE 2402 and UPF 2404. In at least one embodiment, N3IWF also provides mechanisms for IPsec tunnel establishment with UE 2402.

In at least one embodiment, SWM 2418 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 2418 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 2416 may provide means for securely exposing services and capabilities provided by 3GPP network functions for third party, internal exposure/re-exposure, Application Functions (e.g., AF 2426), edge computing or fog computing systems, etc. In at least one embodiment, NEF 2416 may authenticate, authorize, and/or throttle AFs. In at least one embodiment, NIT 2416 may also translate information exchanged with AF 2426 and information exchanged with internal network functions. In at least one embodiment, NEF 2416 may translate between an AF-Service-Identifier and an internal 5GC information. In at least one embodiment, NEF 2416 may also receive information from other network functions (NFs) based on exposed capabilities of other network functions. In at least one embodiment, this information may be stored at NEF 2416 as structured data, or at a data storage NF using a standardized interfaces. In at least one embodiment, stored information can then be re-exposed by NET 2416 to other NTs and AFs, and/or used for other purposes such as analytics.

In at least one embodiment. NRF 2420 may support service discovery functions, receive NF Discovery Requests from NF instances, and provide information of discovered NF instances to NF instances. In at least one embodiment, NRF 2420 also maintains information of available NF instances and their supported services.

In at least one embodiment, PCF 2422 may provide policy rules to control plane function(s) to enforce them, and may also support unified policy framework to govern network behavior. In at least one embodiment, PCF 2422 may also implement a front end (FE) to access subscription information relevant for policy decisions in a UDR of UDM 2424.

In at least one embodiment, UDM 2424 may handle subscription-related information to support a network entities' handling of communication sessions, and may store subscription data of UE 2402. In at least one embodiment, UDM 2424 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 2422. In at least one embodiment, UDM 2424 may also support SMS management, wherein an SMS-FE implements a similar application logic as discussed previously.

In at least one embodiment, AF 2426 may provide application influence on traffic routing, access to a Network Capability Exposure (NCE), and interact with a policy framework for policy control. In at least one embodiment, NCE may be a mechanism that allows a 5GC and AF 2426 to provide information to each other via NET 2416, which may be used for edge computing implementations. In at least one embodiment, network operator and third party, services may be hosted close to UE 2402 access point of attachment to achieve an efficient service delivery through a reduced end-to-end latency and load on a transport network. In at least one embodiment, for edge computing implementations, 5GC may select a UPF 2404 close to UE 2402 and execute traffic steering from UPF 2404 to DN 2406 via N6 interface. In at least one embodiment, this may be based on UE subscription data, UE location, and information provided by AF 2426. In at least one embodiment, AF 2426 may influence UPF (re)selection and traffic routing. In at least one embodiment, based on operator deployment, when AF 2426 is considered to be a trusted entity, a network operator may permit AF 2426 to interact directly with relevant NFs.

In at least one embodiment, CN 2410 may include an SMSF, which may be responsible for SMS subscription checking and verification, and relaying SM messages to/from UE 2402 to/from other entities, such as an SMS-GMSC/IWMSC/SMS-router. In at least one embodiment, SMS may also interact with AMF 2412 and UDM 2424 for notification procedure that UE 2402 is available for SMS transfer (e.g., set a UE not reachable flag, and notifying UDM 2424 when UE 2402 is available for SMS).

In at least one embodiment, system 2400 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 2400 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 2410 may include an Nx interface, which is an inter-CN interface between MME and AMF 2412 in order to enable interworking between CN 2410 and CN 7224.

In at least one embodiment, system 2400 may include multiple RAN nodes (such as (R)AN node 2408) wherein an Xn interface is defined between two or more (R)AN node 2408 (e.g., gNBs) that connecting to 5GC 410, between a (R)AN node 2408 (e.g., gNB) connecting to CN 2410 and an eNB (e.g., a macro RAN node), and/or between two eNBs connecting to CN 2410.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for LTE 2402 in a connected mode (e.g., CM-CONNECTED) including functionality to manage UE mobility for connected mode between one or more (R)AN node 2408. In at least one embodiment, mobility support may include context transfer from an old (source) serving (R)AN node 2408 to new (target) serving (R)AN node 2408; and control of user plane tunnels between old (source) serving (R)AN node 2408 to new (target) serving (R)AN node 2408.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to an user plane and/or control plane protocol stack(s) shown and described herein. In at least one embodiment, at least one component shown or described with respect to FIG. 24 is used to implement techniques and/or functions described herein and at least in conjunction with FIGS. 1-8.

Figure 25:
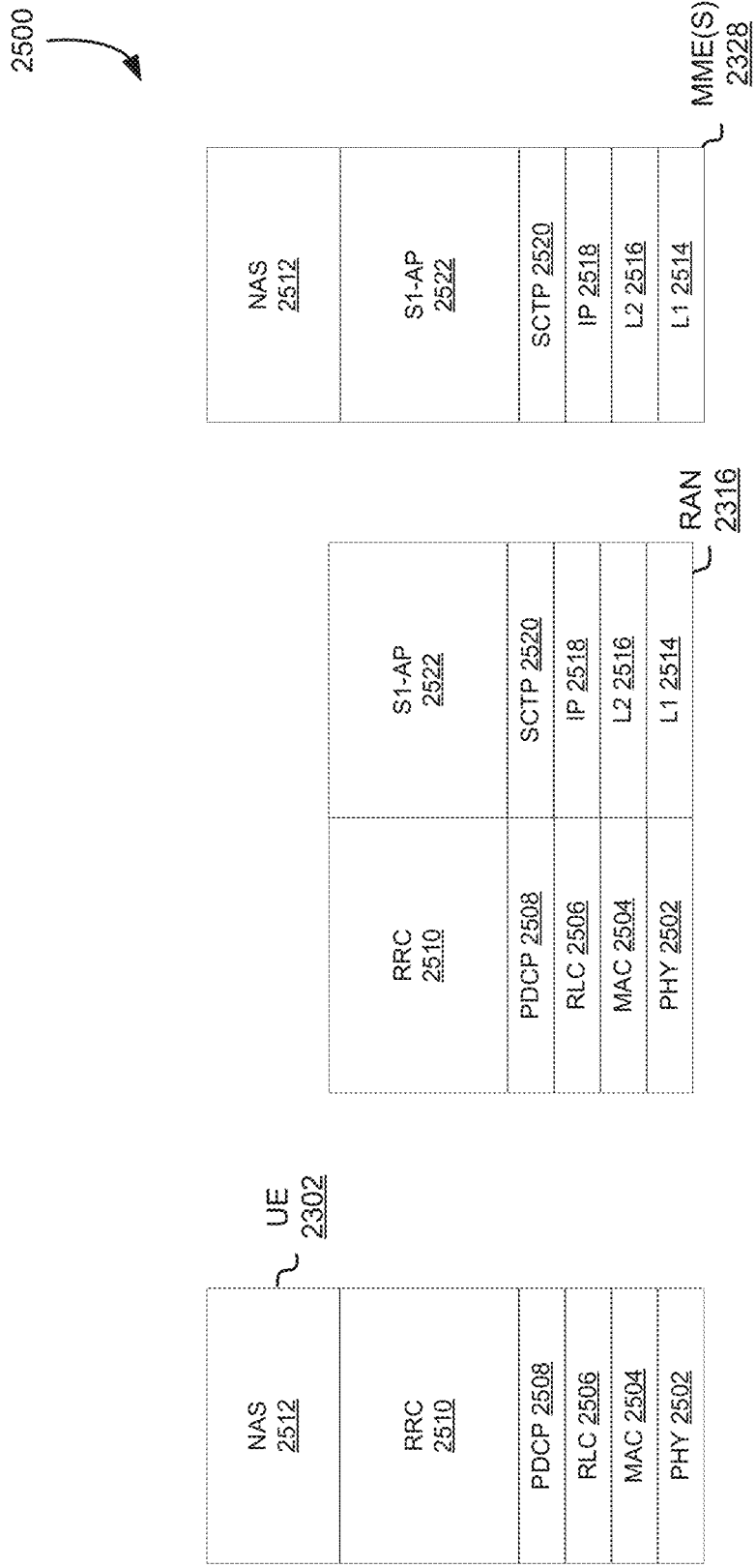
FIG. 25 illustrates a control plane protocol stack, in accordance with at least one embodiment.

FIG. 25 is an illustration of a control plane protocol stack in accordance with some embodiments. In at least one embodiment, a control plane 2500 is shown as a communications protocol stack between III. 2302 (or alternatively, UE 2304), RAN 2316, and MME(s) 2328.

In at least one embodiment, PHY layer 2502 may transmit or receive information used by MAC layer 2504 over one or more air interfaces. In at least one embodiment, PHY layer 2502 may further perform link adaptation or adaptive modulation and coding (AMC), power control, cell search (e.g., for initial synchronization and handover purposes), and other measurements used by higher layers, such as an RRC layer 2510. In at least one embodiment, PHY layer 2502 may still further perform error detection on transport channels, forward error correction (FEC) coding/de-coding of transport channels, modulation/demodulation of physical channels, interleaving, rate matching, mapping onto physical channels, and Multiple Input Multiple Output (MEMO) antenna processing.

In at least one embodiment, MAC layer 2504 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 2506 may operate in a plurality of modes of operation, including: Transparent Mode (TM), Unacknowledged Mode (UM), and Acknowledged Mode (AM). In at least one embodiment, RLC layer 2506 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 2506 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 2508 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 2510 may include broadcast of system information (e.g., included in Master information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 2302 and RAN 2316 may utilize a Uu interface (e.g., an LTE-Uu interface) to exchange control plane data via a protocol stack comprising PHY layer 2502, MAC layer 2504, RLC layer 2506, PDCP layer 2508, and RRC layer 2510.

In at least one embodiment, non-access stratum (NAS) protocols (NAS protocols 2512) form a highest stratum of a control plane between UE 2302 and MME(s) 2328. In at least one embodiment, NAS protocols 2512 support mobility of UE 2302 and session management procedures to establish and maintain IP connectivity between UE 2302 and P-GW 2334.

In at least one embodiment, Si Application Protocol (S1-AP) layer (Si-AP layer 2522) may support functions of a Si interface and comprise Elementary Procedures (EPs). In at least one embodiment, an EP is a unit of interaction between RAN 2316 and CN 2328. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internee protocol (SCTP/IP) layer) (SCTP layer 2520) may ensure reliable delivery of signaling messages between RAN 2316 and MME(s) 2328 based, in part, on an IP protocol, supported by an IP layer 2518. In at least one embodiment, L2 layer 2516 and an L1 layer 2514 may refer to communication links (e.g., wired or wireless) used by a RAN node and MME to exchange information.

In at least one embodiment, RAN 2316 and MME(s) 2328 may utilize an S1-MME interface to exchange control plane data via a protocol stack comprising a L1 layer 2514, L2 layer 2516, IP layer 2518, SCTP layer 2520, and Si-AP layer 2522. In at least one embodiment, at least one component shown or described with respect to FIG. 25 is used to implement techniques and/or functions described herein and at least in conjunction with FIGS. 1-8.

Figure 26:
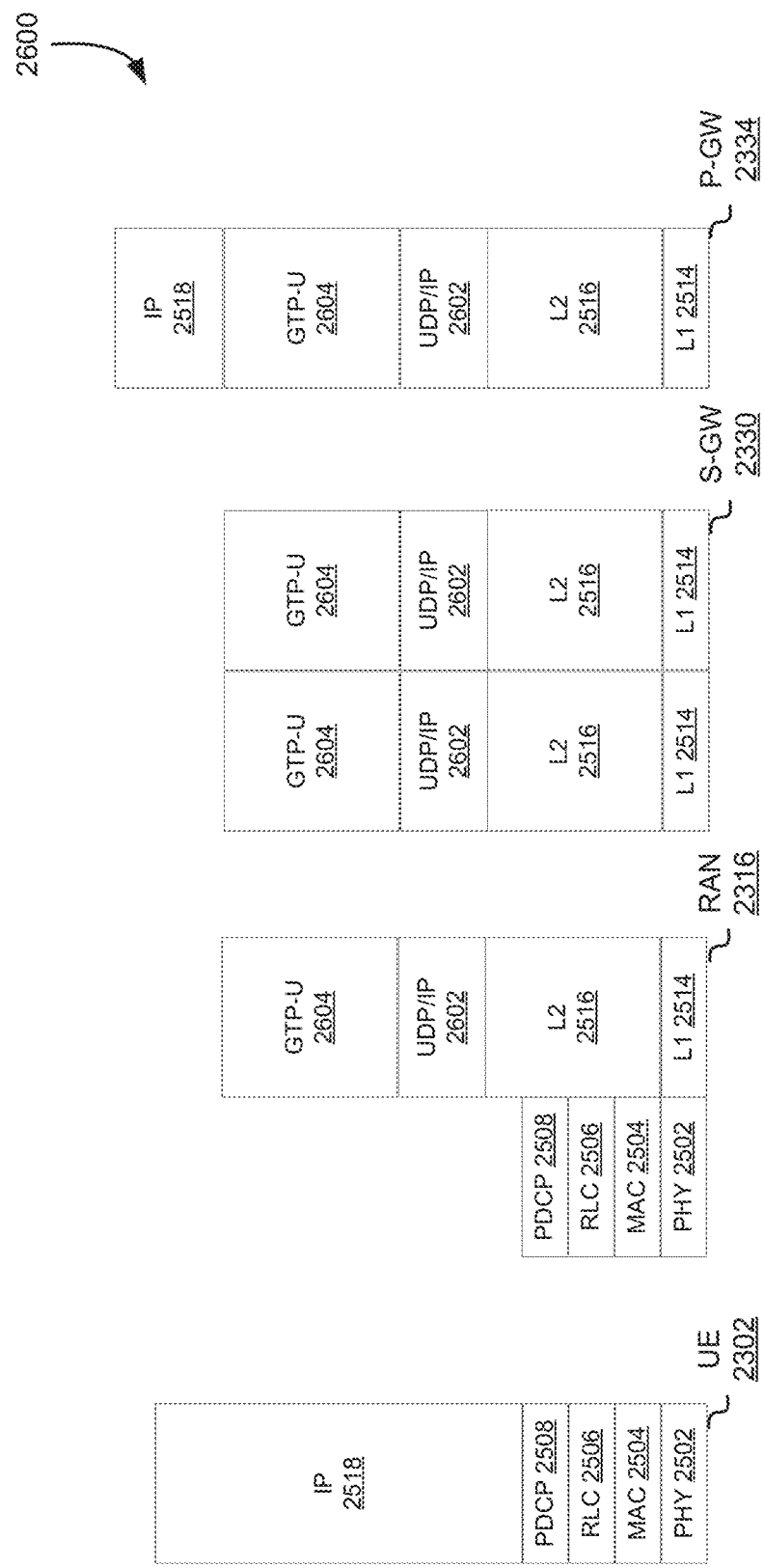
FIG. 26 illustrates a user plane protocol stack, in accordance with at least one embodiment.

FIG. 26 is an illustration of a user plane protocol stack in accordance with at least one embodiment. In at least one embodiment, a user plane 2600 is shown as a communications protocol stack between a TIE 2302, RAN 2316, S-GW 2330, and P-GW 2334. In at least one embodiment, user plane 2600 may utilize a same protocol layers as control plane 2500. In at least one embodiment, for example, UE 2302 and RAN 2316 may utilize a Uu interface (e.g., an LTE-Uu interface) to exchange user plane data via a protocol stack comprising PHY layer 2502, MAC layer 2504, RLC layer 2506, PDCP layer 2508.

In at least one embodiment, General Packet Radio Service (GPRS) Tunneling Protocol for a user plane (GTP-V) layer (GTP-U layer 2604) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 2602) may provide checksums for data integrity, port numbers for addressing different functions at a source and destination, and encryption and authentication on selected data flows. In at least one embodiment, RAN 2316 and S-GW 2330 may utilize an S1-U interface to exchange user plane data via a protocol stack comprising L1 layer 2514, L2 layer 2516, UDP/IP layer 2602, and GTP-U layer 2604. In at least one embodiment, S-GW 2330 and P-GW 2334 may utilize an S5/S8a interface to exchange user plane data via a protocol stack comprising L1 layer 2514, L2 layer 2516, UDP/IP layer 2602, and GTP-U layer 2604. In at least one embodiment, as discussed above with respect to FIG. 25. NAS protocols support a mobility of UE 2302 and session management procedures to establish and maintain IP connectivity between UE 2302 and P-GW 2334. In at least one embodiment, at least one component shown or described with respect to FIG. 26 is used to implement techniques and/or functions described herein and at least in conjunction with FIGS. 1-8.

Figure 27:
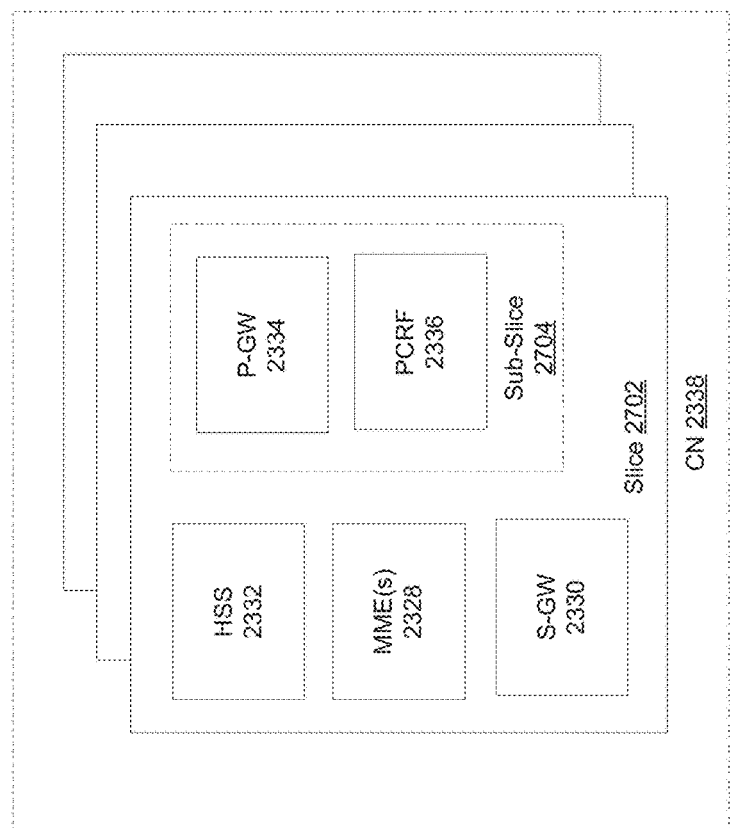
FIG. 27 illustrates components of a core network, in accordance with at least one embodiment.

FIG. 27 illustrates components 2700 of a core network in accordance with at least one embodiment. In at least one embodiment, components of CN 2338 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below), in at least one embodiment, a logical instantiation of CN 2338 may be referred to as a network slice 2702. (e.g., network slice 2702 is shown to include HSS 2332, MME(s) 2328, and S-GW 2330). In at least one embodiment, a logical instantiation of a portion of CN 2338 may be referred to as a network sub-slice 2704 (e.g., network sub-slice 2704 is shown to include P-GW 2334 and PCRF 2336).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions. In at least one embodiment, at least one component shown or described with respect to FIG. 27 is used to implement techniques and/or functions described herein and at least in conjunction with FIGS. 1-8.

Figure 28:
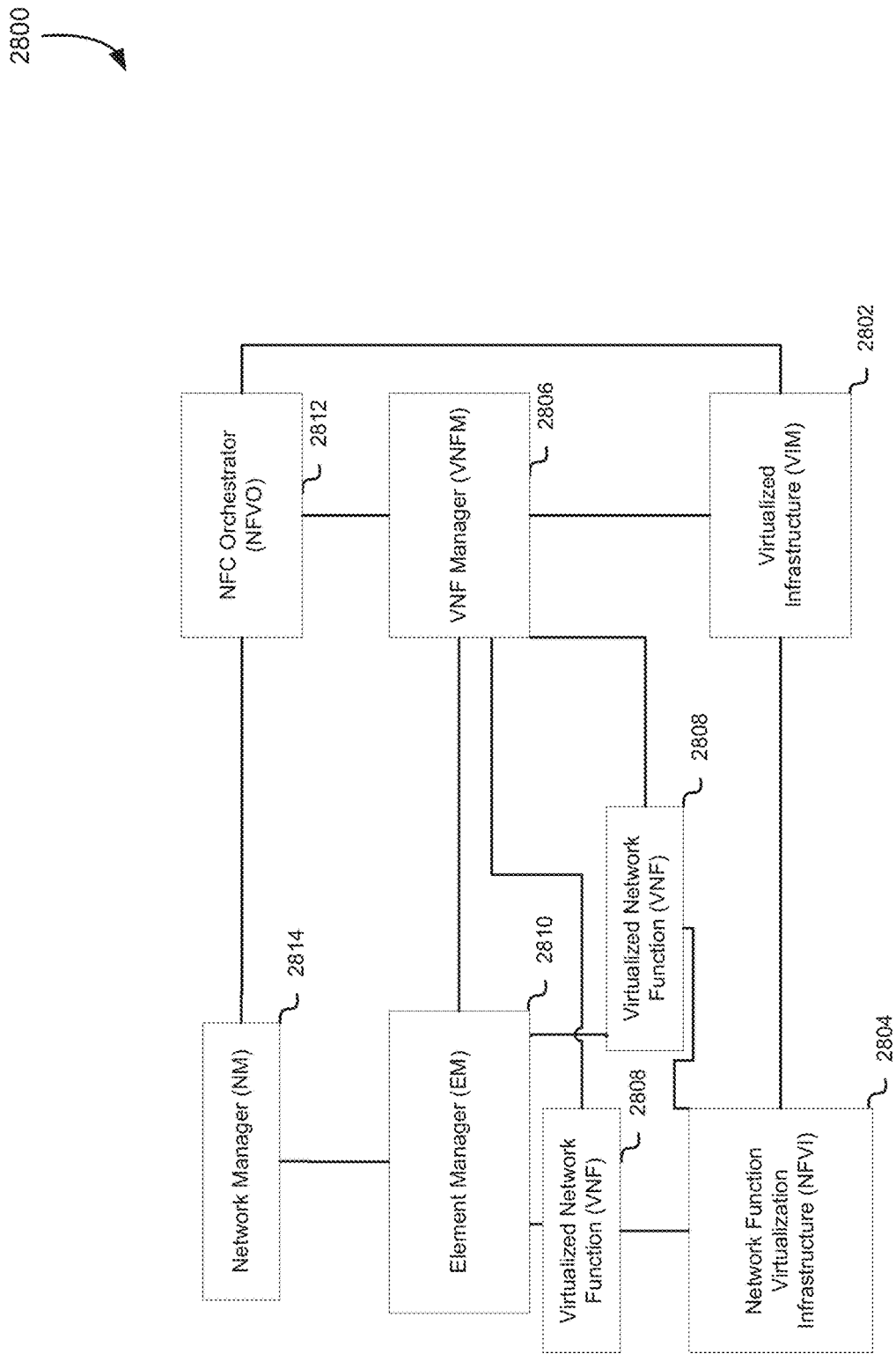
FIG. 28 illustrates components of a system to support network function virtualization (NFV), in accordance with at least one embodiment.

FIG. 28 is a block diagram illustrating components, according to at least one embodiment, of a system 2800 to support network function virtualization (NFV). In at least one embodiment, system 2800 is illustrated as including a virtualized infrastructure manager (shown as VIM 2802), a network function virtualization infrastructure (shown as NFVI 2804), a VNF manager (shown as VNFM 2806), virtualized network functions (shown as VNF 2808), an element manager (shown as EM 2810), an NFV Orchestrator (shown as NFVO 2812), and a network manager (shown as NM 2814).

In at least one embodiment, VIM 2802 manages resources of NFVI 2804. In at least one embodiment, NFVI 2804 can include physical or virtual resources and applications (including hypervisors) used to execute system 2800. In at least one embodiment, VIM 2802 may manage a life cycle of virtual resources with NFVI 2804 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 2806 may manage VNF 2808. In at least one embodiment, VNF 2808 may be used to execute EPC components/functions. In at least one embodiment, VNFM 2806 may manage a life cycle of VNF 2808 and track performance, fault and security of virtual aspects of INF 2808. In at least one embodiment, EM 2810 may track performance, fault and security of functional aspects of VNF 2808. In at least one embodiment, tracking data from VNFM 2806 and EM 2810 may comprise, for example, performance measurement (PM) data used by VIM 2802 or NEVI 2804. In at least one embodiment, both VNFM 2806 and EM 2810 can scale up/down a quantity of VNFs of system 2800.

In at least one embodiment, NFVO 2812 may coordinate, authorize, release and engage resources of NFVI 2804 in order to provide a requested service (e.g., to execute an EPC function, component, or slice). In at least one embodiment, NM 2814 may provide a package of end-user functions with responsibility for a management of a network, which may include network elements with VNFs, non-virtualized network functions, or both (management of VNFs may occur via an EM 2810). In at least one embodiment, at least one component shown or described with respect to FIG. 28 is used to implement techniques and/or functions described herein and at least in conjunction with FIGS. 1-8. In at least one embodiment, VNFM 2806 causes an operating voltage of one or more integrated circuits to be adjusted, based at least in part, on an error rate as described herein and at least in conjunction with FIGS. 1-8.

Computer-Based Systems

The following figures set forth, without limitation, exemplary computer-based systems that can be used to implement at least one embodiment.

Figure 29:
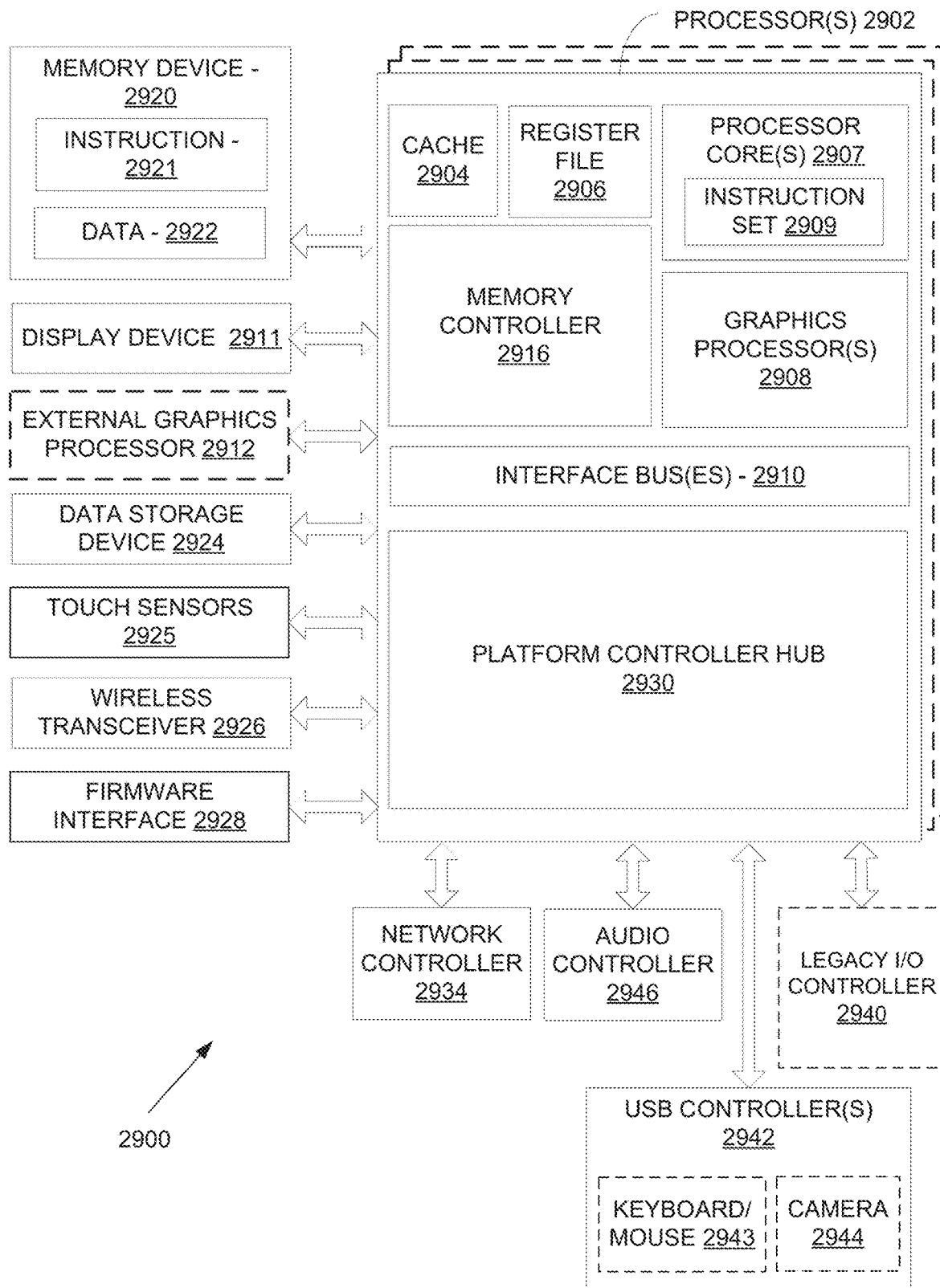
FIG. 29 illustrates a processing system, in accordance with at least one embodiment.

FIG. 29 illustrates a processing system 2900, in accordance with at least one embodiment. In at least one embodiment, processing system 2900 includes one or more processors 2902 and one or more graphics processors 2908, and may be a single processor desktop system, a multiprocessor workstation system, or a server system having a large number of processors 2902 or processor cores 2907. In at least one embodiment, processing system 2900 is a processing platform incorporated within a system-on-a-chip ("SoC") integrated circuit for use in mobile, handheld, or embedded devices.

In at least one embodiment, processing system 2900 can include, or be incorporated within a server-based gaming platform, a game console, a media console, a mobile gaming console, a handheld game console, or an online game console. In at least one embodiment, processing system 2900 is a mobile phone, smart phone, tablet computing device or mobile Internet device. In at least one embodiment, processing system 2900 can also include, couple with, or be integrated within a wearable device, such as a smart watch wearable device, smart eyewear device, augmented reality device, or virtual reality device. In at least one embodiment, processing system 2900 is a television or set top box device having one or more processors 2902 and a graphical interface generated by one or more graphics processors 2908.

In at least one embodiment, one or more processors 2902 each include one or more processor cores 2907 to process instructions which, when executed, perform operations for system and user software. In at least one embodiment, each of one or more processor cores 2907 is configured to process a specific instruction set 2909. In at least one embodiment, instruction set 2909 may facilitate Complex Instruction Set Computing ("CISC"), Reduced Instruction Set Computing ("RISC"), or computing via a Very bong Instruction Word ("VLIW"). In at least one embodiment, processor cores 2907 may each process a different instruction set 2909, which may include instructions to facilitate emulation of other instruction sets. In at least one embodiment, processor core 2907 may also include other processing devices, such as a digital signal processor ("DSP").

In at least one embodiment, processor 2902 includes cache memory ('cache') 2904. In at least one embodiment, processor 2902 can have a single internal cache or multiple levels of internal cache. In at least one embodiment, cache memory is shared among various components of processor 2902. In at least one embodiment, processor 2902 also uses an external cache (e.g., a Level 3 ("L3") cache or Last Level Cache ("LLC")) (not shown), which may be shared among processor cores 2907 using known cache coherency techniques. In at least one embodiment, register file 2906 is additionally included in processor 2902 which may include different types of registers for storing different types of data (e.g., integer registers, floating point registers, status registers, and an instruction pointer register). In at least one embodiment, register file 2906 may include general-purpose registers or other registers.

In at least one embodiment, one or more processor(s) 2902 are coupled with one or more interface bus(es) 2910 to transmit communication signals such as address, data, or control signals between processor 2902 and other components in processing system 2900. In at least one embodiment interface bus 2910, in one embodiment, can be a processor bus, such as a version of a Direct Media Interface ("DMI") bus. In at least one embodiment, interface bus 2910 is not limited to a Mai bus, and may include one or more Peripheral Component Interconnect buses (e.g., "PCI," PCI Express ("PCIe")), memory buses, or other types of interface buses. In at least one embodiment processor(s) 2902 include an integrated memory controller 2916 and a platform controller hub 2930. In at least one embodiment, memory controller 2916 facilitates communication between a memory device and other components of processing system 2900, while platform controller hub ("PCH") 2930 provides connections to Input/Output ("I/O") devices via a local I/O bus.

In at least one embodiment, memory device 2920 can be a dynamic random access memory ("DRAM") device, a static random access memory ("SRAM") device, flash memory device, phase-change memory device, or some other memory device having suitable performance to serve as processor memory. In at least one embodiment memory device 2920 can operate as system memory for processing system 2900, to store data 2922 and instructions 2921 for use when one or more processors 2902 executes an application or process. In at least one embodiment, memory controller 2916 also couples with an optional external graphics processor 2912, which may communicate with one or more graphics processors 2908 in processors 2902 to perform graphics and media operations. In at least one embodiment, a display device 2911 can connect to processor(s) 2902. In at least one embodiment display device 2911 can include one or more of an internal display device, as in a mobile electronic device or a laptop device or an external display device attached via a display interface (e.g., DisplayPort, etc.). In at least one embodiment, display device 2911 can include a head mounted display ("MID") such as a stereoscopic display device for use in virtual reality ("VR") applications or augmented reality ("AK") applications.

In at least one embodiment, platform controller hub 2930 enables peripherals to connect to memory device 2920 and processor 2902 via a high-speed I/O bus. In at least one embodiment, I/O peripherals include, but are not limited to, an audio controller 2946, a network controller 2934, a firmware interface 2928, a wireless transceiver 2926, touch sensors 2925, a data storage device 2924 (e.g., hard disk drive, flash memory, etc.). In at least one embodiment, data storage device 2924 can connect via a storage interface (e.g., SATA) or via a peripheral bus, such as PCI, or PCIe. In at least one embodiment, touch sensors 2925 can include touch screen sensors, pressure sensors, or fingerprint sensors. In at least one embodiment, wireless transceiver 2926 can be a Wi-Fi transceiver, a Bluetooth transceiver, or a mobile network transceiver such as a 3G, 4G, or Long Term Evolution ("LTE") transceiver. In at least one embodiment, firmware interface 2928 enables communication with system firmware, and can be, for example, a unified extensible firmware interface ("UEFI"). In at least one embodiment, network controller 2934 can enable a network connection to a wired network. In at least one embodiment, a high-performance network controller (not shown) couples with interface bus 2910. In at least one embodiment, audio controller 2946 is a multi-channel high definition audio controller. In at least one embodiment, processing system 2900 includes an optional legacy I/O controller 2940 for coupling legacy (e.g., Personal System 2 ("PS/2")) devices to processing system 2900. In at least one embodiment, platform controller hub 29:30 can also connect to one or more Universal Serial Bus ("USB") controllers 2942 connect input devices, such as keyboard and mouse 2943 combinations, a camera 2944, or other USB input devices.

In at least one embodiment, an instance of memory controller 2916 and platform controller hub 2930 may be integrated into a discreet external graphics processor, such as external graphics processor 2912. In at least one embodiment, platform controller hub 2930 and/or memory controller 2916 may be external to one or more processor(s) 2902. For example, in at least one embodiment, processing system 2900 can include an external memory controller 2916 and platform controller hub 2930, which may be configured as a memory controller hub and peripheral controller hub within a system chipset that is in communication with processor(s) 2902. In at least one embodiment, at least one component shown or described with respect to FIG. 29 is used to implement techniques and/or functions described herein and at least in conjunction with FIGS. 1-8. In at least one embodiment, processor(s) 2902 cause an operating voltage of one or more integrated circuits to be adjusted, based at least in part, on an error rate as described herein and at least in conjunction with FIGS. 1-8.

Figure 30:
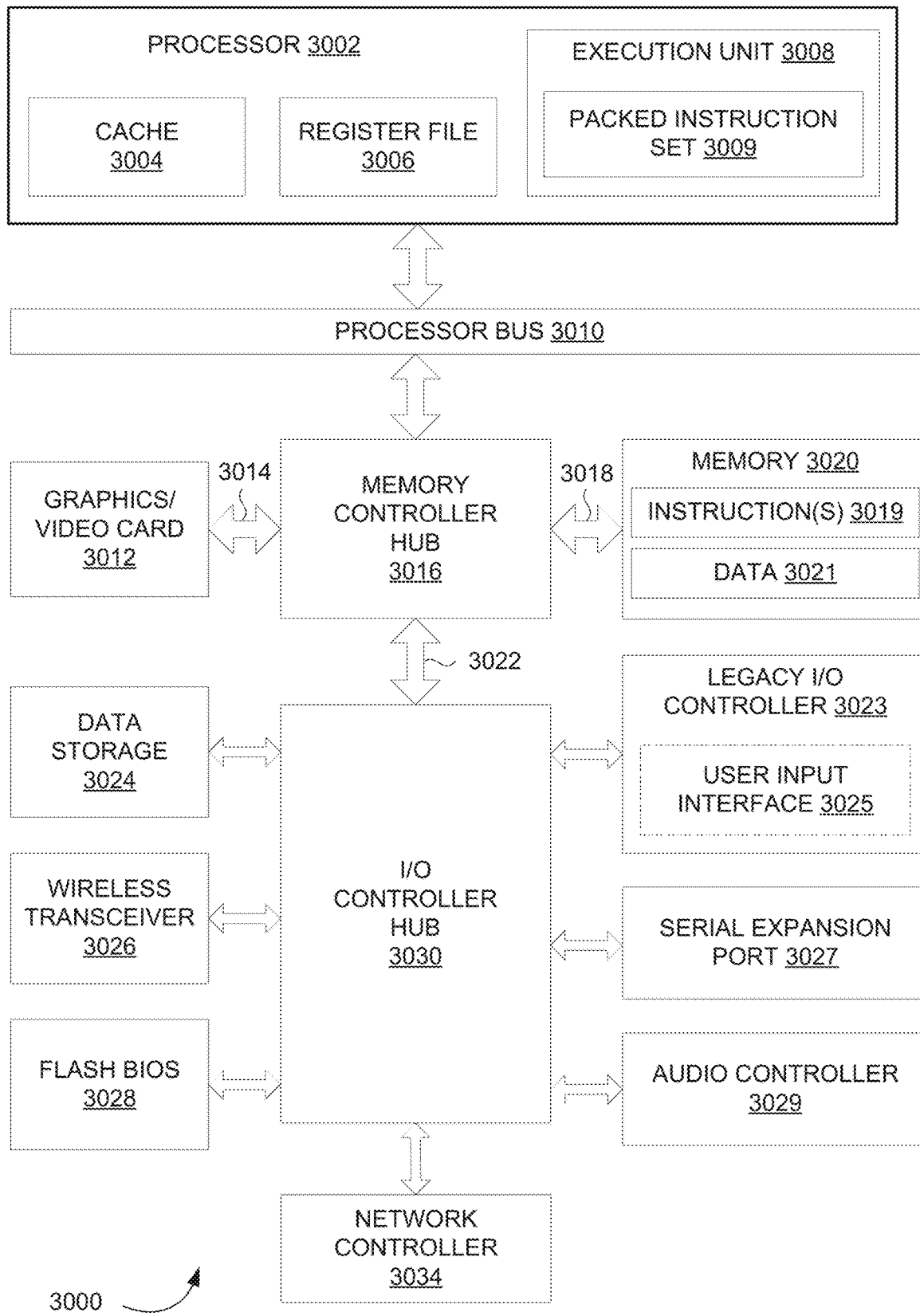
FIG. 30 illustrates a computer system, in accordance with at least one embodiment.

FIG. 30 illustrates a computer system 3000, in accordance with at least one embodiment. In at least one embodiment, computer system 3000 may be a system with interconnected devices and components, an SOC, or some combination. In at least on embodiment, computer system 3000 is formed with a processor 3002 that may include execution units to execute an instruction. In at least one embodiment, computer system 3000 may include, without limitation, a component, such as processor 3002 to employ execution units including logic to perform algorithms for processing data. In at least one embodiment, computer system 3000 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3000 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3000 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3000 may include, without limitation, processor 3002 that may include, without limitation, one or more execution units 3008 that may be configured to execute a Compute Unified Device Architecture ("CUDA") (CUDA® is developed by NVIDIA Corporation of Santa Clara, CA) program. In at least one embodiment, a. CUDA program is at least a portion of a software application written in a CUDA programming language. In at least one embodiment, computer system 3000 is a single processor desktop or server system. In at least one embodiment, computer system 3000 may be a multiprocessor system. In at least one embodiment, processor 3002 may include, without limitation, a CISC microprocessor, a RISC microprocessor, a VLIW microprocessor, a processor implementing a combination of instruction sets, or any other processor device, such as a digital signal processor, for example. In at least one embodiment, processor 3002 may be coupled to a processor bus 3010 that may transmit data signals between processor 3002 and other components in computer system 3000.

In at least one embodiment, processor 3002 may include, without limitation, a Level 1 ("L1") internal cache memory ("cache") 3004. In at least one embodiment, processor 3002 may have a single internal cache or multiple levels of internal cache. In at least one embodiment, cache memory may reside external to processor 3002. In at least one embodiment, processor 3002 may also include a combination of both internal and external caches. In at least one embodiment, a register file 3006 may store different types of data in various registers including, without limitation, integer registers, floating point registers, status registers, and instruction pointer register.

In at least one embodiment, execution unit 3008, including, without limitation, logic to perform integer and floating point operations, also resides in processor 3002. Processor 3002 may also include a microcode ("ucode") read only memory ("ROM") that stores microcode for certain macro instructions. In at least one embodiment, execution unit 3008 may include logic to handle a packed instruction set 3009. In at least one embodiment, by including packed instruction set 3009 in an instruction set of a general-purpose processor 3002, along with associated circuitry to execute instructions, operations used by many multimedia applications may be performed using packed data in a general-purpose processor 3002. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3008 may also be used in microcontrollers, embedded processors, graphics devices, DSPs, and other types of logic circuits. In at least one embodiment, computer system 3000 may include, without limitation, a memory 3020. In at least one embodiment, memory 3020 may be implemented as a DRAM device, an SRAM device, flash memory device, or other memory device. Memory 3020 may store instruction(s) 3019 and/or data 3021 represented by data signals that may be executed by processor 3002.

In at least one embodiment, a system logic chip may be coupled to processor bus 3010 and memory 3020. In at least one embodiment, a system logic chip may include, without limitation, a memory controller hub ("MCH") 3016, and processor 3002 may communicate with MCH 3016 via processor bus 3010. In at least one embodiment, MCH 3016 may provide a high bandwidth memory path 3018 to memory 3020 for instruction and data storage and for storage of graphics commands, data and textures. In at least one embodiment, MCH 3016 may direct data signals between processor 3002, memory 3020, and other components in computer system 3000 and to bridge data signals between processor bus 3010, memory 3020, and a system I/O 3022. In at least one embodiment, system logic chip may provide a graphics port for coupling to a graphics controller. In at least one embodiment, MCII 3016 may be coupled to memory 3020 through high bandwidth memory path 3018 and graphics/video card 3012 may be coupled to MCH 3016 through an Accelerated Graphics Port ("AGP") interconnect 3014.

In at least one embodiment, computer system 3000 may use system I/O 3022 that is a proprietary hub interface bus to couple MCH 3016 to I/O controller hub ("ICH") 3030. In at least one embodiment, ICH 3030 may provide direct connections to some I/O devices via a local I/O bus. In at least one embodiment, local I/O bus may include, without limitation, a high-speed I/O bus for connecting peripherals to memory 3020, a chipset, and processor 3002. Examples may include, without limitation, an audio controller 3029, a firmware hub ("flash BIOS") 3028, a wireless transceiver 3026, a data storage 3024, a legacy I/O controller 3023 containing a user input interface 3025 and a keyboard interface, a serial expansion port 3027, such as a USB, and a network controller 3034. Data storage 3024 may comprise a hard disk drive, a floppy disk drive, a CD-ROM device, a flash memory device, or other mass storage device.

In at least one embodiment, FIG. 30 illustrates a system, which includes interconnected hardware devices or "chips." In at least one embodiment, FIG. 30 may illustrate an exemplary SoC. In at least one embodiment, devices illustrated in FIG. 30 may be interconnected with proprietary interconnects, standardized interconnects (e.g., PCIe), or some combination thereof. In at least one embodiment, one or more components of system 3000 are interconnected using compute express link ("CXL") interconnects. In at least one embodiment, at least one component shown or described with respect to FIG. 30 is used to implement techniques and/or functions described herein and at least in conjunction with FIGS. 1-8. In at least one embodiment, processor 3002 an operating voltage of one or more integrated circuits to be adjusted, based at least in part, on an error rate as described herein and at least in conjunction with FIGS. 1-8.

Figure 31:
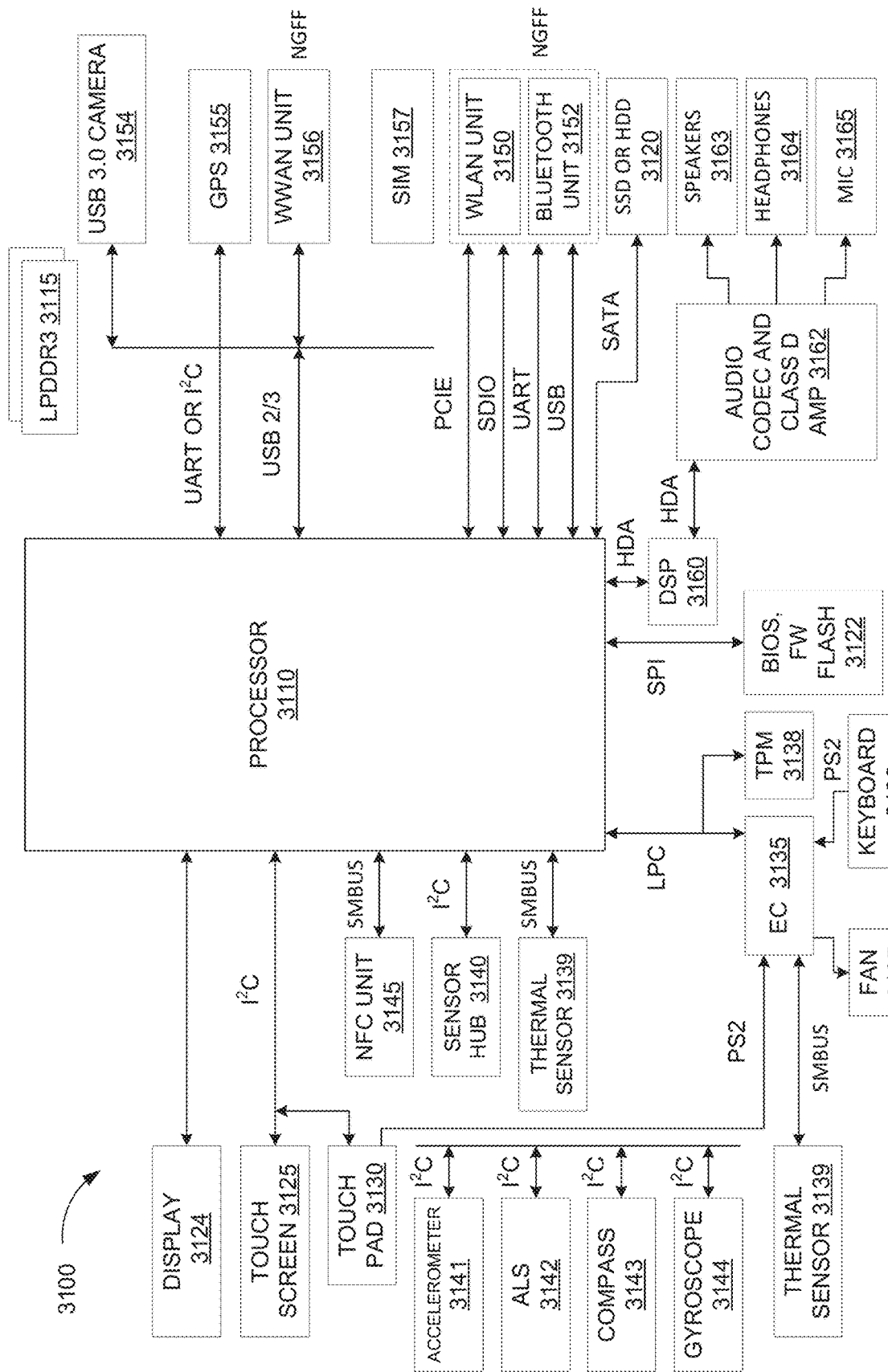
FIG. 31 illustrates a system, in accordance with at least one embodiment.

FIG. 31 illustrates a system 3100, in accordance with at least one embodiment. In at least one embodiment, system 3100 is an electronic device that utilizes a processor 3110. In at least one embodiment, system 3100 may be, for example and without limitation, a notebook, a tower server, a rack server, a blade server, a laptop, a desktop, a tablet, a mobile device, a phone, an embedded computer, or any other suitable electronic device.

In at least one embodiment, system 3100 may include, without limitation, processor 3110 communicatively coupled to any suitable number or kind of components, peripherals, modules, or devices. In at least one embodiment, processor 3110 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 31 illustrates a system which includes interconnected hardware devices or "chips." In at least one embodiment, FIG. 31 may illustrate an exemplary SoC. In at least one embodiment, devices illustrated in FIG. 31 may be interconnected with proprietary interconnects, standardized interconnects (e.g., PCIe) or some combination thereof. In at least one embodiment, one or more components of FIG. 31 are interconnected using CXL interconnects.

In at least one embodiment, FIG. 31 may include a display 3124, a touch screen 3125, a touch pad 3130, a Near Field Communications unit ("NFC") 3145, a sensor hub 3140, a thermal sensor 3146, an Express Chipset ("EC") 3135, a Trusted Platform Module ("TPM") 3138, BIOS/firmware/flash memory ("BIOS, FW Flash") 3122, a DSP 3160, a Solid State Disk ("SSD") or Hard Disk Drive ("HDD") 3120, a wireless local area network unit ("WLAN") 3150, a Bluetooth unit 3152, a Wireless Wide Area Network unit ("WWAN") 3156, a Global Positioning System ("UPS") 3155, a camera ("USB 3.0 camera") 3154 such as a USB 3.0 camera, or a Low Power Double Data Rate ("LPDDR") memory unit ("LPDDR3") 3115 implemented in, for example, LPDDR3 standard. These components may each be implemented in any suitable manner.

In at least one embodiment, other components may be communicatively coupled to processor 3110 through components discussed above. In at least one embodiment, an accelerometer 3141, an Ambient Light Sensor ("ALS") 3142, a compass 3143, and a gyroscope 3144 may be communicatively coupled to sensor hub 3140. In at least one embodiment, a thermal sensor 3139, a fan 3137, a keyboard 3146, and a touch pad 3130 may be communicatively coupled to EC 3135. In at least one embodiment, a speaker 3163, a headphones 3164, and a microphone ("mic") 3165 may be communicatively coupled to an audio unit ("audio codec and class d amp") 3164, which may in turn be communicatively coupled to DSP 3160. In at least one embodiment, audio unit 3164 may include, for example and without limitation, an audio coder/decoder ("codec") and a class D amplifier. In at least one embodiment, a SIM card ("SIM") 3157 may be communicatively coupled to WWAN unit 3156. In at least one embodiment, components such as WLAN unit 3150 and Bluetooth unit 3152, as well as WWAN unit 3156 may be implemented in a Next Generation Form Factor ("NGFF"). In at least one embodiment, at least one component shown or described with respect to FIG. 31 is used to implement techniques and/or functions described herein and at least in conjunction with FIGS. 1-8. In at least one embodiment, processor 3110 causes an operating voltage of one or more integrated circuits to be adjusted, based at least in part, on an error rate as described herein and at least in conjunction with FIGS. 1-8.

Figure 32:
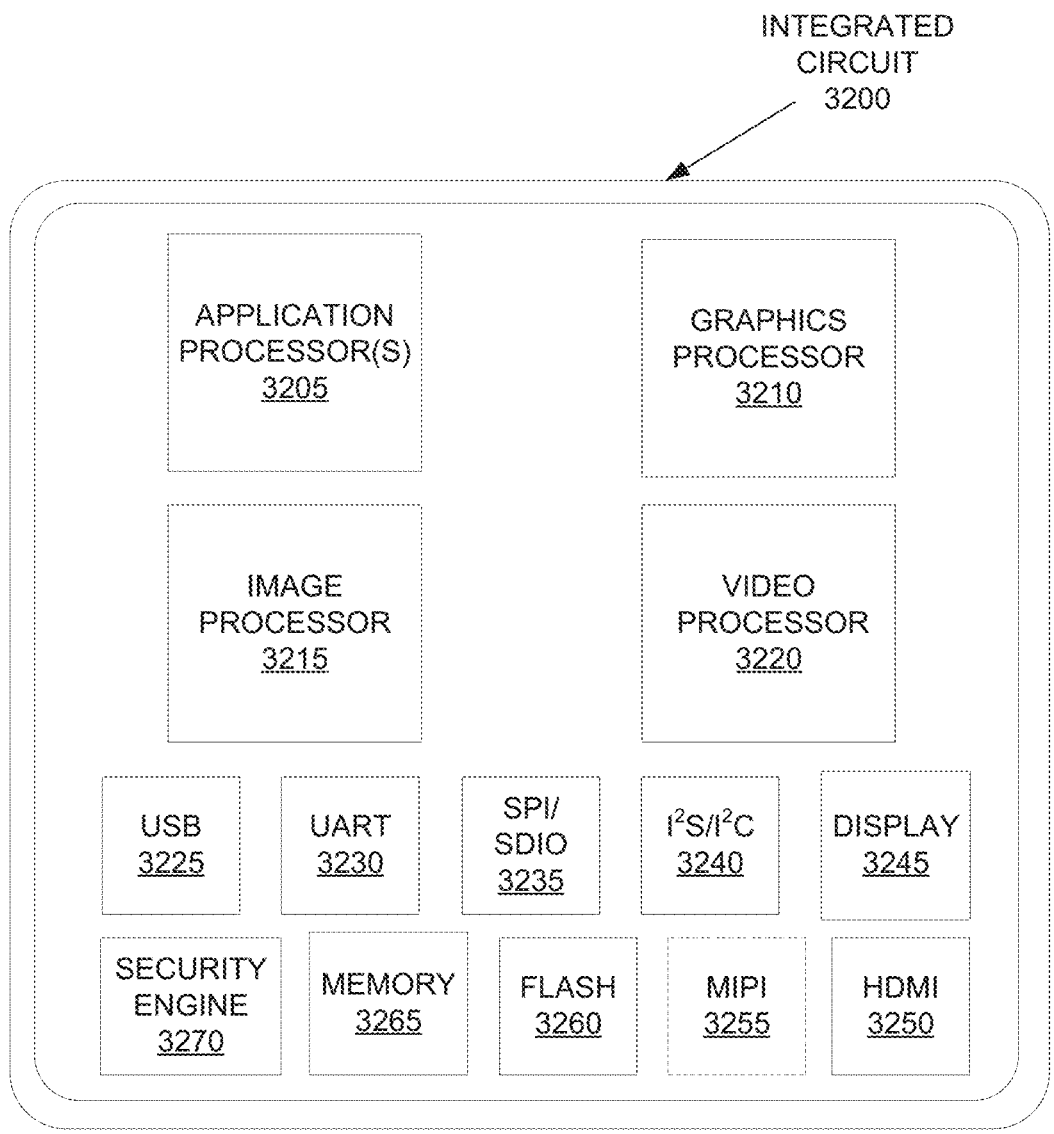
FIG. 32 illustrates an exemplary integrated circuit, in accordance with at least one embodiment.

FIG. 32 illustrates an exemplary integrated circuit 3200, in accordance with at least one embodiment. In at least one embodiment, exemplary integrated circuit 3200 is an SoC that may be fabricated using one or more IP cores. In at least one embodiment, integrated circuit 3200 includes one or more application processor(s) 3205 (e.g., CPUs), at least one graphics processor 3210, and may additionally include an image processor 3215 and/or a video processor 3220, any of which may be a modular FP core. In at least one embodiment, integrated circuit 3200 includes peripheral or bus logic including a USB controller 3225, a UART controller 3230, an SPI/SDIO controller 3235, and an I²S/I²C controller 3240. In at least one embodiment, integrated circuit 3200 can include a display device 3245 coupled to one or more of a high-definition multimedia interface ("HDMI") controller 3250 and a mobile industry processor interface ("MIPI") display interface 3255. In at least one embodiment, storage may be provided by a flash memory, subsystem 3260 including flash memory and a flash memory controller. In at least one embodiment, a memory interface may be provided via a memory controller 3265 for access to SDRAM or SRAM memory devices. In at least one embodiment, some integrated circuits additionally include an embedded security engine 3270. In at least one embodiment, at least one component shown or described with respect, to FIG. 32 is used to implement techniques and/or functions described herein and at least in conjunction with FIGS. 1-8. In at least one embodiment, application processor(s) 3205 causes an operating voltage of one or more integrated circuits to be adjusted, based at least in part, on an error rate as described herein and at least in conjunction with FIGS. 1-8.

Figure 33:
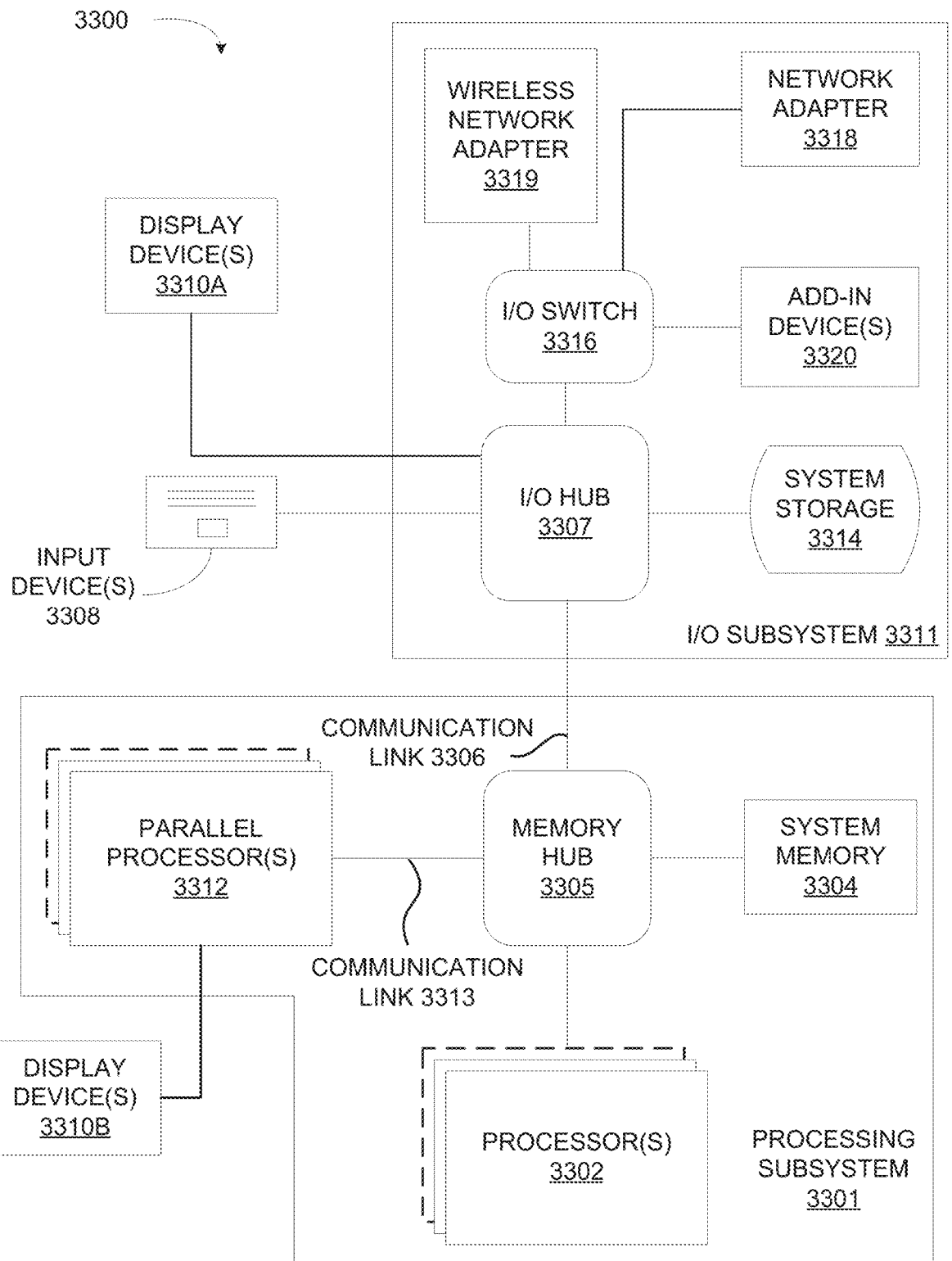
FIG. 33 illustrates a computing system, according to at least one embodiment.

FIG. 33 illustrates a computing system 3300, according to at least one embodiment; In at least one embodiment, computing system 3300 includes a processing subsystem 3301 having one or more processor(s) 3302 and a system memory 3304 communicating via an interconnection path that may include a memory hub 3305. In at least one embodiment, memory hub 3305 may be a separate component within a chipset component or may be integrated within one or more processor(s) 3302. In at least one embodiment, memory hub 3305 couples with an I/O subsystem 3311 via a communication link 3306. In at least one embodiment, subsystem 3311 includes an I/O hub 3307 that can enable computing system 3300 to receive input from one or more input device(s) 3308. In at least one embodiment, I/O hub 3307 can enable a display controller, which may be included in one or more processor(s) 3302, to provide outputs to one or more display device(s) 3310A. In at least one embodiment, one or more display device(s) 3310A coupled with I/O hub 3307 can include a local, internal, or embedded display device.

In at least one embodiment, processing subsystem 3301 includes one or more parallel processor(s) 3312 coupled to memory hub 3305 via a bus or other communication link 3313. In at least one embodiment, communication link 3313 may be one of any number of standards based communication link technologies or protocols, such as, but not limited to PCIe, or may be a vendor specific communications interface or communications fabric. In at least one embodiment, one or more parallel processor(s) 3312 form a computationally focused parallel or vector processing system that can include a large number of processing cores and/or processing clusters, such as a many integrated core processor. In at least one embodiment, one or more parallel processor(s) 3312 form a graphics processing subsystem that can output pixels to one of one or more display device(s) 3310A coupled via I/O Hub 3307. In at least one embodiment, one or more parallel processor(s) 3312 can also include a display controller and display interface (not shown) to enable a direct connection to one or more display device(s) 3310B.

In at least one embodiment, a system storage unit 3314 can connect to I/O hub 3307 to provide a storage mechanism for computing system 3300. In at least one embodiment, an I/O switch 3316 can be used to provide an interface mechanism to enable connections between I/O hub 3307 and other components, such as a network adapter 3318 and/or wireless network adapter 3319 that may be integrated into a platform, and various other devices that can be added via one or more add-in devices) 3320. In at least one embodiment, network adapter 3318 can be an Ethernet adapter or another wired network adapter. In at least one embodiment, wireless network adapter 3319 can include one or more of a Wi-Fi, Bluetooth, NFC, or other network device that includes one or more wireless radios.

In at least one embodiment, computing system 3300 can include other components not explicitly shown, including USB or other port connections, optical storage drives, video capture devices, and/or variations thereof, that may also be connected to I/O hub 3307. In at least one embodiment, communication paths interconnecting various components in FIG. 33 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3312 incorporate circuitry optimized for graphics and video processing, including, for example, video output circuitry, and constitutes a graphics processing unit ("GPU"). In at least one embodiment, one or more parallel processor(s) 3312 incorporate circuitry optimized for general purpose processing. In at least embodiment, components of computing system 3300 may be integrated with one or more other system elements on a single integrated circuit. For example, in at least one embodiment, one or more parallel processor(s) 3312, memory hub 3305, processor(s) 3302, and I/O hub 3307 can be integrated into a SoC integrated circuit. In at least one embodiment, components of computing system 3300 can be integrated into a single package to form a system in package ("SIP") configuration. In at least one embodiment, at least a portion of components of computing system 3300 can be integrated into a multi-chip module ("MCM"), which can be interconnected with other multi-chip modules into a modular computing system. In at least one embodiment, I/O subsystem 3311 and display devices 3310B are omitted from computing system 3300. In at least one embodiment, at least one component shown or described with respect to FIG. 33 is used to implement techniques and/or functions described herein and at least in conjunction with FIGS. 1-8. In at least one embodiment, processor(s) 3302 causes an operating voltage of one or more integrated circuits to be adjusted, based at least in part, on an error rate as described herein and at least in conjunction with FIGS. 1-8.

Processing Systems

The following figures set forth, without limitation, exemplary processing systems that can be used to implement at least one embodiment.

Figure 34:
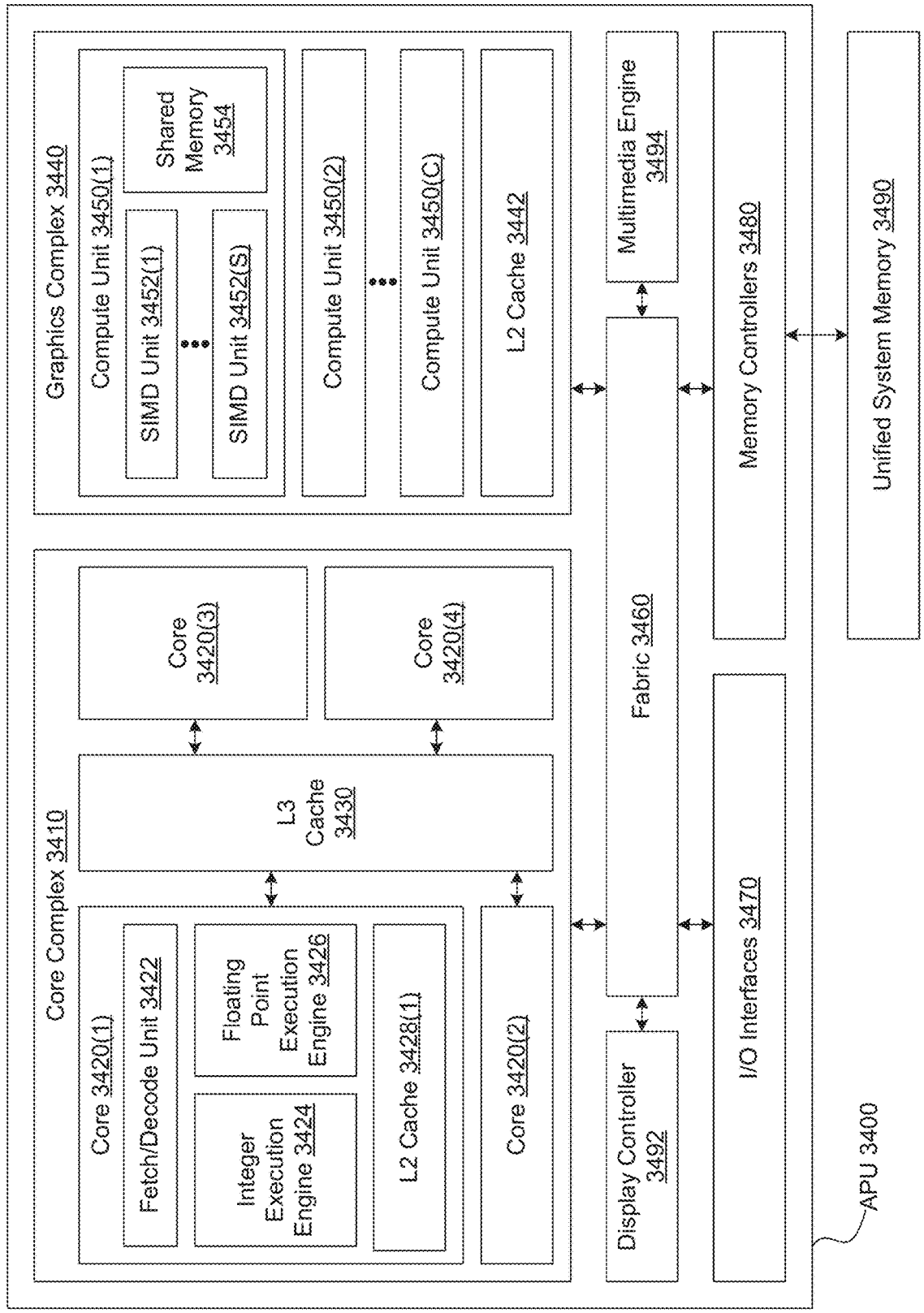
FIG. 34 illustrates an APU, in accordance with at least one embodiment.

FIG. 34 illustrates an accelerated processing unit ("APU") 3400, in accordance with at least one embodiment. In at least one embodiment, APU 3400 is developed by AMD Corporation of Santa Clara, CA. In at least one embodiment, APU 3400 can be configured to execute an application program, such as a CUDA program. In at least one embodiment, APU 3400 includes, without limitation, a core complex 3410, a graphics complex 3440, fabric 3460, I/O interfaces 3470, memory controllers 3480, a display controller 3492, and a multimedia engine 3494. In at least one embodiment, APU 3400 may include, without limitation, any number of core complexes 3410, any number of graphics complexes 3440, any number of display controllers 3492, and any number of multimedia engines 3494 in any combination. For explanatory purposes, multiple instances of like objects are denoted herein with reference numbers identifying an object and parenthetical numbers identifying an instance where needed.

In at least one embodiment, core complex 3410 is a CPU, graphics complex 3440 is a GPU, and APU 3400 is a processing unit that integrates, without limitation, 3410 and 3440 onto a single chip. In at least one embodiment, some tasks may be assigned to core complex 3410 and other tasks may be assigned to graphics complex 3440. In at least one embodiment, core complex 3410 is configured to execute main control software associated with APU 3400, such as an operating system. In at least one embodiment, core complex 3410 is a master processor of APU 3400, controlling and coordinating operations of other processors. In at least one embodiment, core complex 3410 issues commands that control an operation of graphics complex 3440. In at least one embodiment, core complex 3410 can be configured to execute host executable code derived from CUDA source code, and graphics complex 3440 can be configured to execute device executable code derived from CUDA source code.

In at least one embodiment, core complex 3410 includes, without limitation, cores 3420(1)-3420(4) and an L3 cache 3430. In at least one embodiment, core complex 3410 may include, without limitation, any number of cores 3420 and any number and type of caches in any combination. In at least one embodiment, cores 3420 are configured to execute instructions of a particular instruction set architecture ("ISA"). In at least one embodiment, each core 3420 is a CPU core.

In at least one embodiment, each core 3420 includes, without limitation, a fetch/decode unit 3422, an integer execution engine 3424, a floating point execution engine 3426, and an L2 cache 3428. In at least one embodiment, fetch/decode unit 3422 fetches instructions, decodes such instructions, generates micro-operations, and dispatches separate micro-instructions to integer execution engine 3424 and floating point execution engine 3426. In at least one embodiment, fetch/decode unit 3422 can concurrently dispatch one micro-instruction to integer execution engine 3424 and another micro-instruction to floating point execution engine 3426. In at least one embodiment, integer execution engine 3424 executes, without limitation, integer and memory operations. In at least one embodiment, floating point engine 3426 executes, without limitation, floating point and vector operations. In at least one embodiment, fetch-decode unit 3422 dispatches micro-instructions to a single execution engine that replaces both integer execution engine 3424 and floating point execution engine 3426.

In at least one embodiment, each core 3420(i), where i is an integer representing a particular instance of core 3420, may access L2 cache 3428(i) included in core 3420(i). In at least one embodiment, each core 3420 included in core complex 3410(i), where j is an integer representing a particular instance of core complex 3410, is connected to other cores 3420 included in core complex 3410(j) via L3 cache 3430(j) included in core complex 3410(j). In at least one embodiment, cores 3420 included in core complex 3410(j), where j is an integer representing a particular instance of core complex 3410, can access all of L3 cache 3430(j) included in core complex 3410(j). In at least one embodiment, L3 cache 3430 may include, without limitation, any number of slices.

In at least one embodiment, graphics complex 3440 can be configured to perform compute operations in a highly-parallel fashion. In at least one embodiment, graphics complex 3440 is configured to execute graphics pipeline operations such as draw commands, pixel operations, geometric computations, and other operations associated with rendering an image to a display. In at least one embodiment, graphics complex 3440 is configured to execute operations unrelated to graphics. In at least one embodiment, graphics complex 3440 is configured to execute both operations related to graphics and operations unrelated to graphics.

In at least one embodiment, graphics complex 3440 includes, without limitation, any number of compute units 3450 and an L2 cache 3442. In at least one embodiment, compute units 3450 share L2 cache 3442. In at least one embodiment, L2 cache 3442 is partitioned. In at least one embodiment, graphics complex 3440 includes, without limitation, any number of compute units 3450 and any number (including zero) and type of caches. In at least one embodiment, graphics complex 3440 includes, without limitation, any amount of dedicated graphics hardware.

In at least one embodiment, each compute unit 3450 includes, without limitation, any number of SAID units 3452 and a shared memory 3454. In at least one embodiment, each SIMI) unit 3452 implements a SIMD architecture and is configured to perform operations in parallel. In at least one embodiment, each compute unit 3450 may execute any number of thread blocks, but each thread block executes on a single compute unit 3450. In at least one embodiment, a thread block includes, without limitation, any number of threads of execution. In at least one embodiment, a workgroup is a thread block. In at least one embodiment, each SIMD unit 3452 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3454.

In at least one embodiment, fabric 3460 is a system interconnect that facilitates data and control transmissions across core complex 3410, graphics complex 3440, I/O interfaces 3470, memory controllers 3480, display controller 3492, and multimedia engine 3494. In at least one embodiment, APU 3400 may include, without limitation, any amount and type of system interconnect in addition to or instead of fabric 3460 that facilitates data and control transmissions across any number and type of directly or indirectly linked components that may be internal or external to APU 3400. In at least one embodiment, I/O interfaces 3470 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3470 In at least one embodiment, peripheral devices that are coupled to I/O interfaces 3470 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3494 includes, without limitation, any amount and type of circuitry that is related to multimedia, such as a video decoder, a video encoder, an image signal processor, etc. In at least one embodiment, memory controllers 3480 facilitate data transfers between APU 3400 and a unified system memory 3490. In at least one embodiment, core complex 3410 and graphics complex 3440 share unified system memory 3490.

In at least one embodiment, APU 3400 implements a memory subsystem that includes, without limitation, any amount and type of memory controllers 3480 and memory devices (e.g., shared memory 3454) that may be dedicated to one component or shared among multiple components. In at least one embodiment, APU 3400 implements a cache subsystem that includes, without limitation, one or more cache memories (e.g., L2 caches 3528, L3 cache 3430, and L2 cache 3442) that may each be private to or shared between any number of components (e.g., cores 3420, core complex 3410, SIMD units 3452, compute units 3450, and graphics complex 3440). In at least one embodiment, at least one component shown or described with respect to FIG. 34 is used to implement techniques and/or functions described herein and at least in conjunction with FIGS. 1-8. In at least one embodiment, APU 3400 causes an operating voltage of one or more integrated circuits to be adjusted, based at least in part, on an error rate as described herein and at least in conjunction with FIGS. 1-8.

Figure 35:
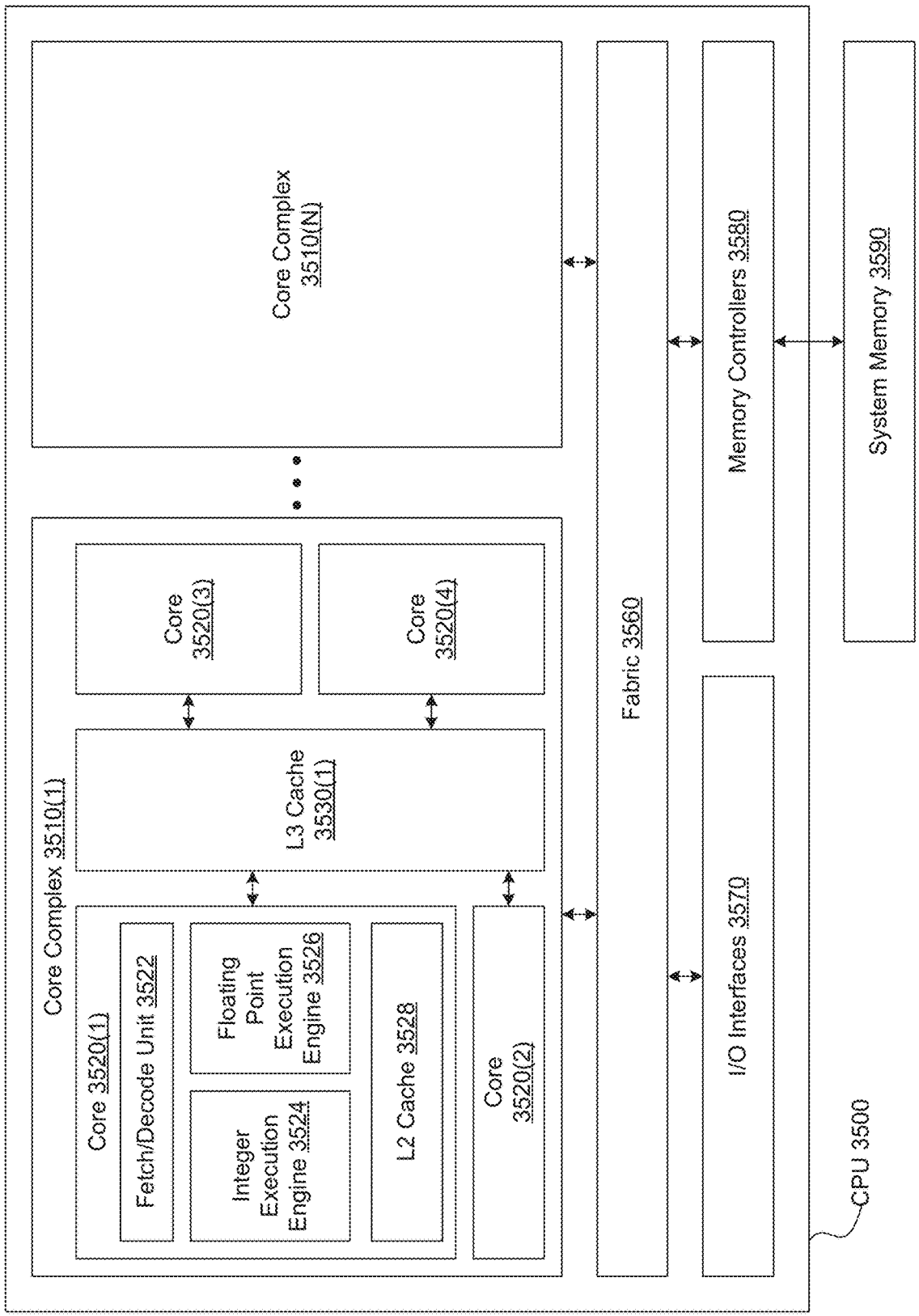
FIG. 35 illustrates a CPU, in accordance with at least one embodiment.

FIG. 35 illustrates a CPU 3500, in accordance with at least one embodiment. In at least one embodiment, CPU 3500 is developed by AMD Corporation of Santa Clara, CA. In at least one embodiment, CPU 3500 can be configured to execute an application program. In at least one embodiment, CPU 3500 is configured to execute main control software, such as an operating system. In at least one embodiment, CPU 3500 issues commands that control an operation of an external GPU (not shown). In at least one embodiment, CPU 3500 can be configured to execute host executable code derived from CUDA source code, and an external GPU can be configured to execute device executable code derived from such CUDA source code. In at least one embodiment, CPU 3500 includes, without limitation, any number of core complexes 3510, fabric 3560, I/O interfaces 3570, and memory controllers 3580.

In at least one embodiment, core complex 3510 includes, without limitation, cores 3520(1)-3520(4) and an L3 cache 3530. In at least one embodiment, core complex 3510 may include, without limitation, any number of cores 3520 and any number and type of caches in any combination. In at least one embodiment, cores 3520 are configured to execute instructions of a particular ISA. In at least one embodiment, each core 3520 is a CPU core.

In at least one embodiment, each core 3520 includes, without limitation, a fetch/decode unit 3522, an integer execution engine 3524, a floating point execution engine 3526, and an L2 cache 3528. In at least one embodiment, fetch/decode unit 3522 fetches instructions, decodes such instructions, generates micro-operations, and dispatches separate micro-instructions to integer execution engine 3524 and floating point execution engine 3526. In at least one embodiment, fetch/decode unit 3522 can concurrently dispatch one micro-instruction to integer execution engine 3524 and another micro-instruction to floating point execution engine 3526. In at least one embodiment, integer execution engine 3524 executes, without limitation, integer and memory operations. In at least one embodiment, floating point engine 3526 executes, without limitation, floating point and vector operations. In at least one embodiment, fetch-decode unit 3522 dispatches micro-instructions to a single execution engine that replaces both integer execution engine 3524 and floating point execution engine 3526.

In at least one embodiment, each core 3520(i), where i is an integer representing a particular instance of core 3520, may access L2 cache 3528(i) included in core 3520(i). In at least one embodiment, each core 3520 included in core complex 3510(j), where j is an integer representing a particular instance of core complex 3510, is connected to other cores 3520 in core complex 3510(j) via. L3 cache 3530(j) included in core complex 3510(j). In at least one embodiment, cores 3520 included in core complex 3510(j), where j is an integer representing a particular instance of core complex 3510, can access all of L3 cache 3530(j) included in core complex 3510(j). In at least one embodiment, L3 cache 3530 may include, without limitation, any number of slices.

In at least one embodiment, fabric 3560 is a system interconnect that facilitates data and control transmissions across core complexes 3510(1)-3510(N) (where N is an integer greater than zero), I/O interfaces 3570, and memory controllers 3580. In at least one embodiment, CPU 3500 may include, without limitation, any amount and type of system interconnect in addition to or instead of fabric 3560 that facilitates data and control transmissions across any number and type of directly or indirectly linked components that may be internal or external to CPU 3500. In at least one embodiment, I/O interfaces 3570 are representative of any number and type of I/O interfaces (e.g., PCI PCIe, GBE, USB, etc.). In at least one embodiment, various types of peripheral devices are coupled to I/O interfaces 3570 In at least one embodiment, peripheral devices that are coupled to I/O interfaces 3570 may include, without limitation, displays, keyboards, mice, printers, scanners, joysticks or other types of game controllers, media recording devices, external storage devices, network interface cards, and so forth.

In at least one embodiment, memory controllers 3580 facilitate data transfers between CPU 3500 and a system memory 3590. In at least one embodiment, core complex 3510 and graphics complex 3540 share system memory 3590. In at least one embodiment, CPU 3500 implements a memory subsystem that includes, without limitation, any amount and type of memory controllers 3580 and memory devices that may be dedicated to one component or shared among multiple components. In at least one embodiment, CPU 3500 implements a cache subsystem that includes, without limitation, one or more cache memories (e.g., L2 caches 3528 and L3 caches 3530) that may each be private to or shared between any number of components (e.g., cores 3520 and core complexes 3510). In at least one embodiment, at least one component shown or described with respect to FIG. 35 is used to implement techniques and/or functions described herein and at least in conjunction with FIGS. 1-8. In at least one embodiment, CPU 3500 causes an operating voltage of one or more integrated circuits to be adjusted, based at least in part, on an error rate as described herein and at least in conjunction with FIGS. 1-8.

Figure 36:
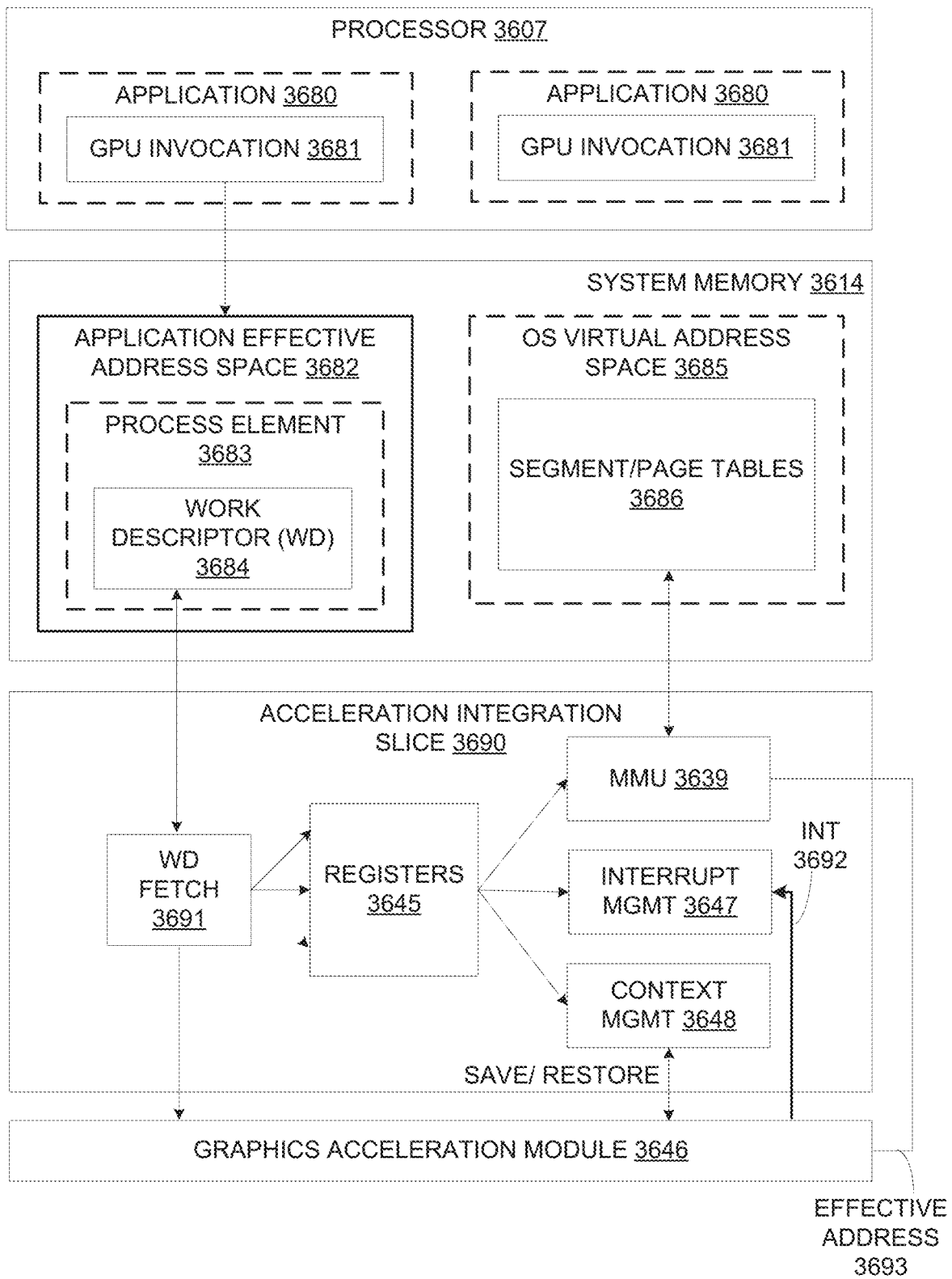
FIG. 36 illustrates an exemplary accelerator integration slice, in accordance with at least one embodiment.

FIG. 36 illustrates an exemplary accelerator integration slice 3690, in accordance with at least one embodiment. As used herein, a "slice" comprises a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each comprise a separate GPU. Alternatively, graphics processing engines may comprise different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual CPUs integrated on a common package, line card, or chip.

An application effective address space 3682 within system memory 3614 stores process elements 3683. In one embodiment, process elements 3683 are stored in response to GPU invocations 3681 from applications 3680 executed on processor 3607. A process element 3683 contains process state for corresponding application 3680. A work descriptor ("WD") 3684 contained in process element 3683 can be a single job requested by an application or may contain a pointer to a queue of jobs. In at least one embodiment, WD 3684 is a pointer to a job request queue in application effective address space 3682.

Graphics acceleration module 3646 and/or individual graphics processing engines can be shared by all or a subset of processes in a system. In at least one embodiment, an infrastructure for setting up process state and sending WI) 3684 to graphics acceleration module 3646 to start a job in a virtualized environment may be included.

In at least one embodiment, a dedicated-process programming model is implementation-specific. In this model, a single process owns graphics acceleration module 3646 or an individual graphics processing engine. Because graphics acceleration module 3646 is owned by a single process, a hypervisor initializes an accelerator integration circuit for an owning partition and an operating system initializes accelerator integration circuit for an owning process when graphics acceleration module 3646 is assigned.

In operation, a WD fetch unit 3691 in accelerator integration slice 3690 fetches next WD 3684 which includes an indication of work to be done by one or more graphics processing engines of graphics acceleration module 3646. Data from WD 3684 may be stored in registers 3645 and used by a memory management unit ("MMU") 3639, interrupt management circuit 3647 and/or context management circuit 3648 as illustrated. For example, one embodiment of MMU 3639 includes segment/page walk circuitry for accessing segment/page tables 3686 within OS virtual address space 3685. Interrupt management circuit 3647 may process interrupt events ("INT") 3692 received from graphics acceleration module 3646. When performing graphics operations, an effective address 3693 generated by a graphics processing engine is translated to a real address by MMU 3639.

In one embodiment, a same set of registers 3645 are duplicated for each graphics processing engine and/or graphics acceleration module 3646 and may be initialized by a hypervisor or operating system. Each of these duplicated registers may be included in accelerator integration slice 3690. Exemplary registers that may be initialized by a hypervisor are shown in Table 1.

TABLE 1

Hypervisor Initialized Registers

1 Slice Control Register
2 Real Address (RA) Scheduled Processes Area Pointer
3 Authority Mask Override Register
4 Interrupt Vector Table Entry Offset
5 Interrupt Vector Table Entry Limit
6 State Register
7 Logical Partition ID
8 Real address (RA) Hypervisor Accelerator Utilization Record Pointer
9 Storage Description Register Exemplary registers that may be initialized by an operating system are shown in Table 2.

TABLE 2

Operating System Initialized Registers

1 Process and Thread Identification
2 Effective Address (EA) Context Save/Restore Pointer
3 Virtual Address (VA) Accelerator Utilization Record Pointer
4 Virtual Address (VA) Storage Segment Table Pointer
5 Authority Mask
6 Work descriptor In one embodiment, each WI) 3684 is specific to a particular graphics acceleration module 3646 and/or a particular graphics processing engine. It contains all information required by a graphics processing engine to do work or it can be a pointer to a memory location where an application has set up a command queue of work to be completed. In at least one embodiment, at least one component shown or described with respect to FIG. 36 is used to implement techniques and/or functions described herein and at least in conjunction with FIGS. 1-8. In at least one embodiment, accelerator integration slice 3690 causes an operating voltage of one or more integrated circuits to be adjusted, based at least in part, on an error rate as described herein and at least in conjunction with FIGS. 1-8.

Figure 37A:
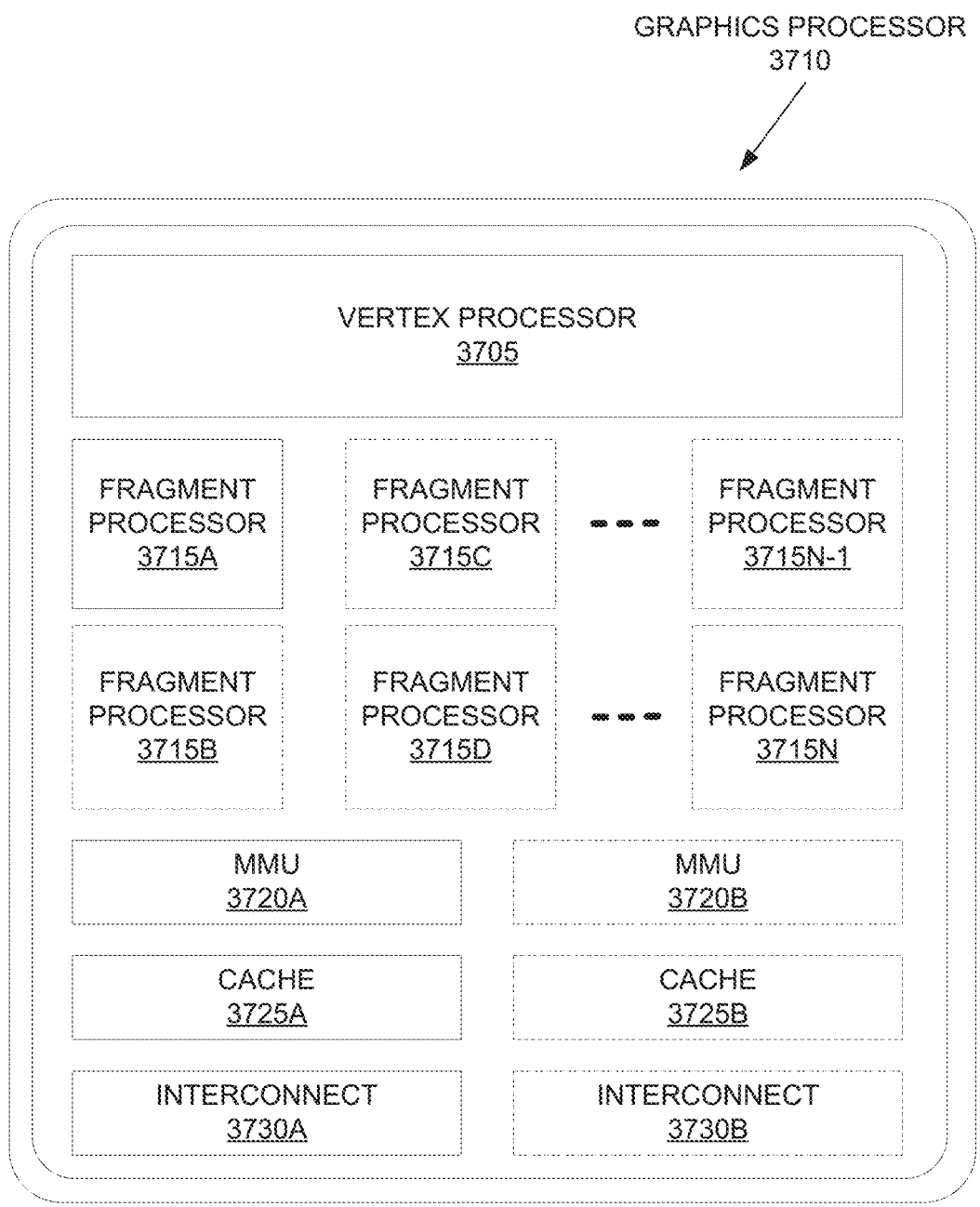
FIGS. 37A and 37B illustrate exemplary graphics processors, in accordance with at least one embodiment.
Figure 37B:
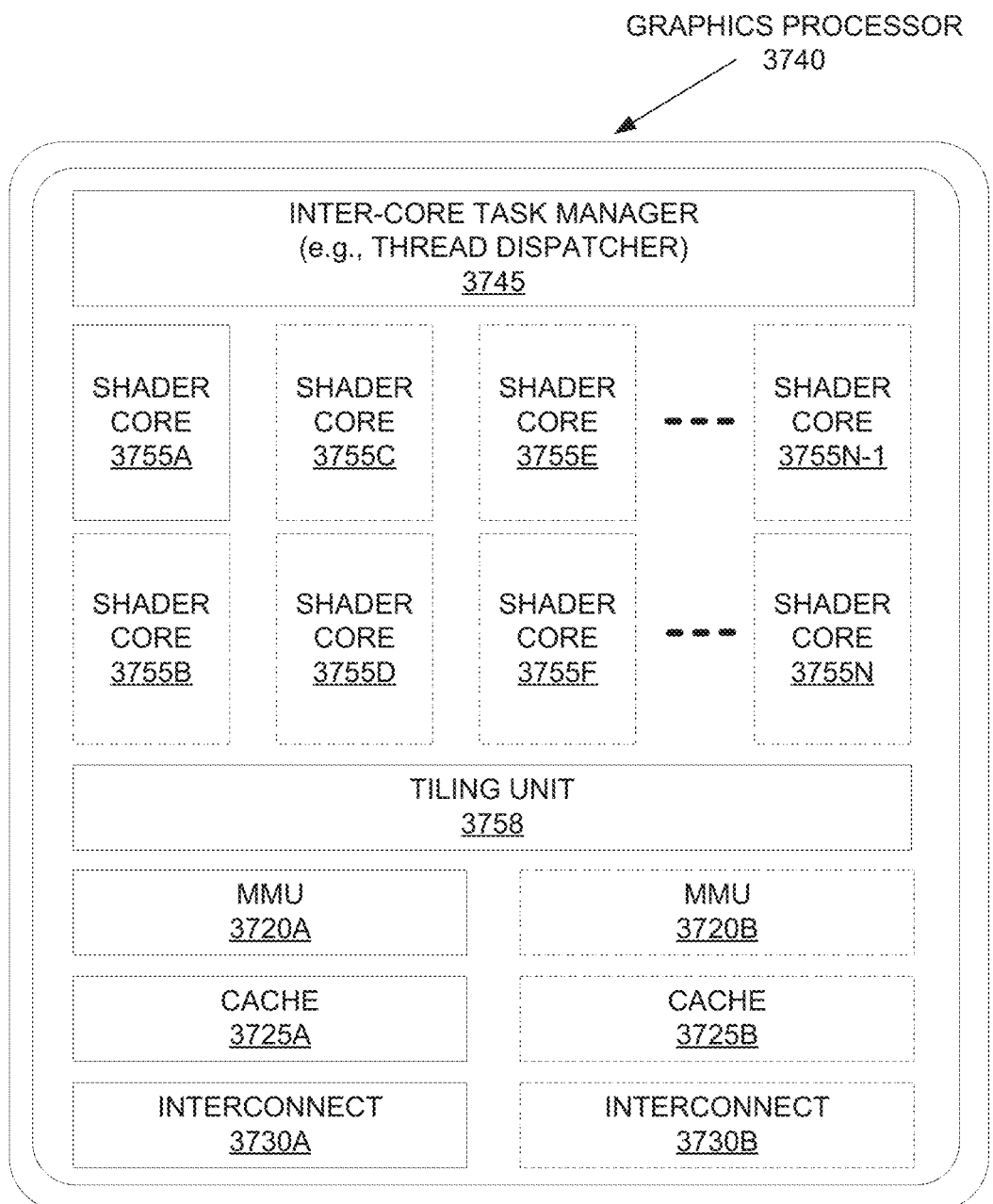

FIGS. 37A-37B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 37A illustrates an exemplary graphics processor 3710 of an SoC integrated circuit that may be fabricated using one or more IP cores, in accordance with at least one embodiment. FIG. 37B illustrates an additional exemplary graphics processor 3740 of an SoC integrated circuit that may be fabricated using one or more IP cores, in accordance with at least one embodiment. In at least one embodiment, graphics processor 3710 of FIG. 37A is a low power graphics processor core. In at least one embodiment, graphics processor 3740 of FIG. 37B is a higher performance graphics processor core. In at least one embodiment, each of graphics processors 3710, 3740 can be variants of graphics processor 1310 of FIG. 13.

In at least one embodiment, graphics processor 3710 includes a vertex processor 3705 and one or more fragment processor(s) 3715A-3715N (e.g., 3715A, 3715B, 3715C, 3715D, through 3715N-1, and 3715N). In at least one embodiment, graphics processor 3710 can execute different shader programs via separate logic, such that vertex processor 3705 is optimized to execute operations for vertex shader programs, while one or more fragment processor(s) 3715A-3715N execute fragment (e.g., pixel) shading operations for fragment or pixel shader programs. In at least one embodiment, vertex processor 3705 performs a vertex processing stage of a 3D graphics pipeline and generates primitives and vertex data. In at least one embodiment, fragment processor(s) 3715A-3715N use primitive and vertex data generated by vertex processor 3705 to produce a framebuffer that is displayed on a display device. In at least one embodiment, fragment processor(s) 3715A-3715N are optimized to execute fragment shader programs as provided for in an OpenGL, API, which may be used to perform similar operations as a pixel shader program as provided for in a Direct 3D API.

In at least one embodiment, graphics processor 3710 additionally includes one or more MMU(s) 3720A-3720B, cache(s) 3725A-3725B, and circuit interconnect(s) 3730A-3730B. In at least one embodiment, one or more MMU(s) 3720A-3720B provide for virtual to physical address mapping for graphics processor 3710, including for vertex processor 3705 and/or fragment processor(s) 3715A-3715N, which may reference vertex or image/texture data stored in memory, in addition to vertex or image/texture data stored in one or more cache(s) 3725A-3725B. In at least one embodiment, one or more MMU(s) 3720A-3720B may be synchronized with other MMUs within a system, including one or more MMUs associated with one or more application processor(s) 1305, image processors 1315, and/or video processors 1320 of FIG. 13, such that each processor 1305-1320 can participate in a shared or unified virtual memory system. In at least one embodiment, one or more circuit interconnect(s) 3730A-3730B enable graphics processor 3710 to interface with other IP cores within an SoC, either via an internal bus of an SoC or via a direct connection.

In at least one embodiment, graphics processor 3740 includes one or more MMU(s) 3720A-3720B, caches 3725A-3725B, and circuit interconnects 3730A-3730B of graphics processor 3710 of FIG. 37A. In at least one embodiment, graphics processor 3740 includes one or more shader core(s) 3755A-3755N (e.g., 3755A, 3755B, 3755C, 3755D, 3755E, 3755F, through 3755N-1, and 3755N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3740 includes an inter-core task manager 3745, which acts as a thread dispatcher to dispatch execution threads to one or more shader cores 3755A-3755N and a tiling unit 3758 to accelerate tiling operations for tile-based rendering, in which rendering operations for a scene are subdivided in image space, for example to exploit local spatial coherence within a scene or to optimize use of internal caches. In at least one embodiment, at least one component shown or described with respect to FIGS. 37A-37B is used to implement techniques and/or functions described herein and at least in conjunction with FIGS. 1-8. In at least one embodiment, graphics processor 3710 causes an operating voltage of one or more integrated circuits to be adjusted, based at least in part, on an error rate as described herein and at least in conjunction with FIGS. 1-8.

Figure 38A:
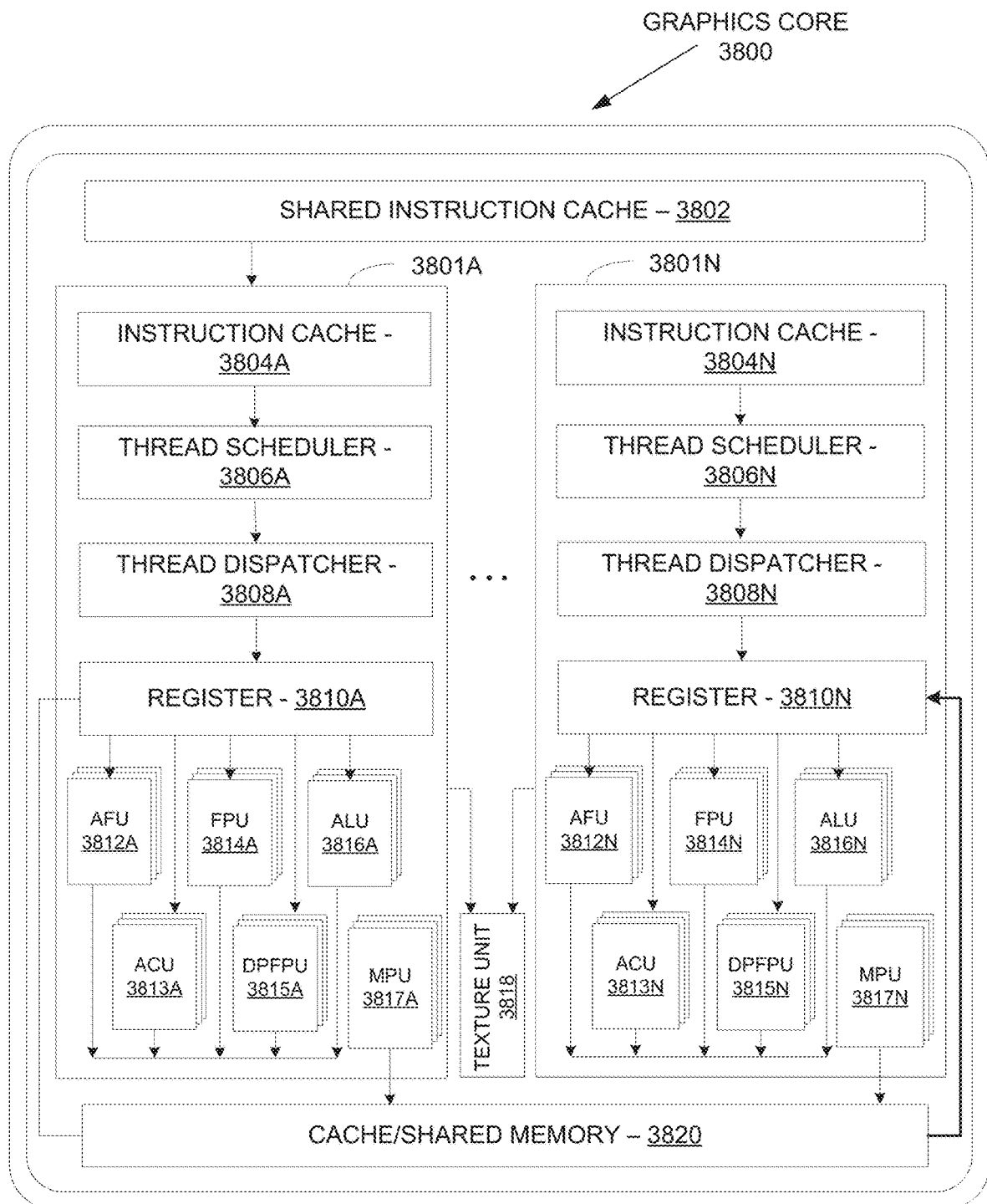
FIG. 38A illustrates a graphics core, in accordance with at least one embodiment.

FIG. 38A illustrates a graphics core 3800, in accordance with at least one embodiment. In at least one embodiment, graphics core 3800 may be included within graphics processor 3210 of FIG. 32. In at least one embodiment, graphics core 3800 may be a unified shader core 3755A-3755N as in FIG. 37B. In at least one embodiment, graphics core 3800 includes a shared instruction cache 3802, a texture unit 3818, and a cache/shared memory 3820 that are common to execution resources within graphics core 3800. In at least one embodiment, graphics core 3800 can include multiple slices 3801A-3801N or partition for each core, and a graphics processor can include multiple instances of graphics core 3800. Slices 3801A-3801N can include support logic including a local instruction cache 3804A-3804N, a thread scheduler 3806A-3806N, a thread dispatcher 3808A-3808N, and a set of registers 3810A-3810N. In at least one embodiment, slices 3801A-3801N can include a set of additional function units ("AFUs") 3812A-3812N, floating-point units ("FPUs") 3814A-3814N, integer arithmetic logic units ("ALUs") 3816-3816N, address computational units ("ACUs") 3813A-3813N, double-precision floating-point units ("DPFPUs") 3815A-3815N, and matrix processing units ("MPUs") 3817A-3817N.

In at least one embodiment, FPUs 3814A-3814N can perform single-precision (32-bit) and half-precision (16-bit) floating point operations, while DPFPUs 3815A-3815N perform double precision (64-bit) floating point operations. In at least one embodiment, ALUs 3816A-3816N can perform variable precision integer operations at 8-bit, 16-bit, and 32-bit precision, and can be configured for mixed precision operations. In at least one embodiment, MPUs 3817A-3817N can also be configured for mixed precision matrix operations, including half-precision floating point and 8-bit integer operations. In at least one embodiment, MPUs 3817-3817N can perform a variety of matrix operations to accelerate CUDA programs, including enabling support for accelerated general matrix to matrix multiplication ("GEMM"). In at least one embodiment, AFUs 3812A-3812N can perform additional logic operations not supported by floating-point or integer units, including trigonometric operations (e.g., Sine, Cosine, etc.).

Figure 38B:
FIG. 38B illustrates a GPGPU, in accordance with at least one embodiment.

FIG. 38B illustrates a general-purpose graphics processing unit ("GPGPU") 3830, in accordance with at least one embodiment. In at least one embodiment, GPGPU 3830 is highly-parallel and suitable for deployment on a multi-chip module. In at least one embodiment, GPGPU 3830 can be configured to enable highly-parallel compute operations to be performed by an array of GPUs. In at least one embodiment, GPGPU 3830 can be linked directly to other instances of GPGPU 3830 to create a multi-GPU cluster to improve execution time for CUDA programs. In at least one embodiment, GPGPU 3830 includes a host interface 3832 to enable a connection with a host processor. In at least one embodiment, host interface 3832 is a PCIe interface. In at least one embodiment, host interface 3832 can be a vendor specific communications interface or communications fabric. In at least one embodiment, GPGPU 3830 receives commands from a host processor and uses a global scheduler 3834 to distribute execution threads associated with those commands to a set of compute clusters 3836A-3836H. In at least one embodiment, compute clusters 3836A-3836H share a cache memory 3838. In at least one embodiment, cache memory 3838 can serve as a higher-level cache for cache memories within compute clusters 3836A-3836H.

In at least one embodiment, GPGPU 3830 includes memory 3844A-3844B coupled with compute clusters 3836A-3836H via a set of memory controllers 3842A-3842B. In at least one embodiment, memory 3844A-3844B can include various types of memory devices including DRAM or graphics random access memory, such as synchronous graphics random access memory ("SGRAM"), including graphics double data rate ("GDDR") memory.

In at least one embodiment, compute clusters 3836A-3836H each include a set of graphics cores, such as graphics core 3800 of FIG. 38A, which can include multiple types of integer and floating point logic units that can perform computational operations at a range of precisions including suited for computations associated with CUDA programs. For example, in at least one embodiment, at least a subset of floating point units in each of compute clusters 3836A-3836H can be configured to perform 16-bit or 32-bit floating point operations, while a different subset of floating point units can be configured to perform 64-bit floating point operations.

In at least one embodiment, multiple instances of GPGPU 3830 can be configured to operate as a compute cluster. In at least one embodiment, compute clusters 3836A-3836H may implement any technically feasible communication techniques for synchronization and data exchange. In at least one embodiment, multiple instances of GPGPU 3830 communicate over host interface 3832. In at least one embodiment, GPGPU 3830 includes an I/O hub 3839 that couples GPGPU 3830 with a GPU link 3840 that enables a direct connection to other instances of GPGPU 3830. In at least one embodiment, GPU link 3840 is coupled to a dedicated GPU-to-GPU bridge that enables communication and synchronization between multiple instances of GPGPU 3830. In at least one embodiment GPU link 3840 couples with a high speed interconnect to transmit and receive data to other GPGPUs 3830 or parallel processors. In at least one embodiment, multiple instances of GPGPU 3830 are located in separate data processing systems and communicate via a network device that is accessible via host interface 3832. In at least one embodiment GPU link 3840 can be configured to enable a connection to a host processor in addition to or as an alternative to host interface 3832. In at least one embodiment, GPGPU 3830 can be configured to execute a CUDA program. In at least one embodiment, at least one component shown or described with respect to FIGS. 38A-38B is used to implement techniques and/or functions described herein and at least in conjunction with FIGS. 1-8. In at least one embodiment, GPGPU 3830 causes an operating voltage of one or more integrated circuits to be adjusted, based at least in part, on an error rate as described herein and at least in conjunction with FIGS. 1-8.

Figure 39A:
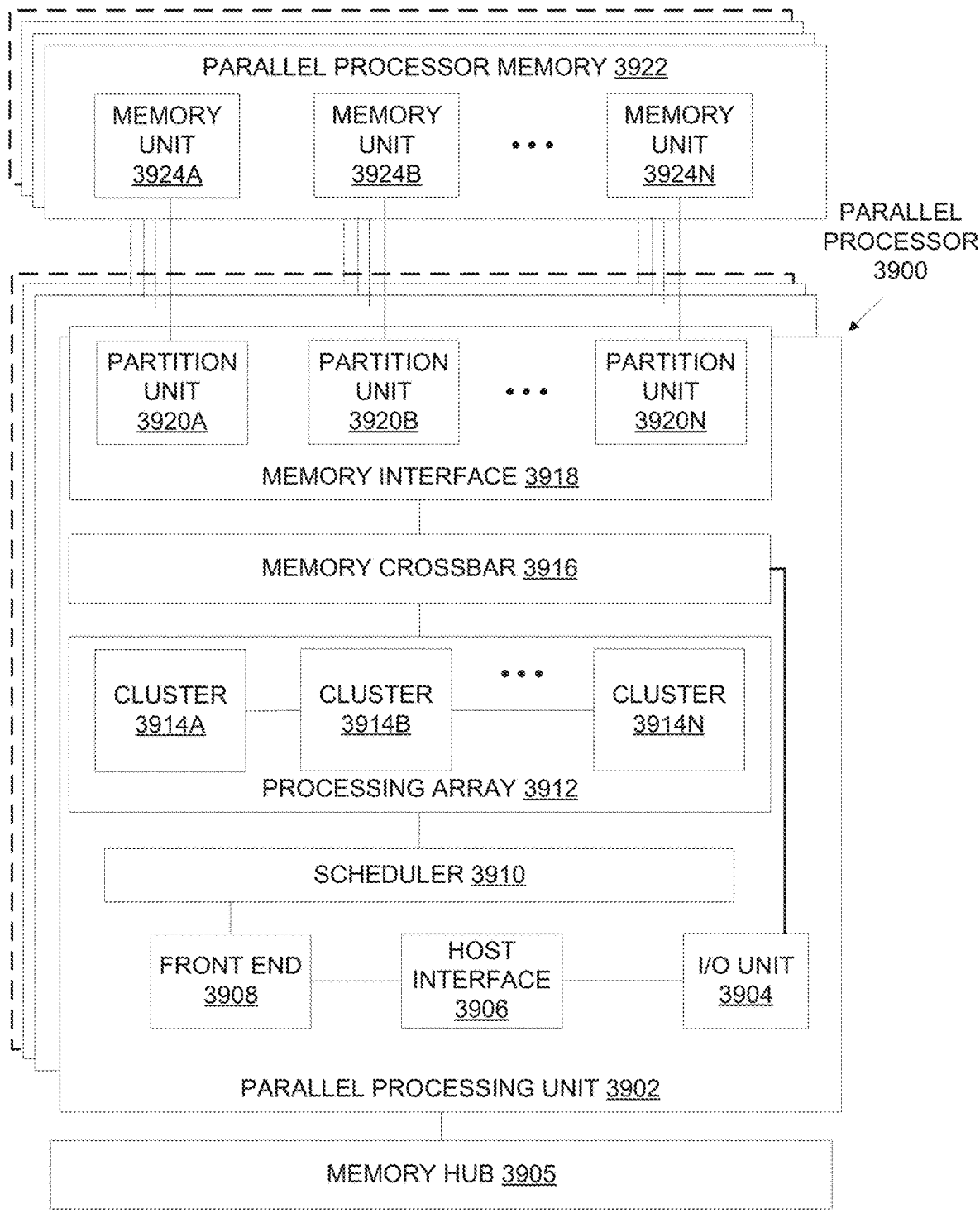
FIG. 39A illustrates a parallel processor, in accordance with at least one embodiment.

FIG. 39A illustrates a parallel processor 3900, in accordance with at least one embodiment. In at least one embodiment, various components of parallel processor 3900 may be implemented using one or more integrated circuit devices, such as programmable processors, application specific integrated circuits ("ASICs"), or FPGAs.

In at least one embodiment, parallel processor 3900 includes a parallel processing unit 3902. In at least one embodiment, parallel processing unit 3902 includes an I/O unit 3904 that enables communication with other devices, including other instances of parallel processing unit 3902. In at least one embodiment, I/O unit 3904 may be directly connected to other devices. In at least one embodiment, I/O unit 3904 connects with other devices via use of a hub or switch interface, such as memory hub 1405. In at least one embodiment, connections between memory hub 1405 and I/O unit 3904 form a communication link. In at least one embodiment, I/O unit 3904 connects with a host interface 3906 and a memory crossbar 3916, where host interface 3906 receives commands directed to performing processing operations and memory crossbar 3916 receives commands directed to performing memory operations.

In at least one embodiment, when host interface 3906 receives a command buffer via I/O unit 3904, host interface 3906 can direct work operations to perform those commands to a front end 3908. In at least one embodiment, front end 3908 couples with a scheduler 3910, which is configured to distribute commands or other work items to a processing array 3912. In at least one embodiment, scheduler 3910 ensures that processing array 3912 is properly configured and in a valid state before tasks are distributed to processing array 3912. In at least one embodiment, scheduler 3910 is implemented via firmware logic executing on a microcontroller. In at least one embodiment, microcontroller implemented scheduler 3910 is configurable to perform complex scheduling and work distribution operations at coarse and fine granularity, enabling rapid preemption and context switching of threads executing on processing array 3912. In at least one embodiment, host software can prove workloads for scheduling on processing array 3912 via one of multiple graphics processing doorbells. In at least one embodiment, workloads can then be automatically distributed across processing array 3912 by scheduler 3910 logic within a microcontroller including scheduler 3910.

In at least one embodiment, processing array 3912 can include up to "N" clusters (e.g., cluster 3914A, cluster 3914B, through cluster 3914N). In at least one embodiment, each cluster 3914A-3914N of processing array 3912 can execute a large number of concurrent threads. In at least one embodiment, scheduler 3910 can allocate work to clusters 3914A-3914N of processing array 3912 using various scheduling and/or work distribution algorithms, which may vary depending on a workload arising for each type of program or computation. In at least one embodiment, scheduling can be handled dynamically by scheduler 3910, or can be assisted in part by compiler logic during compilation of program logic configured for execution by processing array 3912. In at least one embodiment, different clusters 3914A-3914N of processing array 3912 can be allocated for processing different types of programs or for performing different types of computations.

In at least one embodiment, processing array 3912 can be configured to perform various types of parallel processing operations. In at least one embodiment, processing array 3912 is configured to perform general-purpose parallel compute operations. For example, in at least one embodiment, processing array 3912 can include logic to execute processing tasks including filtering of video and/or audio data, performing modeling operations, including physics operations, and performing data transformations.

In at least one embodiment, processing array 3912 is configured to perform parallel graphics processing operations. In at least one embodiment, processing array 3912 can include additional logic to support execution of such graphics processing operations, including, but not limited to texture sampling logic to perform texture operations, as well as tessellation logic and other vertex processing logic. In at least one embodiment, processing array 3912 can be configured to execute graphics processing related shader programs such as, but not limited to vertex shaders, tessellation shaders, geometry shaders, and pixel shaders. In at least one embodiment, parallel processing unit 3902 can transfer data from system memory via I/O unit 3904 for processing. In at least one embodiment, during processing, transferred data can be stored to on-chip memory (e.g., a parallel processor memory 3922) during processing, then written back to system memory.

In at least one embodiment, when parallel processing unit 3902 is used to perform graphics processing, scheduler 3910 can be configured to divide a processing workload into approximately equal sized tasks, to better enable distribution of graphics processing operations to multiple clusters 3914A-3914N of processing array 3912. In at least one embodiment, portions of processing array 3912 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3914A-3914N may be stored in buffers to allow intermediate data to be transmitted between clusters 3914A-3914N for further processing.

In at least one embodiment, processing array 3912 can receive processing tasks to be executed via scheduler 3910, which receives commands defining processing tasks from front end 3908. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3910 may be configured to fetch indices corresponding to tasks or may receive indices from front end 3908. In at least one embodiment, front end 3908 can be configured to ensure processing array 3912 is configured to a valid state before a workload specified by incoming command buffers (e.g., batch-buffers, push buffers, etc.) is initiated.

In at least one embodiment, each of one or more instances of parallel processing unit 3902 can couple with parallel processor memory 3922. In at least one embodiment, parallel processor memory 3922 can be accessed via memory crossbar 3916, which can receive memory requests from processing array 3912 as well as I/O unit 3904. In at least one embodiment, memory crossbar 3916 can access parallel processor memory 3922 via a memory interface 3918. In at least one embodiment, memory interface 3918 can include multiple partition units (e.g., a partition unit 3920A, partition unit 3920B, through partition unit 3920N) that can each couple to a portion (e.g., memory unit) of parallel processor memory 3922. In at least one embodiment, a number of partition units 3920A-3920N is configured to be equal to a number of memory units, such that a first partition unit 3920A has a corresponding first memory unit 3924A, a second partition unit 3920B has a corresponding memory unit 3924B, and an Nth partition unit 3920N has a corresponding Nth memory unit 3924N. In at least one embodiment, a number of partition units 3920A-3920N may not be equal to a number of memory devices.

In at least one embodiment, memory units 3924A-3924N can include various types of memory devices, including DRAM or graphics random access memory, such as SDRAM, including GDDR memory. In at least one embodiment, memory units 3924A-3924N may also include 3D stacked memory, including but not limited to high bandwidth memory ("HBM"). In at least one embodiment, render targets, such as frame buffers or texture maps may be stored across memory units 3924A-3924N, allowing partition units 3920A-3920N to write portions of each render target in parallel to efficiently use available bandwidth of parallel processor memory 3922. In at least one embodiment, a local instance of parallel processor memory 3922 may be excluded in favor of a unified memory design that utilizes system memory in conjunction with local cache memory.

In at least one embodiment, any one of clusters 3914A-3914N of processing array 3912 can process data that will be written to any of memory units 3924A-3924N within parallel processor memory 3922. In at least one embodiment, memory crossbar 3916 can be configured to transfer an output of each cluster 3914A-3914N to any partition unit 3920A-3920N or to another cluster 3914A-3914N, which can perform additional processing operations on an output. In at least one embodiment, each cluster 3914A-3914N can communicate with memory interface 3918 through memory crossbar 3916 to read from or write to various external memory devices. In at least one embodiment, memory crossbar 3916 has a connection to memory interface 3918 to communicate with I/O unit 3904, as well as a connection to a local instance of parallel processor memory 3922, enabling processing units within different clusters 3914A-3914N to communicate with system memory or other memory that is not local to parallel processing unit 3902. In at least one embodiment, memory crossbar 3916 can use virtual channels to separate traffic streams between clusters 3914A-3914N and partition units 3920A-3920N.

In at least one embodiment, multiple instances of parallel processing unit 3902 can be provided on a single add-in card, or multiple add-in cards can be interconnected. In at least one embodiment, different instances of parallel processing unit 3902 can be configured to interoperate even if different instances have different numbers of processing cores, different amounts of local parallel processor memory, and/or other configuration differences. For example, in at least one embodiment, some instances of parallel processing unit 3902 can include higher precision floating point units relative to other instances. In at least one embodiment, systems incorporating one or more instances of parallel processing unit 3902 or parallel processor 3900 can be implemented in a variety of configurations and form factors, including but not limited to desktop, laptop, or handheld personal computers, servers, workstations, game consoles, and/or embedded systems.

Figure 39B:
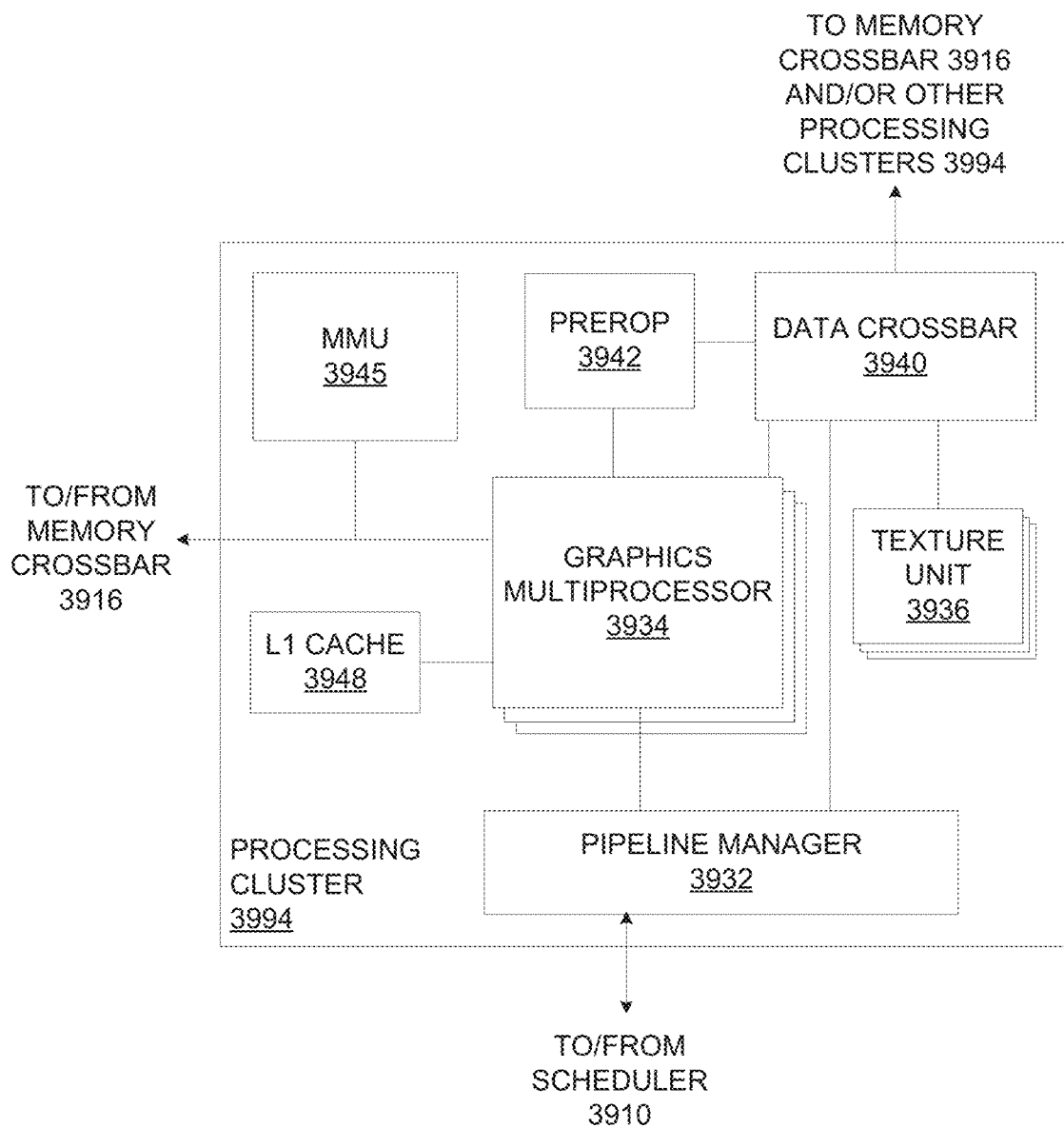
FIG. 39B illustrates a processing cluster, in accordance with at least one embodiment.

FIG. 39B illustrates a processing cluster 3994, in accordance with at least one embodiment. In at least one embodiment, processing cluster 3994 is included within a parallel processing unit. In at least one embodiment, processing cluster 3994 is one of processing clusters 3914A-3914N of FIG. 39. In at least one embodiment, processing cluster 3994 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units In at least one embodiment, single instruction, multiple thread ("SIMT") techniques are used to support parallel execution of a large number of generally synchronized threads, using a common instruction unit configured to issue instructions to a set of processing engines within each processing cluster 3994.

In at least one embodiment, operation of processing duster 3994 can be controlled via a pipeline manager 3932 that distributes processing tasks to SIMT parallel processors. In at least one embodiment, pipeline manager 3932 receives instructions from scheduler 3910 of FIG. 39 and manages execution of those instructions via a graphics multiprocessor 3934 and/or a texture unit 3936. In at least one embodiment, graphics multiprocessor 3934 is an exemplary instance of a SIMT parallel processor. However, in at least one embodiment, various types of SIMT parallel processors of differing architectures may be included within processing cluster 3994. In at least one embodiment, one or more instances of graphics multiprocessor 3934 can be included within processing cluster 3994. In at least one embodiment, graphics multiprocessor 3934 can process data and a data crossbar 3940 can be used to distribute processed data to one of multiple possible destinations, including other shader units. In at least one embodiment, pipeline manager 3932 can facilitate distribution of processed data by specifying destinations for processed data to be distributed via data crossbar 3940.

In at least one embodiment, each graphics multiprocessor 3934 within processing cluster 3994 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3994 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 3934. In at least one embodiment, a thread group may include fewer threads than a number of processing engines within graphics multiprocessor 3934. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3934. In at least one embodiment, when a thread group includes more threads than a number of processing engines within graphics multiprocessor 3934, processing can be performed over consecutive clock cycles. In at least one embodiment, multiple thread groups can be executed concurrently on graphics multiprocessor 3934.

In at least one embodiment, graphics multiprocessor 3934 includes an internal cache memory to perform load and store operations. In at least one embodiment, graphics multiprocessor 3934 can forego an internal cache and use a cache memory (e.g., L1 cache 3948) within processing cluster 3994. In at least one embodiment, each graphics multiprocessor 3934 also has access to Level 2 ("L2") caches within partition units (e.g., partition units 3920A-3920N of FIG. 39A) that are shared among all processing clusters 3994 and may be used to transfer data between threads. In at least one embodiment, graphics multiprocessor 3934 may also access off-chip global memory, which can include one or more of local parallel processor memory and/or system memory. In at least one embodiment, any memory external to parallel processing unit 3902 may be used as global memory. In at least one embodiment, processing cluster 3994 includes multiple instances of graphics multiprocessor 3934 that can share common instructions and data, which may be stored in L1 cache 3948.

In at least one embodiment, each processing cluster 3994 may include an MMU 3945 that is configured to map virtual addresses into physical addresses. In at least one embodiment, one or more instances of MMU 3945 may reside within memory interface 3918 of FIG. 39. In at least one embodiment, MMU 3945 includes a set of page table entries ("PTEs") used to map a virtual address to a physical address of a tile and optionally a cache line index. In at least one embodiment, MMU 3945 may include address translation lookaside buffers ("TLBs") or caches that may reside within graphics multiprocessor 3934 or L1 cache 3948 or processing cluster 3994. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 3994 may be configured such that each graphics multiprocessor 3934 is coupled to a texture unit 3936 for performing texture mapping operations, e.g., determining texture sample positions, reading texture data, and filtering texture data. In at least one embodiment, texture data is read from an internal texture L1 cache (not shown) or from an L1 cache within graphics multiprocessor 3934 and is fetched from an L2 cache, local parallel processor memory, or system memory, as needed. In at least one embodiment, each graphics multiprocessor 3934 outputs a processed task to data crossbar 3940 to provide a processed task to another processing cluster 3994 for further processing or to store a processed task in an L2 cache, a local parallel processor memory, or a system memory via memory crossbar 3916. In at least one embodiment, a pre-raster operations unit ("preROP") 3942 is configured to receive data from graphics multiprocessor 3934, direct data to ROP units, which may be located with partition units as described herein (e.g., partition units 3920A-3920N of FIG. 39). In at least one embodiment, PreROP 3942 can perform optimizations for color blending, organize pixel color data, and perform address translations.

Figure 39C:
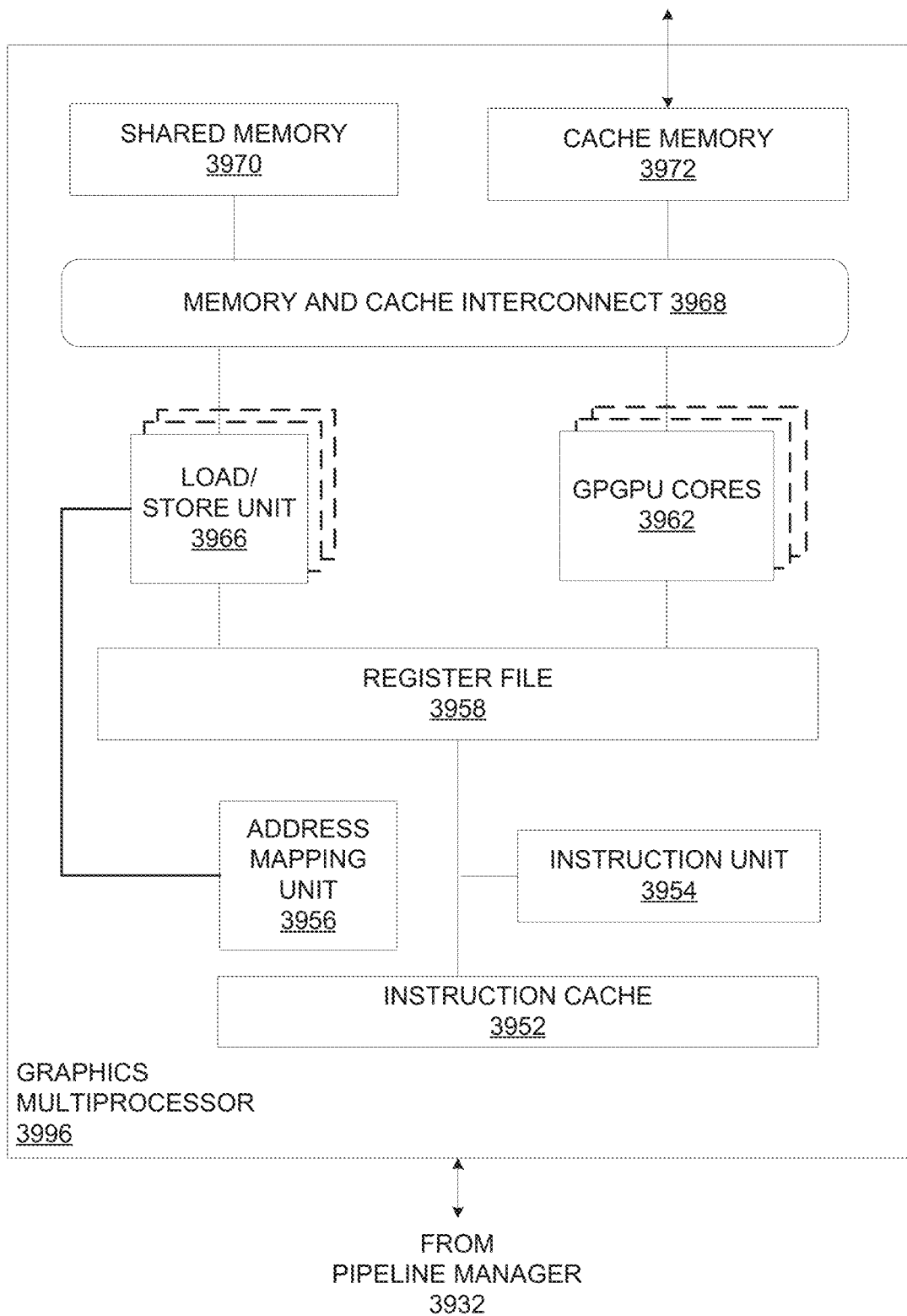
FIG. 39C illustrates a graphics multiprocessor, in accordance with at least one embodiment.

FIG. 39C illustrates a graphics multiprocessor 3996, in accordance with at least one embodiment. In at least one embodiment, graphics multiprocessor 3996 is graphics multiprocessor 3934 of FIG. 39B. In at least one embodiment, graphics multiprocessor 3996 couples with pipeline manager 3932 of processing cluster 3994. In at least one embodiment, graphics multiprocessor 3996 has an execution pipeline including but not limited to an instruction cache 3952, an instruction unit 3954, an address mapping unit 3956, a register file 3958, one or more GPGPU cores 3962, and one or more LSUs 3966. GPGPU cores 3962 and LSUs 3966 are coupled with cache memory 3972 and shared memory 3970 via a memory and cache interconnect 3968.

In at least one embodiment, instruction cache 3952 receives a stream of instructions to execute from pipeline manager 3932. In at least one embodiment, instructions are cached in instruction cache 3952 and dispatched for execution by instruction unit 3954. In at least one embodiment, instruction unit 3954 can dispatch instructions as thread groups (e.g., warps), with each thread of a thread group assigned to a different execution unit within GPGPU core 3962. In at least one embodiment, an instruction can access any of a local, shared, or global address space by specifying an address within a unified address space. In at least one embodiment, address mapping unit 3956 can be used to translate addresses in a unified address space into a distinct memory address that can be accessed by LSUs 3966.

In at least one embodiment, register file 3958 provides a set of registers for functional units of graphics multiprocessor 3996. In at least one embodiment, register file 3958 provides temporary storage for operands connected to data paths of functional units (e.g., GPGPU cores 3962, LSUs 3966) of graphics multiprocessor 3996. In at least one embodiment, register file 3958 is divided between each of functional units such that each functional unit is allocated a dedicated portion of register file 3958. In at least one embodiment, register file 3958 is divided between different thread groups being executed by graphics multiprocessor 3996.

In at least one embodiment, GPGPU cores 3962 can each include FPUs and/or integer ALUs that are used to execute instructions of graphics multiprocessor 3996. GPGPU cores 3962 can be similar in architecture or can differ in architecture. In at least one embodiment, a first portion of GPGPU cores 3962 include a single precision FPU and an integer ALU while a second portion of GPGPU cores 3962 include a double precision FPU. In at least one embodiment, FPUs can implement IEEE 754-2008 standard for floating point arithmetic or enable variable precision floating point arithmetic. In at least one embodiment, graphics multiprocessor 3996 can additionally include one or more fixed function or special function units to perform specific functions such as copy rectangle or pixel blending operations. In at least one embodiment one or more of GPGPU cores 3962 can also include fixed or special function logic.

In at least one embodiment, GPGPU cores 3962 include SIMI) logic capable of performing a single instruction on multiple sets of data. In at least one embodiment GPGPU cores 3962 can physically execute SIMD4, SIMD8, and SIMD16 instructions and logically execute SIMD1, SIMD2, and SIMD32 instructions. In at least one embodiment, SIMD instructions for GPGPU cores 3962 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 3968 is an interconnect network that connects each functional unit of graphics multiprocessor 3996 to register file 3958 and to shared memory 3970. In at least one embodiment, memory and cache interconnect 3968 is a crossbar interconnect that allows LSU 3966 to implement load and store operations between shared memory 3970 and register file 3958. In at least one embodiment, register file 3958 can operate at a same frequency as GPGPU cores 3962, thus data transfer between GPGPU cores 3962 and register file 3958 is very low latency. In at least one embodiment, shared memory 3970 can be used to enable communication between threads that execute on functional units within graphics multiprocessor 3996. In at least one embodiment, cache memory 3972 can be used as a data cache for example, to cache texture data communicated between functional units and texture unit 3936. In at least one embodiment, shared memory 3970 can also be used as a program managed cached. In at least one embodiment, threads executing on GPGPU cores 3962 can programmatically store data within shared memory in addition to automatically cached data that is stored within cache memory 3972.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions. In at least one embodiment, at least one component shown or described with respect to FIGS. 39A-39C is used to implement techniques and/or functions described herein and at least in conjunction with FIGS. 1-8. In at least one embodiment, parallel processor 3900 causes an operating voltage of one or more integrated circuits to be adjusted, based at least in part, on an error rate as described herein and at least in conjunction with FIGS. 1-8.

General Computing

The following figures set forth, without limitation, exemplary software constructs within general computing that can be used to implement at least one embodiment.

Figure 40:
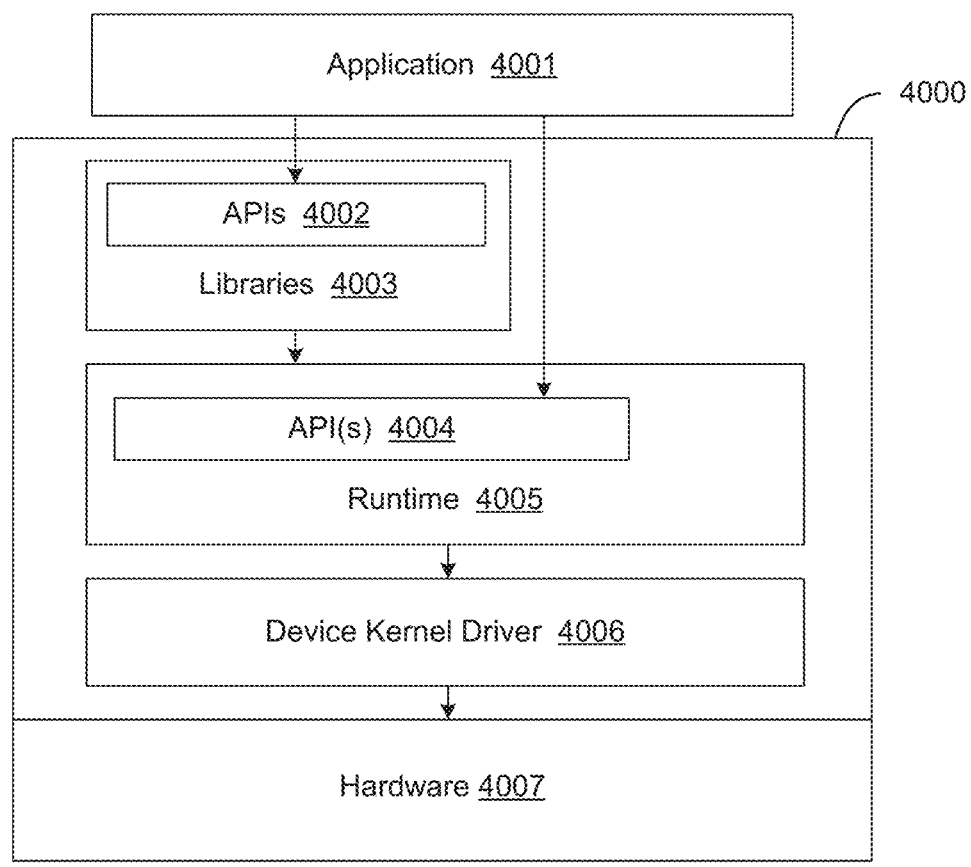
FIG. 40 illustrates a software stack of a programming platform, in accordance with at least one embodiment.

FIG. 40 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4000 of a programming platform provides an execution environment for an application 4001. In at least one embodiment, application 4001 may include any computer software capable of being launched on software stack 4000. In at least one embodiment, application 4001 may include, but is not limited to, an artificial intelligence ("AI")/machine learning ("ML") application, a high performance computing ("HPC") application, a virtual desktop infrastructure ("VDI"), or a data center workload.

In at least one embodiment, application 4001 and software stack 4000 run on hardware 4007. Hardware 4007 may include one or more GPUs, CPUs, FPGAs, AI engines, and/or other types of compute devices that support a programming platform, in at least one embodiment. In at least one embodiment, such as with CUDA, software stack 4000 may be vendor specific and compatible with only devices from particular vendor(s). In at least one embodiment, such as in with OpenCL, software stack 4000 may be used with devices from different vendors. In at least one embodiment, hardware 4007 includes a host connected to one more devices that can be accessed to perform computational tasks via application programming interface ("API") calls. A device within hardware 4007 may include, but is not limited to, a GPU, FPGA, AI engine, or other compute device (but may also include a CPU) and its memory, as opposed to a host within hardware 4007 that may include, but is not limited to, a CPU (but may also include a compute device) and its memory, in at least one embodiment.

In at least one embodiment, software stack 4000 of a programming platform includes, without limitation, a number of libraries 4003, a runtime 4005, and a device kernel driver 4006. Each of libraries 4003 may include data and programming code that can be used by computer programs and leveraged during software development, in at least one embodiment. In at least one embodiment, libraries 4003 may include, but are not limited to, pre-written code and subroutines, classes, values, type specifications, configuration data, documentation, help data, and/or message templates. In at least one embodiment, libraries 4003 include functions that are optimized for execution on one or more types of devices. In at least one embodiment, libraries 4003 may include, but are not limited to, functions for performing mathematical, deep learning, and/or other types of operations on devices. In at least one embodiment, libraries 4103 are associated with corresponding APIs 4102, which may include one or more APIs, that expose functions implemented in libraries 4103.

In at least one embodiment, application 4001 is written as source code that is compiled into executable code, as discussed in greater detail below in conjunction with FIG. 45. Executable code of application 4001 may run, at least in part, on an execution environment provided by software stack 4000, in at least one embodiment. In at least one embodiment, during execution of application 4001, code may be reached that needs to run on a device, as opposed to a host. In such a case, runtime 4005 may be called to load and launch requisite code on a device, in at least one embodiment. In at least one embodiment, runtime 4005 may include any technically feasible runtime system that is able to support execution of application S01.

In at least one embodiment, runtime 4005 is implemented as one or more runtime libraries associated with corresponding APIs, which are shown as API(s) 4004. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4004 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4006 is configured to facilitate communication with an underlying device. In at least one embodiment, device kernel driver 4006 may provide low-level functionalities upon which APIs, such as API(s) 4004, and/or other software relies. In at least one embodiment, device kernel driver 4006 may be configured to compile intermediate representation ("IR") code into binary code at runtime. For CUDA, device kernel driver 4006 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4006 to compile IR code at runtime. In at least one embodiment, at least one component shown or described with respect to FIG. 40 is used to implement techniques and/or functions described herein and at least in conjunction with FIGS. 1-8. In at least one embodiment, hardware 4007 causes an operating voltage of one or more integrated circuits to be adjusted, based at least in part, on an error rate as described herein and at least in conjunction with FIGS. 1-8.

Figure 41:
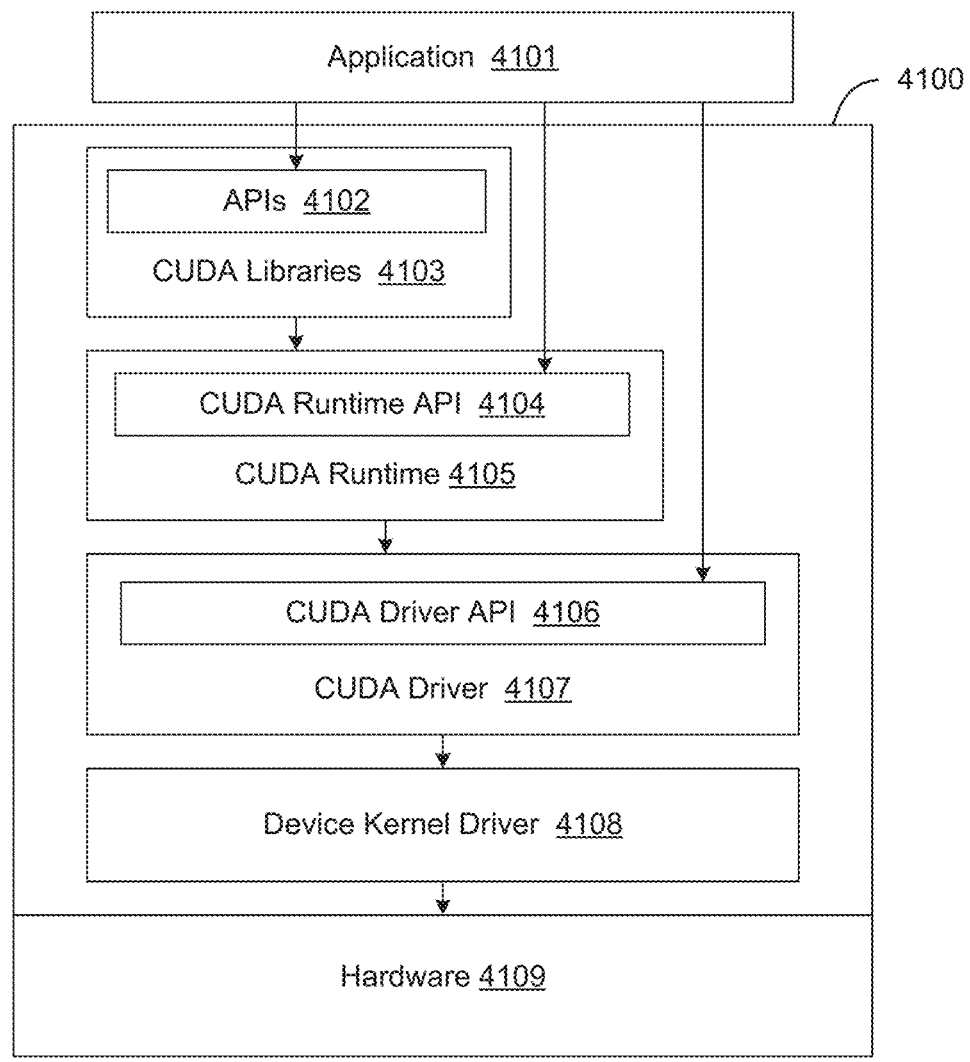
FIG. 41 illustrates a CUDA implementation of a software stack of FIG. 40, in accordance with at least one embodiment.

FIG. 41 illustrates a CUDA implementation of software stack 4000 of FIG. 40, in accordance with at least one embodiment. In at least one embodiment, a CUDA software stack 4100, on which an application 4101 may be launched, includes CUDA libraries 4103, a CUDA runtime 4105, a CUDA driver 4107, and a device kernel driver 4108. In at least one embodiment, CUDA software stack 4100 executes on hardware 4109, which may include a GPU that supports CUDA and is developed by NVIDIA Corporation of Santa Clara, CA.

In at least one embodiment, application 4101, CUDA runtime 4105, and device kernel driver 4108 may perform similar functionalities as application 4001, runtime 4005, and device kernel driver 4006, respectively, which are described above in conjunction with FIG. 40. In at least one embodiment, CUDA driver 4107 includes a library (libcuda.so) that implements a CUDA driver API 4106. Similar to a CUDA runtime API 4104 implemented by a CUDA runtime library (cudart), CUDA driver API 4106 may, without limitation, expose functions for memory management, execution control, device management, error handling, synchronization, and/or graphics interoperability, among other things, in at least one embodiment. In at least one embodiment, CUDA driver API 4106 differs from CUDA runtime API 4104 in that CUBA runtime API 4104 simplifies device code management by providing implicit initialization, context (analogous to a process) management, and module (analogous to dynamically loaded libraries) management. In contrast to high-level CUDA runtime API 4104, CUDA driver API 4106 is a low-level API providing more fine-grained control of a device, particularly with respect to contexts and module loading, in at least one embodiment. In at least one embodiment, CUDA driver API 4106 may expose functions for context management that are not exposed by CUDA runtime API 4104. In at least one embodiment, CUDA driver API 4106 is also language-independent and supports, e.g., OpenCL in addition to CUDA runtime API 4104. Further, in at least one embodiment, development libraries, including CUDA runtime 4105, may be considered as separate from driver components, including user-mode CUDA driver 4107 and kernel-mode device driver 4108 (also sometimes referred to as a "display" driver).

In at least one embodiment, CUDA libraries 4103 may include, but are not limited to, mathematical libraries, deep learning libraries, parallel algorithm libraries, and/or signal/image/video processing libraries, which parallel computing applications such as application 4101 may utilize. In at least one embodiment, CUDA libraries 4103 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4103 may include deep learning libraries such as a cuDNN library of primitives for deep neural networks and a TensorRT platform for high-performance deep learning inference, among others. In at least one embodiment, at least one component shown or described with respect to FIG. 41 is used to implement techniques and/or functions described herein and at least in conjunction with FIGS. 1-8. In at least one embodiment, hardware 4109 causes an operating voltage of one or more integrated circuits to be adjusted, based at least in part, on an error rate as described herein and at least in conjunction with FIGS. 1-8.

Figure 42:
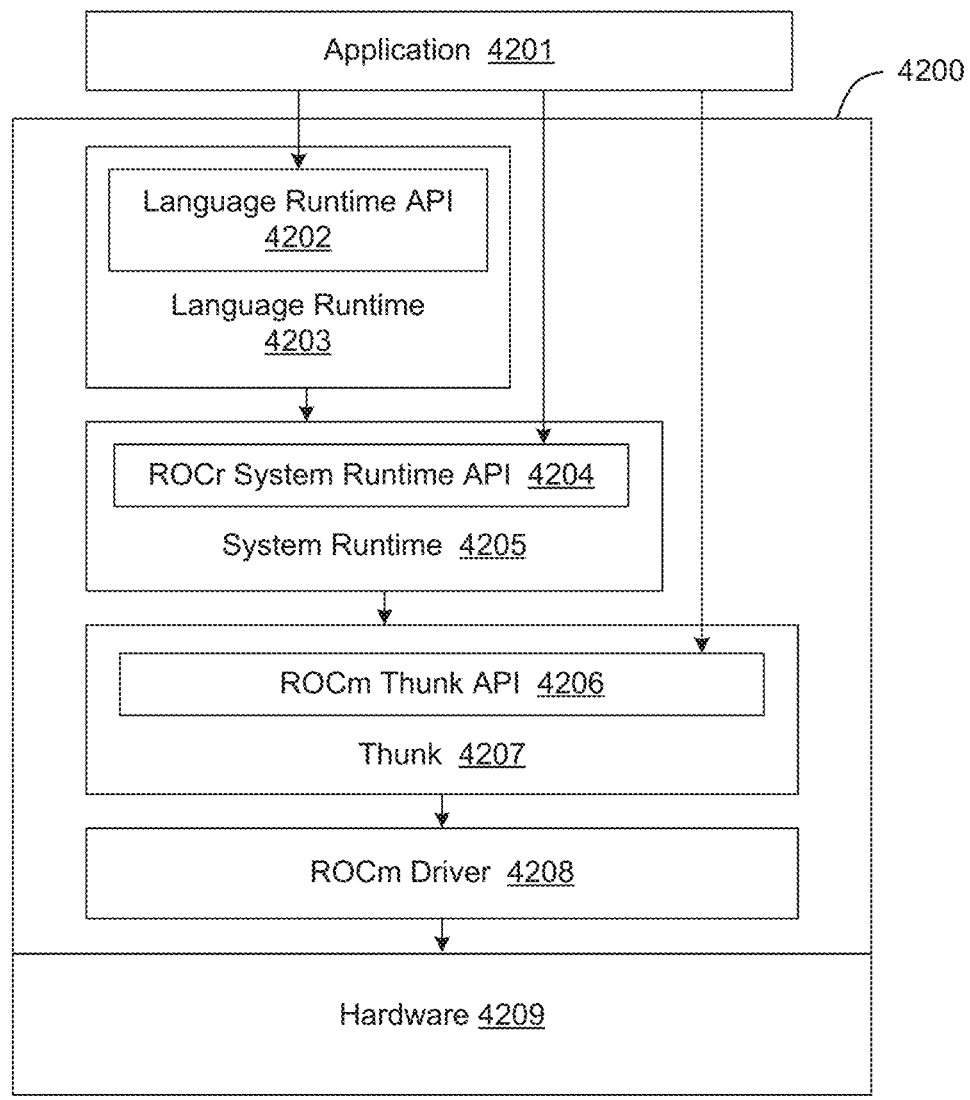
FIG. 42 illustrates a ROCm implementation of a software stack of FIG. 40, in accordance with at least one embodiment.

FIG. 42 illustrates a ROCm implementation of software stack 4000 of FIG. 40, in accordance with at least one embodiment. In at least one embodiment, a ROCm software stack 4200, on which an application 4201 may be launched, includes a language runtime 4203, a system runtime 4205, a thunk 4207, a ROCm kernel driver 4208, and a device kernel driver 4209. In at least one embodiment. ROCm software stack 4200 executes on hardware 4210, which may include a GPU that supports ROCm and is developed by AMD Corporation of Santa Clara, CA.

In at least one embodiment, application 4201 may perform similar functionalities as application 4001 discussed above in conjunction with FIG. 40. In addition, language runtime 4203 and system runtime 4205 may perform similar functionalities as runtime 4005 discussed above in conjunction with FIG. 40, in at least one embodiment. In at least one embodiment, language runtime 4203 and system runtime 4205 differ in that system runtime 4205 is a language-independent runtime that implements a ROCr system runtime API 4204 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4205, language runtime 4203 is an implementation of a language-specific runtime API 4202 layered on top of ROCr system runtime API 4204, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4104 discussed above in conjunction with FIG. 41, such as functions for memory management, execution control, device management, error handling, and synchronization, among other things.

In at least one embodiment, thunk (ROCt) 4207 is an interface that can be used to interact with underlying ROCm driver 4208. In at least one embodiment, ROCm driver 4208 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 4006 discussed above in conjunction with FIG. 40. In at least one embodiment, HAS kernel driver is a driver permitting different types of processors to share system resources more effectively via hardware features.

In at least one embodiment, various libraries (not shown) may be included in ROCm software stack 4200 above language runtime 4203 and provide functionality similarity to CUDA libraries 4103, discussed above in conjunction with FIG. 41. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others. In at least one embodiment, at least one component shown or described with respect to FIG. 42 is used to implement techniques and/or functions described herein and at least in conjunction with FIGS. 1-8. In at least one embodiment, hardware 4210 causes an operating voltage of one or more integrated circuits to be adjusted, based at least in part, on an error rate as described herein and at least in conjunction with FIGS. 1-8.

Figure 43:
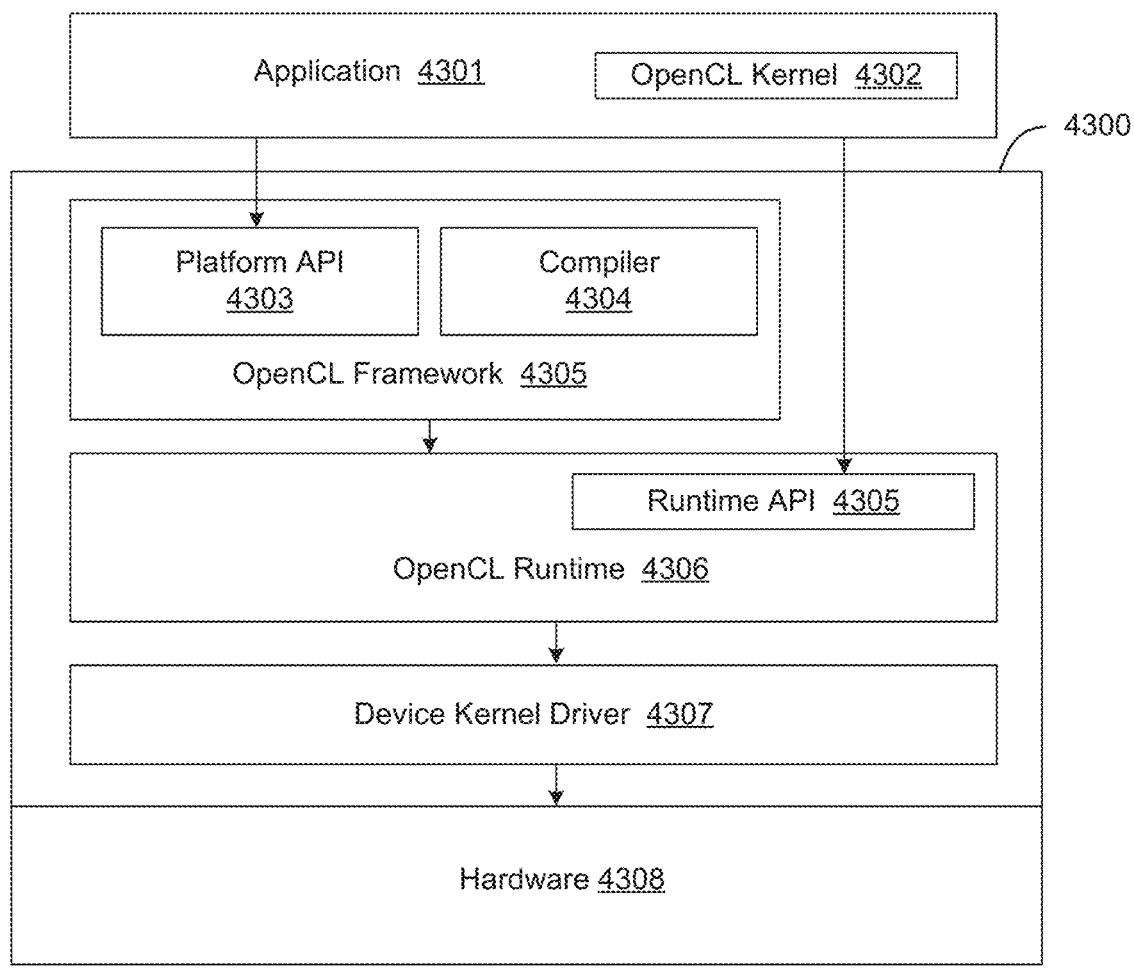
FIG. 43 illustrates an OpenCL implementation of a software stack of FIG. 40, in accordance with at least one embodiment.

FIG. 43 illustrates an OpenCL implementation of software stack 4000 of FIG. 40, in accordance with at least one embodiment. In at least one embodiment, an OpenCL software stack 4300, on which an application 4301 may be launched, includes an OpenCL framework 4305, an OpenCL runtime 4306, and a driver 4307. In at least one embodiment, OpenCL software stack 4300 executes on hardware 4109 that is not vendor-specific. As OpenCL is supported by devices developed by different vendors, specific OpenCL drivers may be required to interoperate with hardware from such vendors, in at least one embodiment.

In at least one embodiment, application 4301, OpenCL runtime 4306, device kernel driver 4307, and hardware 4308 may perform similar functionalities as application 4001, runtime 4005, device kernel driver 4006, and hardware 4007, respectively, that are discussed above in conjunction with FIG. 40. In at least one embodiment, application 4301 further includes an OpenCL kernel 4302 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4303 and runtime API 4305. In at least one embodiment, runtime API 4305 uses contexts to manage execution of kernels on devices. In at least one embodiment, each identified device may be associated with a respective context, which runtime API 4305 may use to manage command queues, program objects, and kernel objects, share memory objects, among other things, for that device. In at least one embodiment, platform API 4303 exposes functions that permit device contexts to be used to select and initialize devices, submit work to devices via command queues, and enable data transfer to and from devices, among other things. In addition. OpenCL framework provides various built-in functions (not shown), including math functions, relational functions, and image processing functions, among others, in at least one embodiment.

In at least one embodiment, a compiler 4304 is also included in OpenCL framework 4305. Source code may be compiled offline prior to executing an application or online during execution of an application, in at least one embodiment. In contrast to CUDA and ROCm, OpenCL applications in at least one embodiment may be compiled online by compiler 4304, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications. In at least one embodiment, at least one component shown or described with respect to FIG. 43 is used to implement techniques and/or functions described herein and at least in conjunction with FIGS. 1-8. In at least one embodiment, hardware 4308 causes an operating voltage of one or more integrated circuits to be adjusted, based at least in part, on an error rate as described herein and at least in conjunction with FIGS. 1-8, FIG. 44 illustrates software that is supported by a programming platform, in accordance with at least one embodiment. In at least one embodiment, a programming platform 4404 is configured to support various programming models 4403, middlewares and/or libraries 4402, and frameworks 4401 that an application 4400 may rely upon. In at least one embodiment, application 4400 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4404 may be one of a CUDA, ROCm, or OpenCL platform described above in conjunction with FIG. 41, FIG. 42, and FIG. 43, respectively. In at least one embodiment, programming platform 4404 supports multiple programming models 4403, which are abstractions of an underlying computing system permitting expressions of algorithms and data structures. Programming models 4403 may expose features of underlying hardware in order to improve performance, in at least one embodiment. In at least one embodiment, programming models 4403 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4402 provide implementations of abstractions of programming models 4404. In at least one embodiment, such libraries include data and programming code that may be used by computer programs and leveraged during software development. In at least one embodiment, such middlewares include software that provides services to applications beyond those available from programming platform 4404. In at least one embodiment, libraries and/or middle wares 4402 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4402 may include WC', and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

Figure 44:
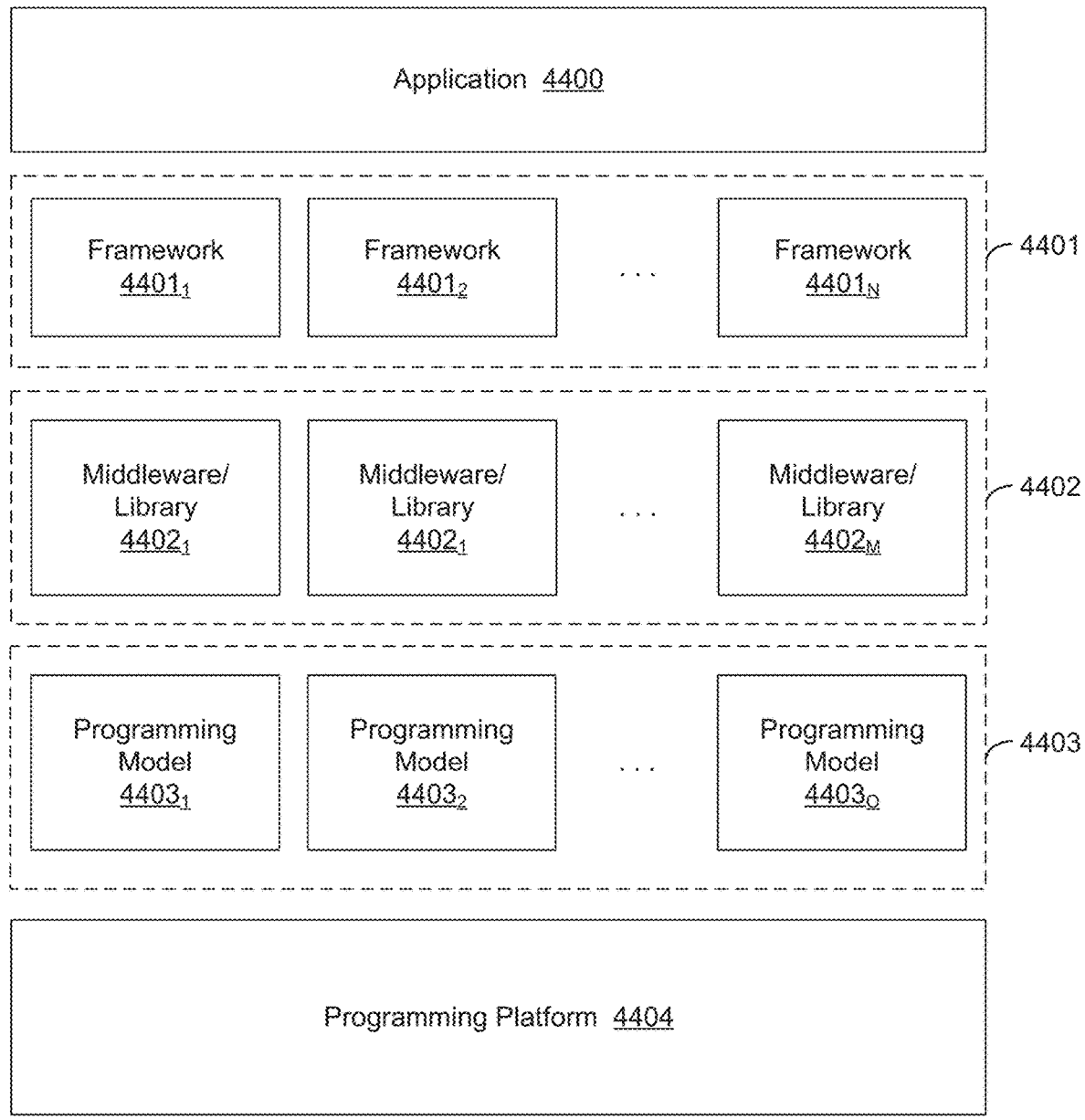
FIG. 44 illustrates software that is supported by a programming platform, in accordance with at least one embodiment.

In at least one embodiment, application frameworks 4401 depend on libraries and/or middlewares 4402. In at least one embodiment, each of application frameworks 4401 is a software framework used to implement a standard structure of application software. An AI/ML application may be implemented using a framework such as Caffe, Caffe2, TensorFlow, Keras, PyTorch, or MxNet deep learning frameworks, in at least one embodiment. In at least one embodiment, at least one component shown or described with respect to FIG. 44 is used to implement techniques and/or functions described herein and at least in conjunction with FIGS. 1-8. In at least one embodiment, application 4400, when executed, causes an operating voltage of one or more integrated circuits to be adjusted, based at least in part, on an error rate as described herein and at least in conjunction with FIGS. 1-8.

Figure 45:
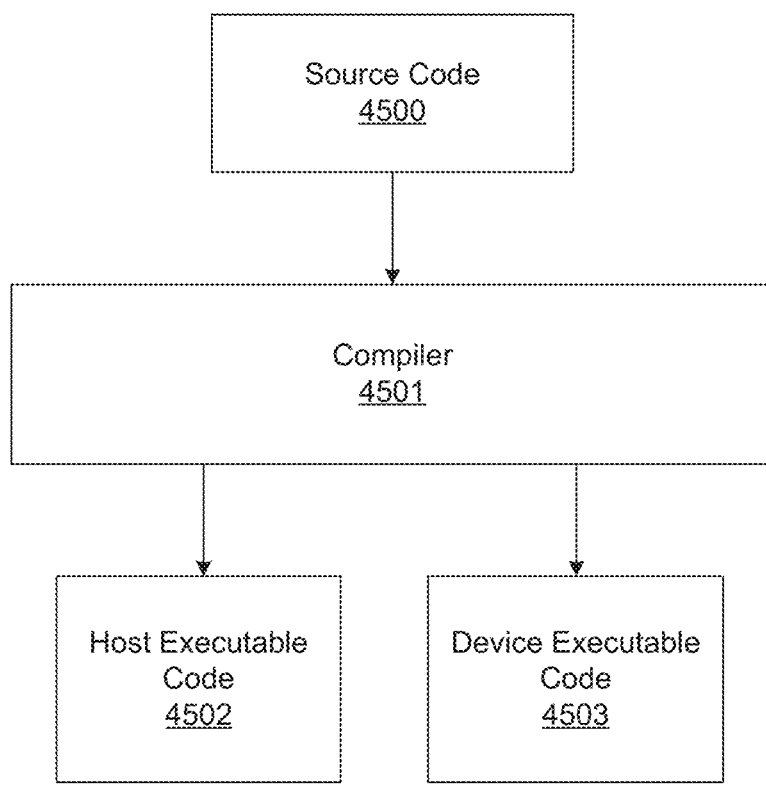
FIG. 45 illustrates compiling code to execute on programming platforms of FIGS. 40-43, in accordance with at least one embodiment.

FIG. 45 illustrates compiling code to execute on one of programming platforms of FIGS. 40-43, in accordance with at least one embodiment. In at least one embodiment, a compiler 4501 receives source code 4500 that includes both host code as well as device code. In at least one embodiment, complier 4501 is configured to convert source code 4500 into host executable code 4502 for execution on a host and device executable code 4503 for execution on a device. In at least one embodiment, source code 4500 may either be compiled offline prior to execution of an application, or online during execution of an application.

In at least one embodiment, source code 4500 may include code in any programming language supported by compiler 4501, such as C++, C, Fortran, etc. In at least one embodiment, source code 4500 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4500 may include multiple source code files, rather than a single-source file, into which host code and device code are separated.

In at least one embodiment, compiler 4501 is configured to compile source code 4500 into host executable code 4502 for execution on a host and device executable code 4503 for execution on a device. In at least one embodiment, compiler 4501 performs operations including parsing source code 4500 into an abstract system tree (AST), performing optimizations, and generating executable code. In at least one embodiment in which source code 4500 includes a single-source file, compiler 4501 may separate device code from host code in such a single-source file, compile device code and host code into device executable code 4503 and host executable code 4502, respectively, and link device executable code 4503 and host executable code 4502 together in a single file, as discussed in greater detail below with respect to FIG. 34.

In at least one embodiment, host executable code 4502 and device executable code 4503 may be in any suitable format, such as binary code and/or IR code. In a case of CUBA, host executable code 4502 may include native object code and device executable code 4503 may include code in PTX intermediate representation, in at least one embodiment. In a case of ROCm, both host executable code 4502 and device executable code 4503 may include target binary code, in at least one embodiment. In at least one embodiment, at least one component shown or described with respect to FIG. 45 is used to implement techniques and/or functions described herein and at least in conjunction with FIGS. 1-8. In at least one embodiment, host executable code 4502 includes instructions, when executed, to cause an operating voltage of one or more integrated circuits to be adjusted, based at least in part, on an error rate as described herein and at least in conjunction with FIGS. 1-8.

At least one embodiment of the disclosure can be described in view of the following clauses:

1. A processor comprising: one or more circuits to cause an operation voltage of one or more integrated circuits to be adjusted based, at least in part, on an error rate of the one or more integrated circuits.
2. The processor of clause 1, wherein the one or more circuits are to cause an increase in the operation voltage based, at least in part, on a threshold error rate.
3. The processor of any of clauses 1-2, wherein the one or more circuits are to adjust the operation voltage based, at least in part, on a frequency value of the one or more integrated circuits.

4. The processor of any of clauses 1-3, wherein the one or more circuits are to adjust the operation voltage based, at least in part, on a table that correlates error rates with operation factors for the one or more integrated circuits.
5. The processor any of clauses 1-4, wherein the one or more circuits are to adjust the operation voltage based, at least in part, on operation voltage of one or more other integrated circuits.
6. The processor any of clauses 1-5, wherein the one or more circuits are to adjust the operation voltage based, at least in part, on one or more indications of temperature of one or more of the integrated circuits.
7. The processor of any of clauses 1-6, wherein one or more of the integrated circuits operates with a frequency value below a threshold frequency value.
8. The processor of any of clauses 1-7, wherein the error rate is a rate of temporary errors.
9. A computer-implemented method, comprising:
adjusting an operation voltage of one or more integrated circuits based, at least in part, on an error rate of the one or more integrated circuits.
10. The method of clause 9, wherein the error rate is based, at least in part, on one or more models of the one or more integrated circuits.
11. The method of any of clauses 9-10, wherein the adjusting is based, at least in part, on a frequency value of one or more other integrated circuits.
12. The method of any of clauses 9-11, wherein the adjusting is based, at least in part, on a maximum thermal junction temperature of the one or more integrated circuits.
13. The method of any of clauses 9-12, wherein the error rate is based, at least in part, on a bias temperature instability.
14. The method of any of clauses 9-13, wherein the adjusting is based, at least in part, on a frequency margin of the one or more integrated circuits.
15. The method of any of clauses 9-14, wherein the one or more integrated circuits is connected with one or more other integrated circuits on a board to be used in a data center.
16. A system comprising:
one or more processors to cause an operation voltage of one or more integrated circuits to be adjusted based, at least in part, on an error rate of the one or more integrated circuits.
17. The system of clause 16, wherein the one or more processors are to adjust the operation voltage based, at least in part, on an error rate across two or more of the integrated circuits.
18. The system of any of clauses 16-17, wherein the one or more processors are to adjust the operation voltage based, at least in part, on an one or more indications of application workload.
19. The system of any of clauses 16-18, wherein one or more of the one or more integrated circuits are virtual integrated circuits.
20. The system of any of clauses 16-19, wherein the one or more processors are to adjust the operation voltage based, at least in part, on a table that correlates error rates with frequency values.
21. The system of any of clauses 16-20, further comprising one or more other integrated circuits operating at a maximum temperature value.
22. The system of any of clauses 16-21, wherein the error rate is based, at least in part, on a time dependent dielectric breakdown.
23. The system of any of clauses 16-22, wherein the one or more integrated circuits are portioned cores.
24. A machine-readable medium having stored thereon a set of instructions, which if performed by one or more processors, cause the one or more processors to cause an operation voltage of one or more integrated circuits to be adjusted based, at least in part, on an error rate of the one or more integrated circuits.
25. The machine-readable medium of clause 24, wherein the instructions, which if performed by one or more processors, cause an operating voltage to be increased while one or more other integrated circuits run at a maximum operation voltage.
26. The machine-readable medium of any of clauses 24-25 wherein the instructions, which if performed by one or more processors, cause the adjustment based, at least in part, on a threshold error rate for the one or more integrated circuits.
27. The machine-readable medium of any of clauses 24-26, wherein the instructions, which if performed by one or more processors, cause the adjustment based, at least in part, on a predicted operating lifetime for the one or more integrated circuits.
28. The machine-readable medium of any of clauses 24-27, wherein the instructions, which if performed by one or more processors, cause the adjustment based, at least in part, on minimum and maximum frequency values for the one or more integrated circuits.
29. The machine-readable medium of any of clauses 24-28, wherein the instructions, which if performed by one or more processors, cause the adjustment based, at least in part, on one or more indications of degradation.
30. The machine-readable medium of any of clauses 24-29, wherein the instructions, which if performed by one or more processors, cause the adjustment based, at least in part, on a threshold error rate across the one or more integrated circuits and one or more other integrated circuits.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A. 13 and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by, reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the AEU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising: one or more circuits to adjust one or more operating voltages of one or more of a plurality of integrated circuits based, at least in part, on whether adjusting the one or more operating voltages will cause the plurality of integrated circuits to cumulatively exceed a threshold of errors.

2. The processor of claim 1, wherein the one or more circuits are to cause an increase in the one or more operating voltages based, at least in part, on a threshold error rate.

3. The processor of claim 1, wherein the one or more circuits are to adjust the one or more operating voltages based, at least in part, on a frequency value of the plurality of integrated circuits.

4. The processor of claim 1, wherein the one or more circuits are to adjust the one or more operating voltages based, at least in part, on a table that correlates error rates with operation factors for the plurality of integrated circuits.

5. The processor claim 1, wherein the one or more circuits are to adjust the one or more operating voltages based, at least in part, on one or more operating voltages of a plurality of other integrated circuits.

6. The processor claim 1, wherein the one or more circuits are to adjust the one or more operating voltages based, at least in part, on one or more indications of temperature of one or more of the plurality of integrated circuits.

7. The processor of claim 1, wherein one or more of the plurality of integrated circuits operates with a frequency value below a threshold frequency value.

8. The processor of claim 1, wherein the threshold of errors comprise a threshold of soft errors.

9. A computer-implemented method, comprising:
adjusting one or more operating voltages of one or more of a plurality of integrated circuits based, at least in part, on whether adjusting the one or more operating voltages will cause the plurality of integrated circuits to cumulatively exceed a threshold of errors.

10. The method of claim 9, wherein the threshold of errors is based, at least in part, on one or more models of the plurality of integrated circuits.

11. The method of claim 9, wherein the adjusting is based, at least in part, on a frequency value of a plurality of other integrated circuits.

12. The method of claim 9, wherein the adjusting is based, at least in part, on a maximum thermal junction temperature of the plurality of integrated circuits.

13. The method of claim 9, wherein the threshold of errors is based, at least in part, on a bias temperature instability.

14. The method of claim 9, wherein the adjusting is based, at least in part, on a frequency margin of the plurality of integrated circuits.

15. The method of claim 9, wherein the plurality of integrated circuits is connected with a plurality of other integrated circuits on a board to be used in a data center.

16. A system comprising:
one or more processors to adjust one or more operating voltages of one or more of a plurality of integrated circuits based, at least in part, on whether adjusting the one or more operating voltages will cause the plurality of integrated circuits to cumulatively exceed a threshold of errors.

17. The system of claim 16, wherein the one or more processors are to adjust the one or more operating voltages based, at least in part, on an error rate across two or more of the plurality of integrated circuits.

18. The system of claim 16, wherein the one or more processors are to adjust the one or more operating voltages based, at least in part, on one or more indications of application workload.

19. The system of claim 16, wherein one or more of the plurality of integrated circuits are virtual integrated circuits.

20. The system of claim 16, wherein the one or more processors are to adjust the one or more operating voltages based, at least in part, on a table that correlates error rates with frequency values.

21. The system of claim 16, further comprising a plurality of other integrated circuits operating at a maximum temperature value.

22. The system of claim 16, wherein the threshold of errors is based, at least in part, on a time dependent dielectric breakdown.

23. The system of claim 16, wherein the plurality of integrated circuits are portioned cores.

24. A non-transitory machine-readable medium having stored thereon a set of instructions, which if performed by one or more processors, adjust one or more operating voltages of one or more of a plurality of integrated circuits based, at least in part, on whether adjusting the one or more operating voltages will cause the plurality of integrated circuits to cumulatively exceed a threshold of errors.

25. The non-transitory machine-readable medium of claim 24, wherein the instructions, which if performed by the one or more processors, cause an operating voltage to be increased while a plurality of other integrated circuits run at or below threshold operating voltage.

26. The non-transitory machine-readable medium of claim 24, wherein the instructions, which if performed by the one or more processors, cause the adjustment based, at least in part, on a threshold error rate for the plurality of integrated circuits.

27. The non-transitory machine-readable medium of claim 24, wherein the instructions, which if performed by the one or more processors, cause the adjustment based, at least in part, on a predicted operating lifetime for the plurality of integrated circuits.

28. The non-transitory machine-readable medium of claim 24, wherein the instructions, which if performed by the one or more processors, cause the adjustment based, at least in part, on minimum and maximum frequency values for the plurality of integrated circuits.

29. The non-transitory machine-readable medium of claim 24, wherein the instructions, which if performed by the one or more processors, cause the adjustment based, at least in part, on one or more indications of degradation.

30. The non-transitory machine-readable medium of claim 24, wherein the instructions, which if performed by the one or more processors, cause the adjustment based, at least in part, on a threshold error rate across the plurality of integrated circuits and a plurality of other integrated circuits.

* * * * *